United States Patent
Kawamura et al.

(10) Patent No.: US 10,656,398 B2
(45) Date of Patent: May 19, 2020

(54) ZOOM LENS AND IMAGE PICKUP APPARATUS USING THE SAME

(71) Applicant: OLYMPUS CORPORATION, Hachioji-shi, Tokyo (JP)

(72) Inventors: Kazuteru Kawamura, Hachioji (JP); Toyoki Kon, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 255 days.

(21) Appl. No.: 15/717,829

(22) Filed: Sep. 27, 2017

(65) Prior Publication Data

US 2018/0017771 A1 Jan. 18, 2018

Related U.S. Application Data

(63) Continuation of application No. PCT/JP2015/059794, filed on Mar. 27, 2015.

(51) Int. Cl.
*G02B 15/163* (2006.01)
*G02B 13/00* (2006.01)
(Continued)

(52) U.S. Cl.
CPC ......... *G02B 15/163* (2013.01); *G02B 13/009* (2013.01); *G02B 15/173* (2013.01); *G02B 15/20* (2013.01); *G02B 27/646* (2013.01)

(58) Field of Classification Search
CPC ...... G02B 15/163; G02B 15/22; G02B 15/14; G02B 15/173; G02B 15/177; G02B 15/20;
(Continued)

(56) References Cited

U.S. PATENT DOCUMENTS 5,847,882 A 12/1998 Nakayama
6,094,312 A 7/2000 Nakayama
(Continued)

FOREIGN PATENT DOCUMENTS

JP 08190051 A 7/1996
JP 2003255228 A 9/2003
(Continued)

OTHER PUBLICATIONS

English translation of JP2010191199, machine translated, May 9, 2019.*
(Continued)

*Primary Examiner* — Jie Lei
(74) *Attorney, Agent, or Firm* — Holtz, Holtz & Volek PC

(57) ABSTRACT

A zoom lens includes a front-side lens unit, a rear-side lens unit, and an aperture stop. The front-side lens unit includes either one lens unit having a negative refractive power or two lens units having a negative refractive power, and has a negative refractive power as a whole. The rear-side lens unit is disposed on an image side of the front-side lens unit, and has a positive refractive power as a whole at a telephoto end. The rear-side lens unit includes a plurality of lens units, and includes an object-side positive lens unit having a positive refractive power which is disposed nearest to object and the following conditional expressions (1), (2), and (3) are satisfied:

$1.2 \leq |MG_{B\_t}| \leq 6$ (1), $10 \leq vd_{Gn\_min\_p} \leq 27$ (2), and $-0.03 \leq Tp_{Gn\_min\_p} \leq 0.014$ (3).

39 Claims, 18 Drawing Sheets

(51) Int. Cl.
*G02B 15/20* (2006.01)
*G02B 27/64* (2006.01)
*G02B 15/173* (2006.01)

(58) Field of Classification Search
CPC ...... G02B 27/64; G02B 27/646; G02B 21/02; G02B 7/10; G02B 13/18; G02B 13/04; G02B 13/00; G02B 13/009; G02B 13/24; G02B 9/60; G02B 9/34
USPC ....... 559/557, 763, 772, 773, 766, 657–660, 559/684, 686, 693, 695, 713, 714, 559/750–757
See application file for complete search history.

(56) References Cited

U.S. PATENT DOCUMENTS

| | | | |
|---|---|---|---|
| 2003/0165020 A1 | 9/2003 | Satori et al. | |
| 2006/0221460 A1* | 10/2006 | Saruwatari | G02B 15/173 359/676 |
| 2009/0251781 A1* | 10/2009 | Adachi | G02B 15/161 359/557 |
| 2009/0290232 A1 | 11/2009 | Hagiwara | |
| 2013/0194487 A1* | 8/2013 | Eguchi | G02B 13/02 348/360 |
| 2014/0354857 A1 | 12/2014 | Kato et al. | |

FOREIGN PATENT DOCUMENTS

| | | | |
|---|---|---|---|
| JP | 2009282398 A | 12/2009 | |
| JP | 2010191199 | * 9/2010 | ............. G02B 13/18 |
| JP | 2010191199 A | 9/2010 | |
| JP | 2014235238 A | 12/2014 | |

OTHER PUBLICATIONS

International Search Report (ISR) and Written Opinion dated Jun. 23, 2015 issued in International Application No. PCT/JP2015/059794.

International Preliminary Report on Patentability (IPRP) dated Oct. 12, 2017 issued in counterpart International Application No. PCT/JP2015/059794.

* cited by examiner

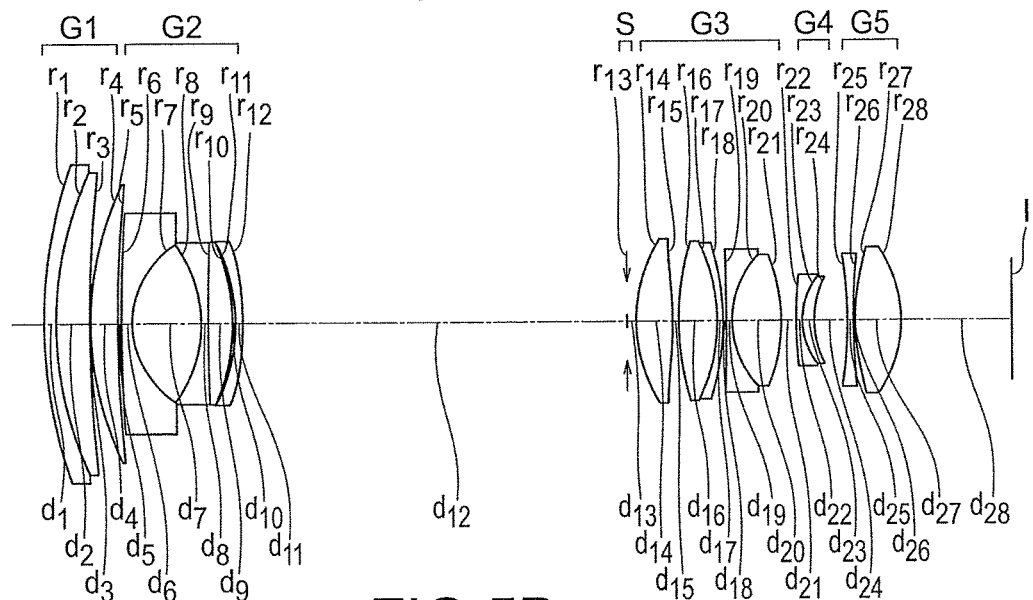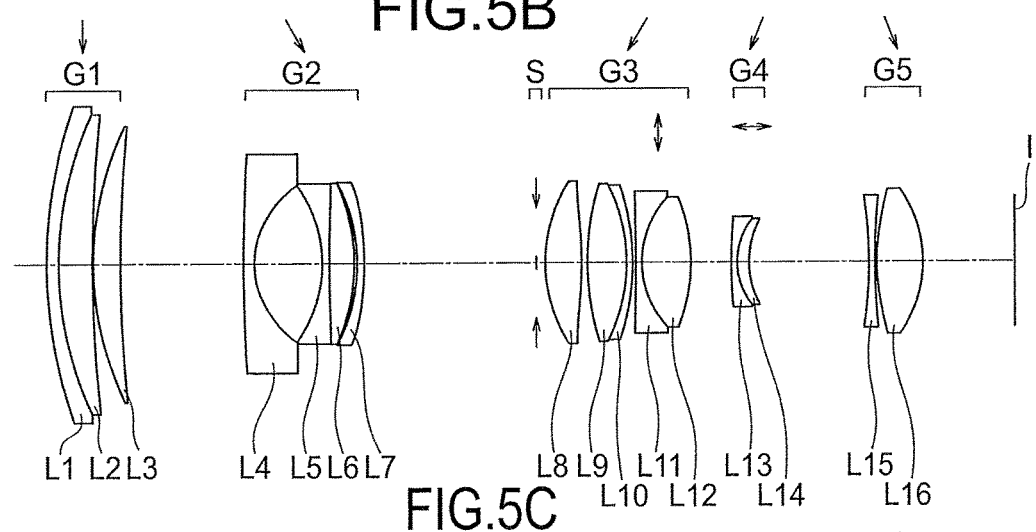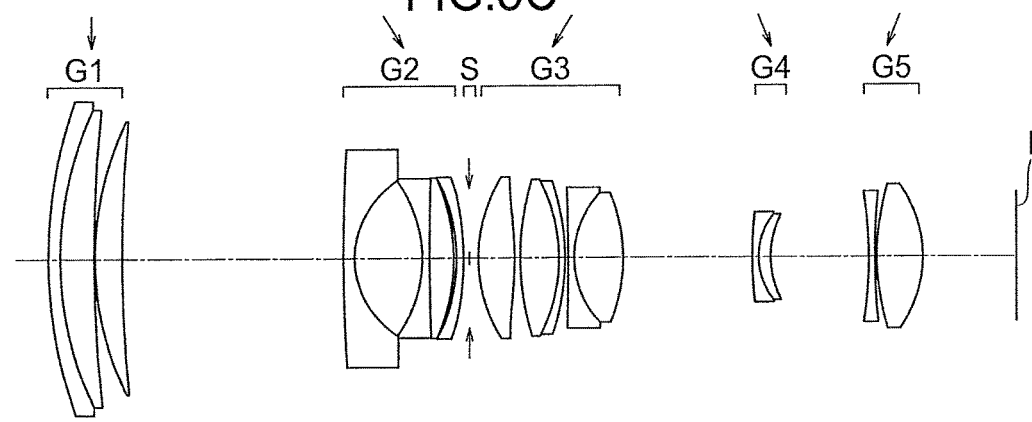

SA
FNO 4.082

AS
FIY 9.77

DT
FIY 9.77

CC
FIY 9.77

SA
FNO 4.070

AS
FIY 10.82

DT
FIY 10.82

CC
FIY 10.82

SA
FNO 4.053

AS
FIY 10.82

DT
FIY 10.82

CC
FIY 10.82

435.84 — — —
486.13 —·—·—
656.27 -------
587.56 ———

SA
FNO 4.075
-0.20　0.20
(mm)

AS
FIY 9.84
-0.20　0.20
(mm)

DT
FIY 9.84
-10.00　10.00
(%)

CC
FIY 9.84
-0.02　0.02
(mm)

SA
FNO 4.075
-0.20　0.20
(mm)

AS
FIY 10.82
-0.20　0.20
(mm)

DT
FIY 10.82
-10.00　10.00
(%)

CC
FIY 10.82
-0.02　0.02
(mm)

SA
FNO 4.073
-0.20　0.20
(mm)

AS
FIY 10.82
-0.20　0.20
(mm)

DT
FIY 10.82
-10.00　10.00
(%)

CC
FIY 10.82
-0.02　0.02
(mm)

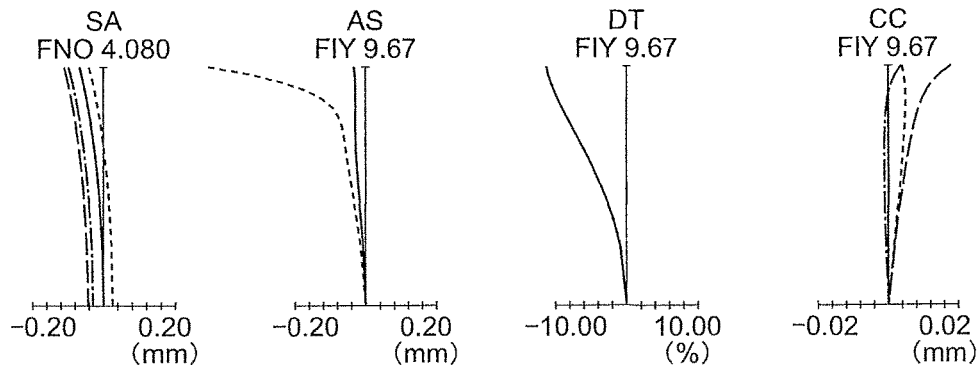
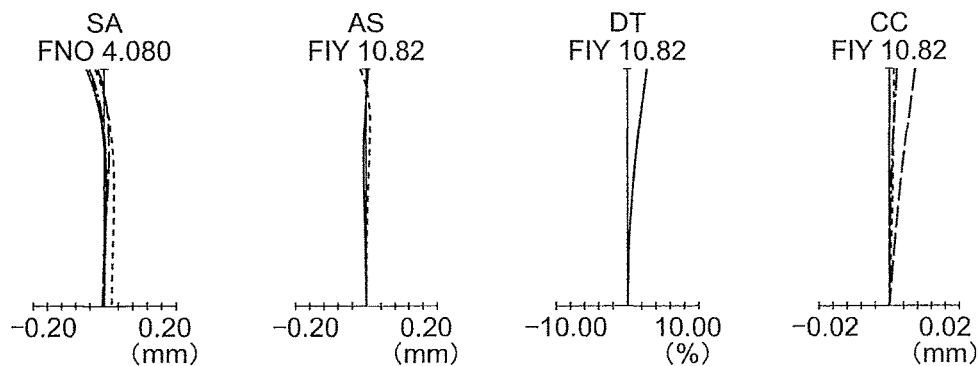
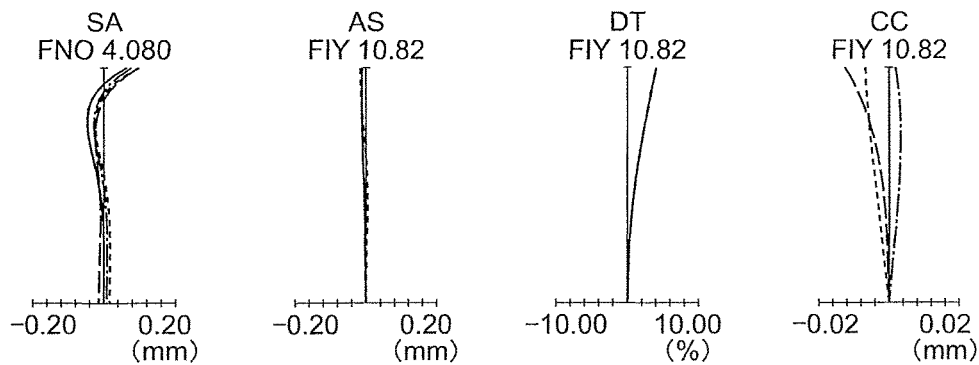

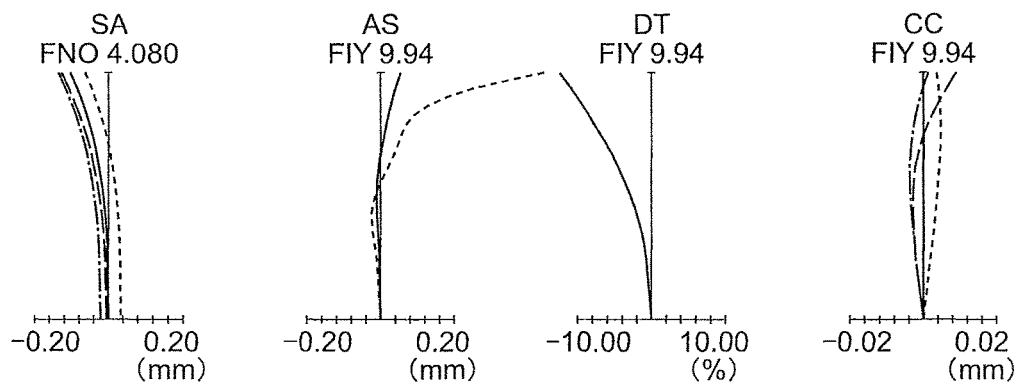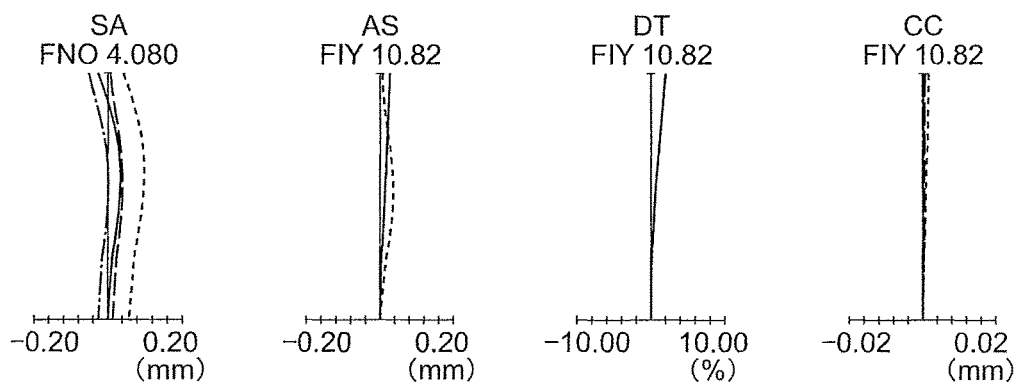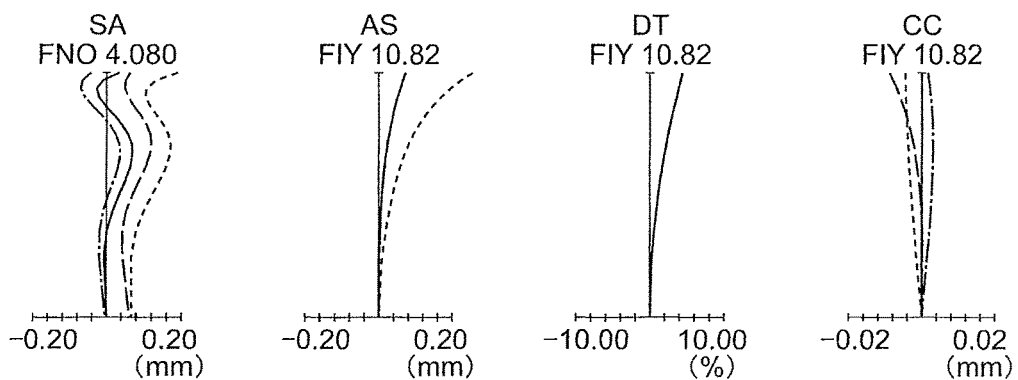

SA
FNO 4.080
-0.20  0.20
(mm)

AS
FIY 9.99
-0.20  0.20
(mm)

DT
FIY 9.99
-10.00  10.00
(%)

CC
FIY 9.99
-0.02  0.02
(mm)

SA
FNO 4.080
-0.20  0.20
(mm)

AS
FIY 11.15
-0.20  0.20
(mm)

DT
FIY 11.15
-10.00  10.00
(%)

CC
FIY 11.15
-0.02  0.02
(mm)

SA
FNO 4.080
-0.20  0.20
(mm)

AS
FIY 11.15
-0.20  0.20
(mm)

DT
FIY 11.15
-10.00  10.00
(%)

CC
FIY 11.15
-0.02  0.02
(mm)

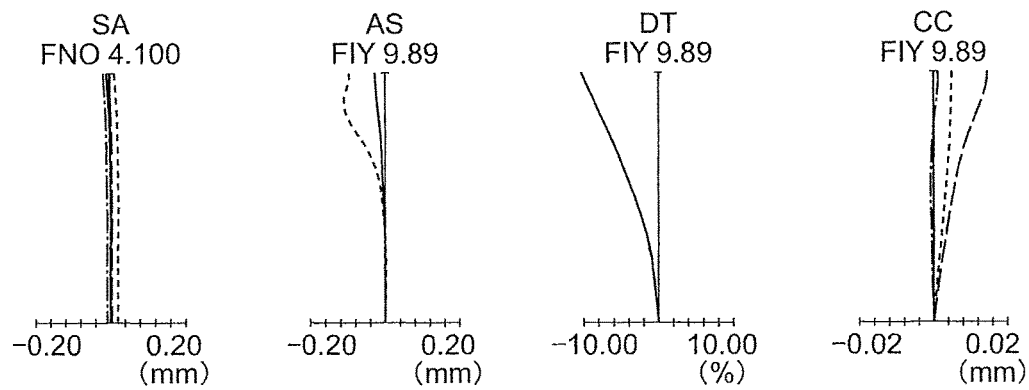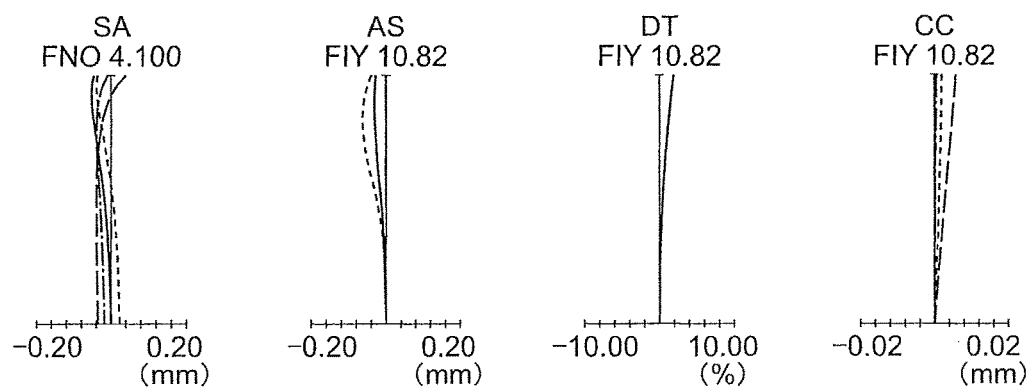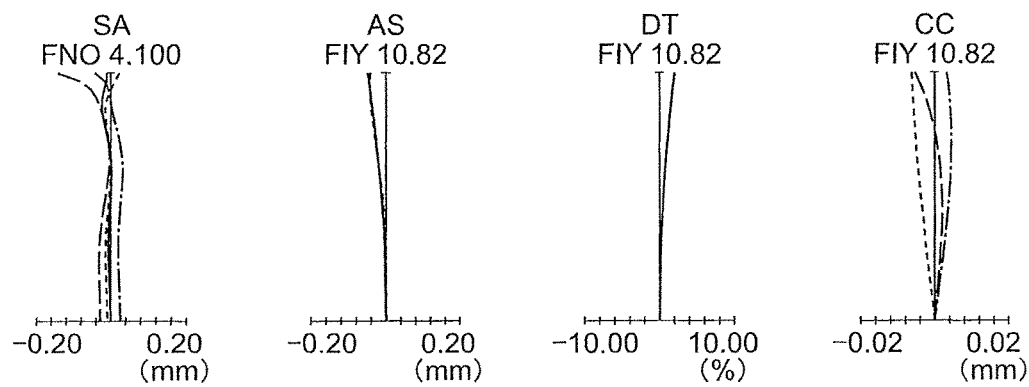

ZOOM LENS AND IMAGE PICKUP APPARATUS USING THE SAME

CROSS-REFERENCE TO RELATED APPLICATION

The present application is a continuation application of International Application No. PCT/JP2015/059794 filed on Mar. 27, 2015, the entire contents of which are incorporated herein by reference.

BACKGROUND OF THE INVENTION

Field of the Invention

The present invention relates to a zoom lens and an image pickup apparatus using the same.

Description of the Related Art

As a zoom lens capable of wide-angle photography and telephotography, zoom lenses described in Japanese Patent Application Laid-open Publication No. 2003-255228 (second example), Japanese Patent Application Laid-open Publication No. 2009-282398 (first example), and Japanese Patent Application Laid-open Publication No. Hei 8-190051 (first example) are available.

SUMMARY OF THE INVENTION

A zoom lens according to an aspect of the present invention comprises:
a front-side lens unit,
a rear-side lens unit, and
an aperture stop, wherein
the front-side lens unit includes either one lens unit having a negative refractive power or two lens units having a negative refractive power, and has a negative refractive power as a whole, and
the rear-side lens unit is disposed on an image side of the front-side lens unit, and has a positive refractive power as a whole at a telephoto end, and
the rear-side lens unit includes a plurality of lens units, and includes an object-side positive lens unit having a positive refractive power which is disposed nearest to object, and
a distance between the front-side lens unit and the object-side positive lens unit changes to become narrower at the telephoto end than at a wide angle end, and
the aperture stop is disposed on the image side of the front-side lens unit, and
the following conditional expressions (1), (2), and (3) are satisfied:

$$1.2 \leq |MG_{B\_t}| \leq 6 \quad (1)$$

$$10 \leq vd_{Gn\_min\_p} \leq 27 \quad (2), \text{ and}$$

$$-0.03 \leq Tp_{Gn\_min\_p} \leq 0.014 \quad (3)$$

where,
$MG_{B\_t}$ denotes a lateral magnification at the telephoto end of the rear-side lens unit,
$vd_{Gn\_min\_p}$ denotes a minimum Abbe number from among Abbe numbers for positive lenses in the front-side lens unit, $$Tp_{Gn\_min\_p} = \theta gF_{Gn\_p} - (-0.0016 \times vd_{Gn\_p} + 0.6415), \text{ here}$$

$$\theta gF_{Gn\_p} = (ng_{Gn\_p} - nF_{Gn\_p})/(nF_{Gn\_p} - nC_{Gn\_p}),$$

$vd_{Gn\_p}$ denotes Abbe number for a predetermined positive lens in the front-side lens unit,
$ng_{Gn\_p}$, $nF_{Gn\_p}$, and $nC_{Gn\_p}$ are refractive indices of the predetermined positive lens in the front-side lens unit for a g-line, an F-line, and a C-line respectively, and
the predetermined positive lens in the front-side lens unit is a positive lens for which Abbe number is the minimum, from among the positive lenses in the front-side lens unit.

Moreover, a zoom lens according to another aspect of the present invention comprises:
a front-side lens unit,
a rear-side lens unit, and
an aperture stop, wherein
the front-side lens unit includes either one lens unit having a negative refractive power or two lens unit having a negative refractive power, and has a negative refractive power as a whole, and
the rear-side lens unit is disposed on an image side of the front-side lens unit, and has a positive refractive power as a whole at a telephoto end, and
the rear-side lens unit includes a plurality of lens units, and includes an object-side positive lens unit having a positive refractive power which is disposed nearest to object, and
a distance between the front-side lens unit and the object-side positive lens unit changes to become narrower at the telephoto end than at a wide angle end, and
the aperture stop is disposed on the image side of the front-side lens unit, and
the following conditional expressions (1'), (3'), and (4) are satisfied:

$$1.26 \leq |MG_{B\_t}| \leq 7 \quad (1')$$

$$-0.015 \leq Tp_{Gn\_min\_p} \leq 0.014 \quad (3'), \text{ and}$$

$$2.3 \leq |MG_{B\_t}|/|MG_{B\_w}| \leq 7.0 \quad (4)$$

where,
$MG_{B\_t}$ denotes a lateral magnification at the telephoto end of the rear-side lens unit, $$Tp_{Gn\_min\_p} = \theta gF_{Gn\_p} - (-0.0016 \times vd_{Gn\_p} + 0.6415), \text{ here}$$

$$\theta gF_{Gn\_p} = (ng_{Gn\_p} - nF_{Gn\_p})/(nF_{Gn\_p} - nC_{Gn\_p}),$$

$vd_{Gn\_p}$ denotes Abbe number for a predetermined positive lens in the front-side lens unit,
$ng_{Gn\_p}$, $nF_{Gn\_p}$, and $nC_{Gn\_p}$ are refractive indices of the predetermined positive lens in the front-side lens unit for a g-line, an F-line, and a C-line respectively,
the predetermined positive lens in the front-side lens unit is a positive lens for which Abbe number is the minimum, from among the positive lenses in the front-side lens unit, and
$MG_{B\_w}$ denotes a lateral magnification at the wide angle end of the rear-side lens unit.

Moreover, a zoom lens according to still another aspect of the present invention comprises:
a first lens unit having a positive refractive power,
a front-side lens unit,
a rear-side lens unit, and
an aperture stop, wherein
the first lens unit is disposed on an object side of the front-side lens unit, and
the front-side lens unit includes either one lens unit having a negative refractive power or two lens units having a negative refractive power, and has a negative refractive power as a whole, and the rear-side lens unit is disposed on an image side of the front-side lens unit, and has a positive refractive power as a whole at a telephoto end, and the rear-side lens unit includes a plurality of lens units, and includes an object-side positive lens unit having a positive refractive power which is disposed nearest to object, and a distance between the first lens unit and the front-side lens unit changes to become wider at the telephoto end than at a wide angle end, and a distance between the front-side lens unit and the object-side positive lens unit changes to become narrower at the telephoto end than at the wide angle end, and the aperture stop is disposed on the image side of the front-side lens unit, and the following conditional expressions (2') and (3) are satisfied:

$$15 \leq vd_{Gn\_min\_p} \leq 27 \quad (2'), \text{ and}$$

$$-0.03 \leq Tp_{Gn\_min\_p} \leq 0.014 \quad (3)$$

where, $vd_{Gn\_min\_p}$ denotes a minimum Abbe number from among Abbe numbers for positive lenses in the front-side lens unit, $$Tp_{Gn\_min\_p} = \theta gF_{Gn\_p} - (-0.0016 \times vd_{Gn\_p} + 0.6415), \text{ here}$$

$$\theta gF_{Gn\_p} = (ng_{Gn\_p} - nF_{Gn\_p})/(nF_{Gn\_p} - nC_{Gn\_p}),$$

$vd_{Gn\_p}$ denotes Abbe number for a predetermined positive lens in the front-side lens unit, $ng_{Gn\_p}$, $nF_{Gn\_p}$, and $nC_{Gn\_p}$ are refractive indices of the predetermined positive lens in the front-side lens unit for a g-line, an F-line, and a C-line respectively, and the predetermined positive lens in the front-side lens unit is a positive lens for which Abbe number is the minimum, from among the positive lenses in the front-side lens unit.

Moreover, a zoom lens according to still another aspect of the present invention comprises:

a first lens unit having a positive refractive power,
a front-side lens unit,
a rear-side lens unit, and
an aperture stop, wherein the first lens unit is disposed on an object side of the front-side lens unit, and the front-side lens unit includes either one lens unit having a negative refractive power or two lens units having a negative refractive power, and has a negative refractive power as a whole, and the rear-side lens unit is disposed on an image side of the front-side lens unit, and has a positive refractive power as a whole at a telephoto end, and the rear-side lens unit includes a plurality of lens units, and includes an object-side positive lens unit having a positive refractive power which is disposed nearest to object, and a distance between the first lens unit and the front-side lens unit changes to become wider at the telephoto end than at a wide angle end, and a distance between the front-side lens unit and the object-side positive lens unit changes to become narrower at the telephoto end than at the wide angle end, and the aperture stop is disposed on the image side of the front-side lens unit, and the following conditional expressions (3"), (5), and (6) are satisfied:

$$-0.03 \leq Tp_{Gn\_min\_p} \leq 0.016 \quad (3''),$$

$$70.3 \leq vd_{1G\_max\_p} \quad (5), \text{ and}$$

$$54 \leq vd_{Gn\_max\_n} \quad (6)$$

where, $$Tp_{Gn\_min\_p} = \theta gF_{Gn\_p} - (-0.0016 \times vd_{Gn\_p} + 0.6415), \text{ here}$$

$$\theta gF_{Gn\_p} = (ng_{Gn\_p} - nF_{Gn\_p})/(nF_{Gn\_p} - nC_{Gn\_p}),$$

$vd_{Gn\_p}$ denotes Abbe number for a predetermined positive lens in the front-side lens unit, $ng_{Gn\_p}$, $nF_{Gn\_p}$, and $nC_{Gn\_p}$ are refractive indices of the predetermined positive lens in the front-side lens unit for a g-line, an F-line, and a C-line respectively, the predetermined positive lens in the front-side lens unit is a positive lens for which Abbe number is the minimum, from among the positive lenses in the front-side lens unit, $vd_{1G\_max\_p}$ denotes a maximum Abbe number from among Abbe numbers for positive lenses in the first lens unit, and $vd_{Gn\_max\_n}$ denotes a maximum Abbe number from among Abbe numbers for negative lenses in the front-side lens unit.

Moreover, an image pickup apparatus according to the present invention comprises:

the zoom lens described above, and an image pickup element which has an image pickup surface.

BRIEF DESCRIPTION OF THE DRAWINGS

FIG. 5A, FIG. 5B, and FIG. 5C are lens cross-sectional views of a zoom lens according to an example 5;

FIG. 7A, FIG. 7B, and FIG. 70 are lens cross-sectional views of a zoom lens according to an example 7;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L are aberration diagrams of the zoom lens according to the example 3;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L are aberration diagrams of the zoom lens according to the example 5;

FIG. 14A, FIG. 14B, FIG. 14C, FIG. 14D, FIG. 14E, FIG. 14F, FIG. 14G, FIG. 14H, FIG. 14I, FIG. 14J, FIG. 14K, and FIG. 14L are aberration diagrams of the zoom lens according to the example 7;

DETAILED DESCRIPTION OF THE INVENTION

Figure 1A:
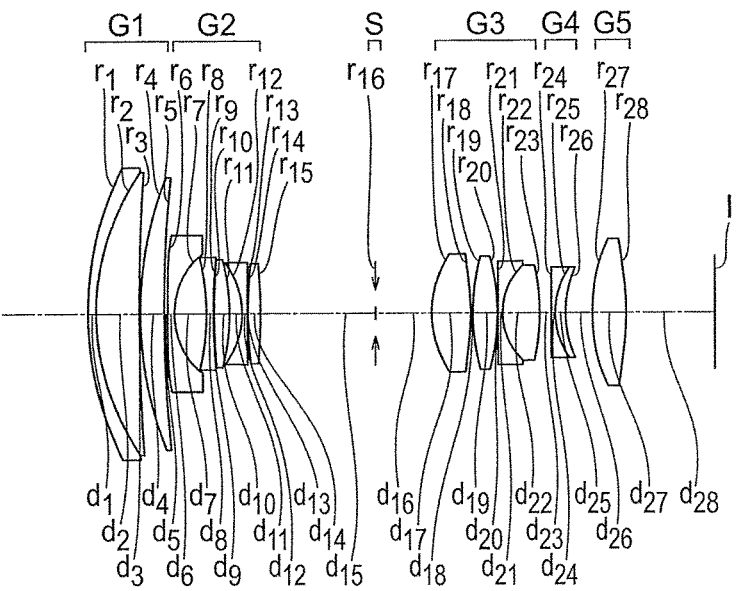
FIG. 1A, FIG. 1B, and FIG. 1C are lens cross-sectional views of a zoom lens according to an example 1.
Figure 1B:
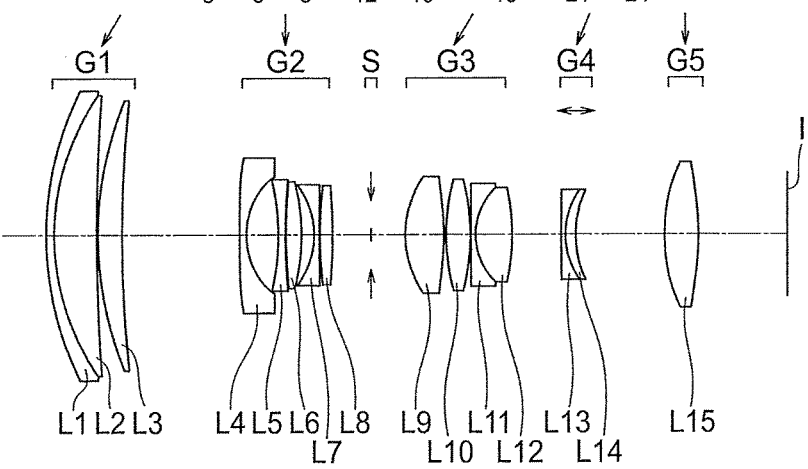
Figure 1C:
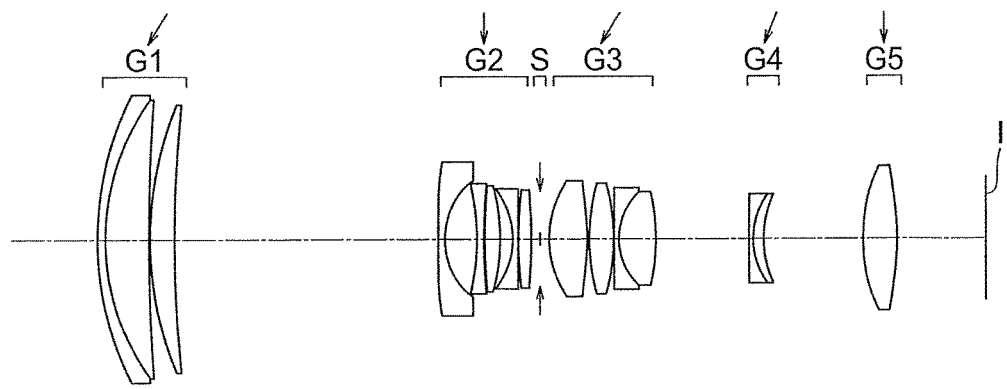
Figure 2A:
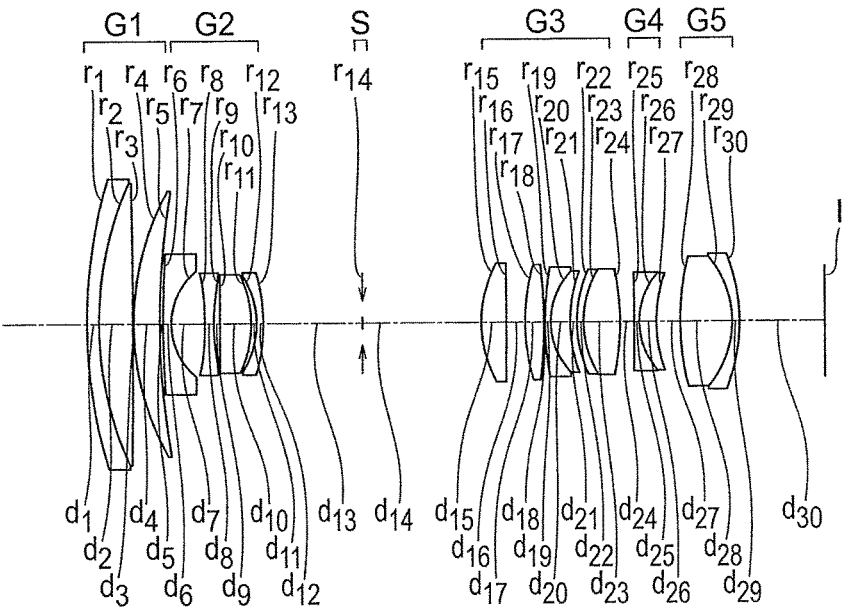
FIG. 2A, FIG. 2B, and FIG. 2C are lens cross-sectional views of a zoom lens according to an example 2.
Figure 2B:
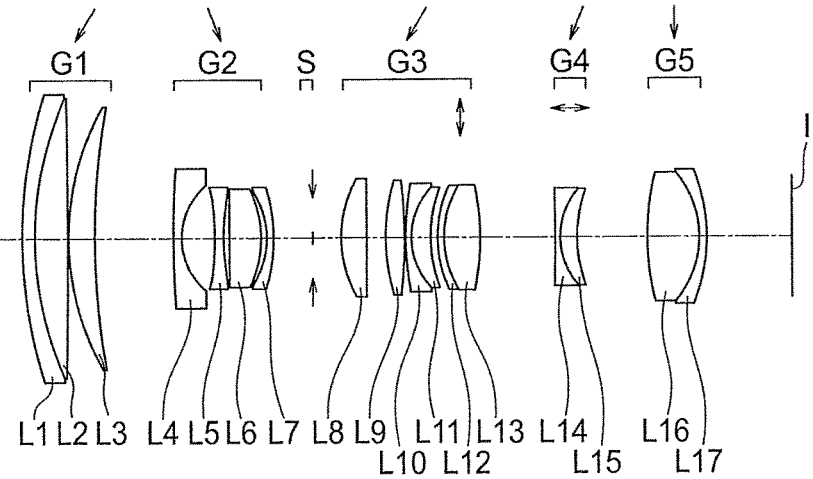
Figure 2C:
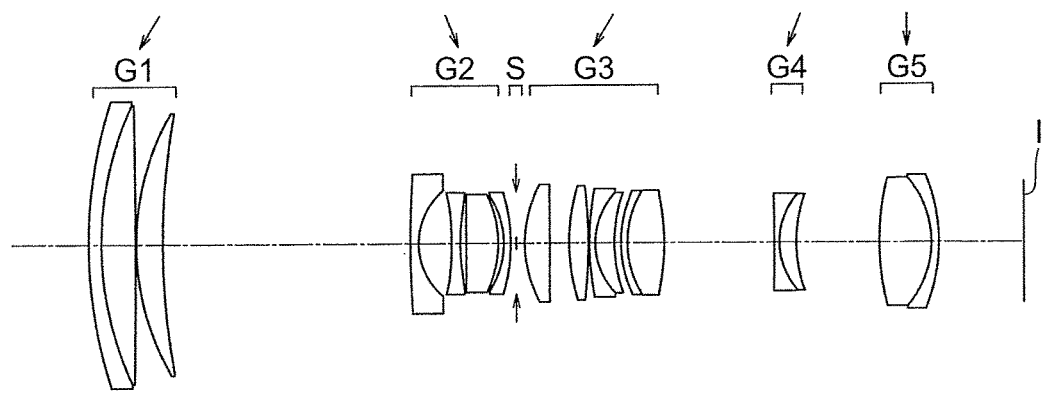
Figure 3A:
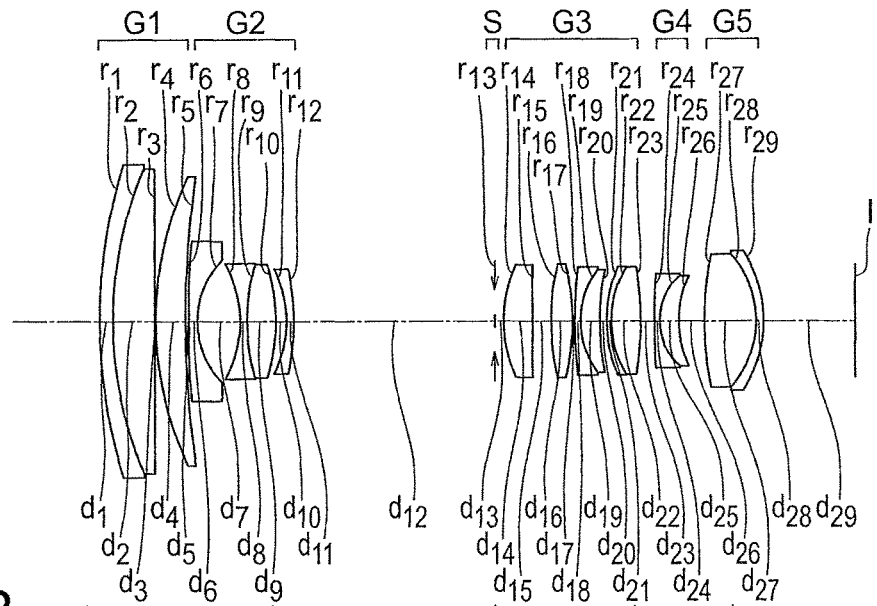
FIG. 3A, FIG. 3B, and FIG. 3C are lens cross-sectional views of a zoom lens according to an example 3.
Figure 3B:
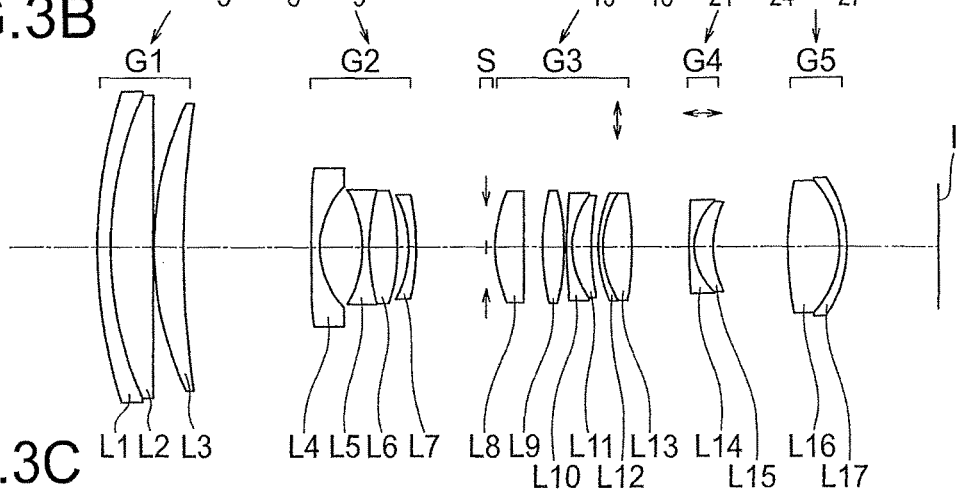
Figure 3C:
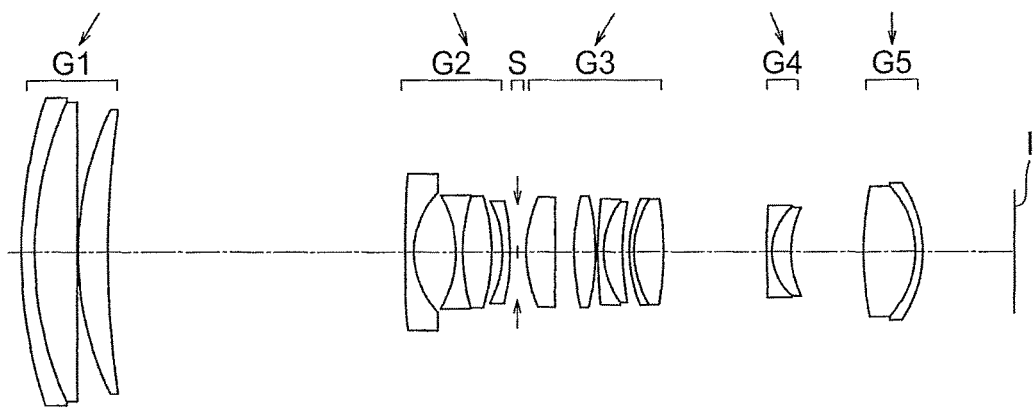
Figure 4A:
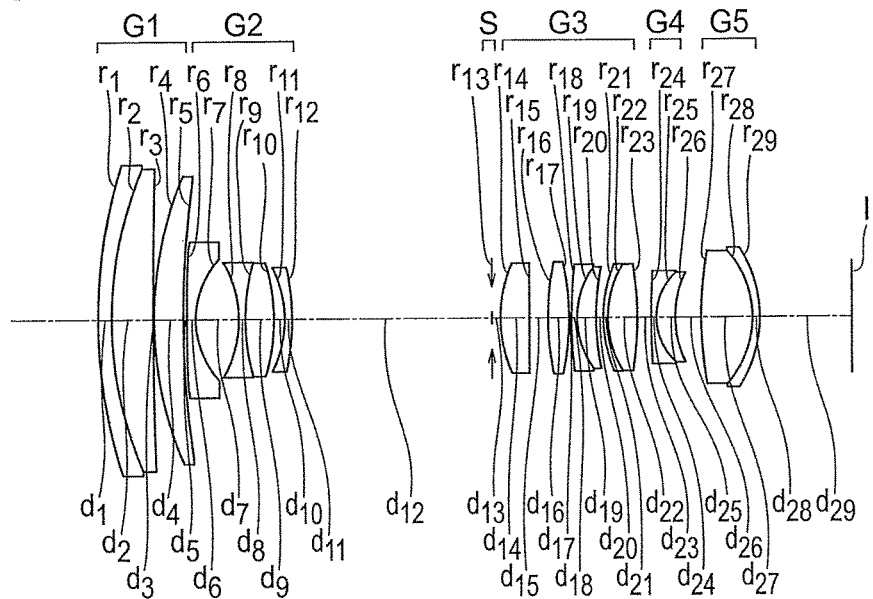
FIG. 4A, FIG. 4B, and FIG. 4C are lens cross-sectional views of a zoom lens according to an example 4.
Figure 4B:
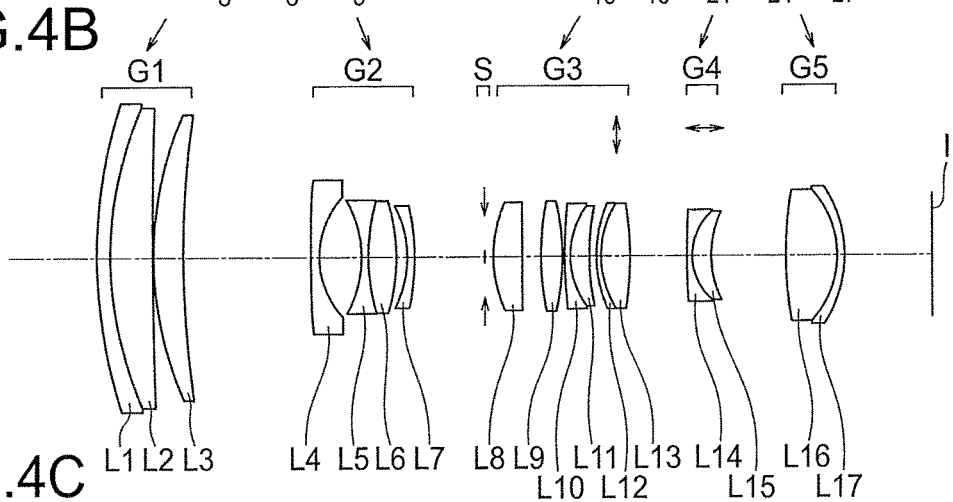
Figure 4C:
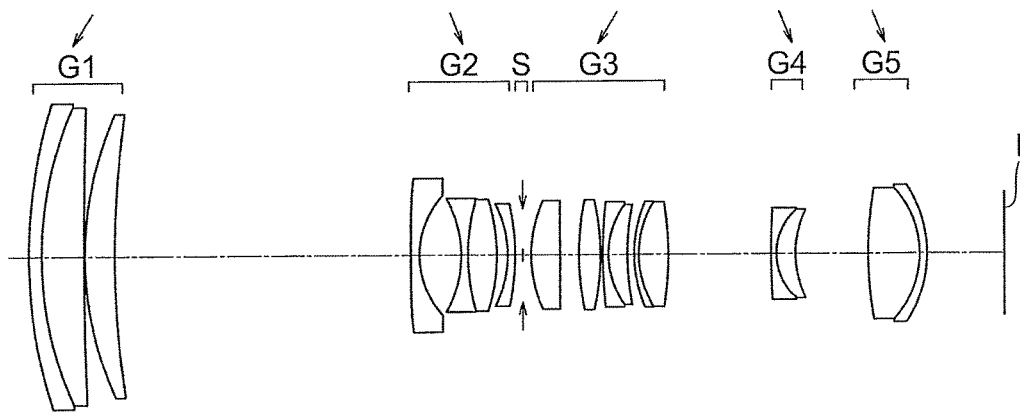
Figure 6A:
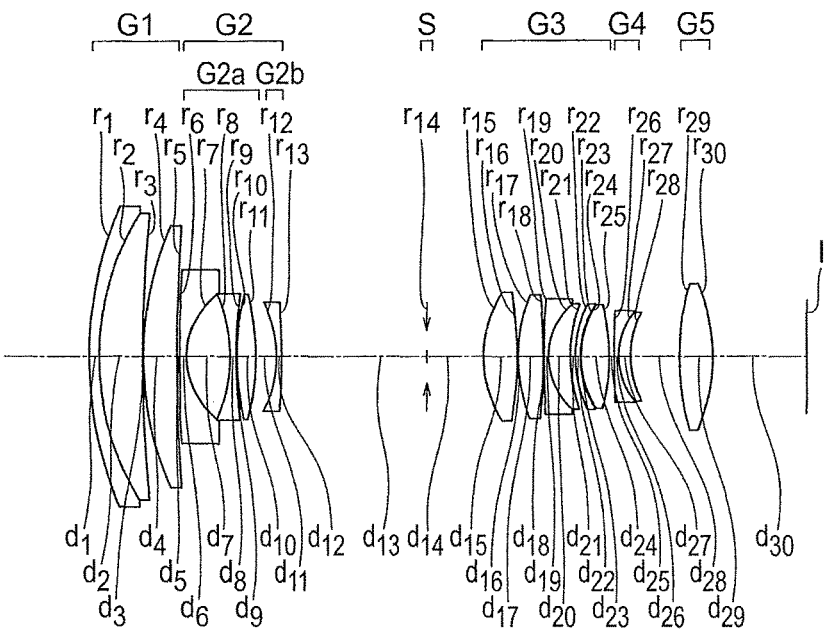
FIG. 6A, FIG. 6B, and FIG. 6C are lens cross-sectional views of a zoom lens according to an example 6.
Figure 6B:
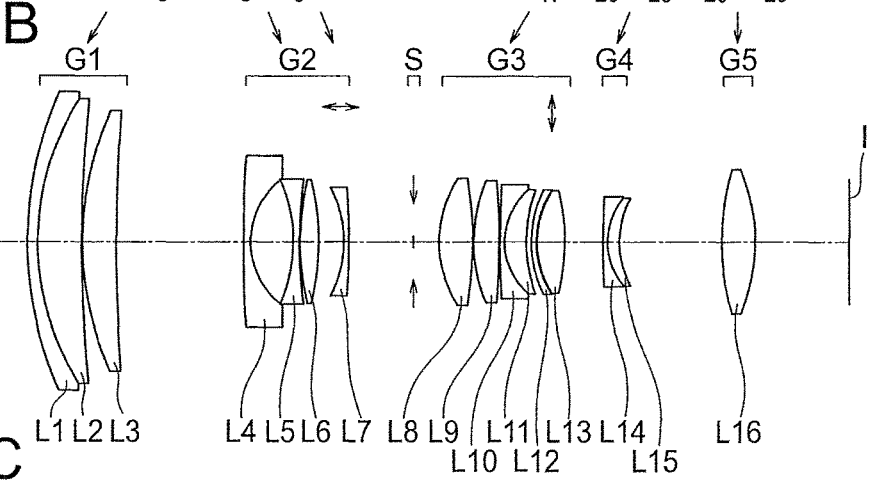
Figure 6C:
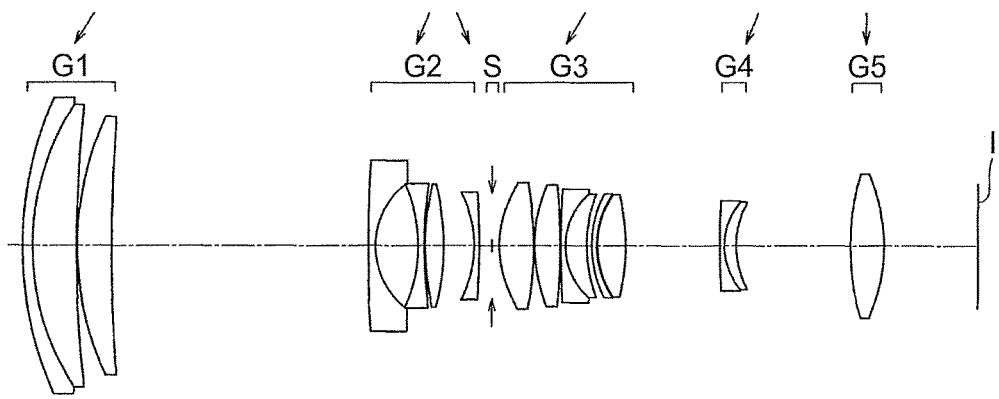
Figure 7A:
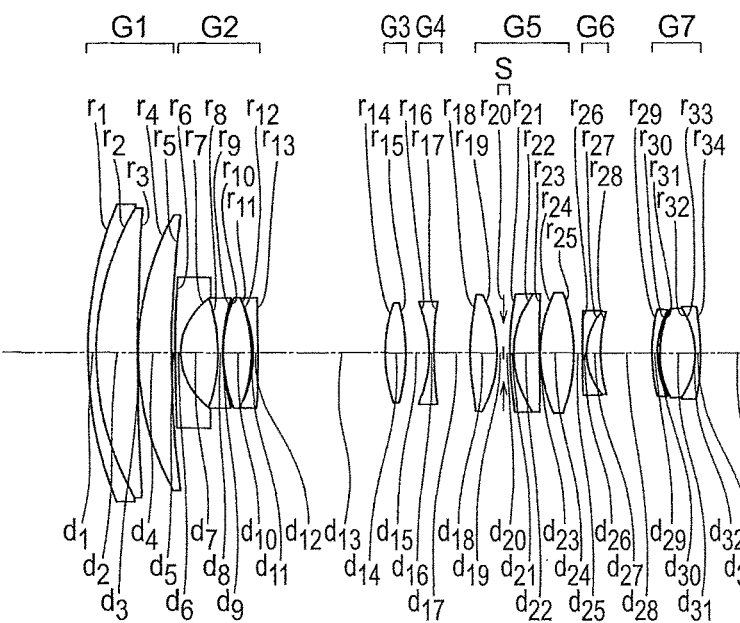
Figure 7B:
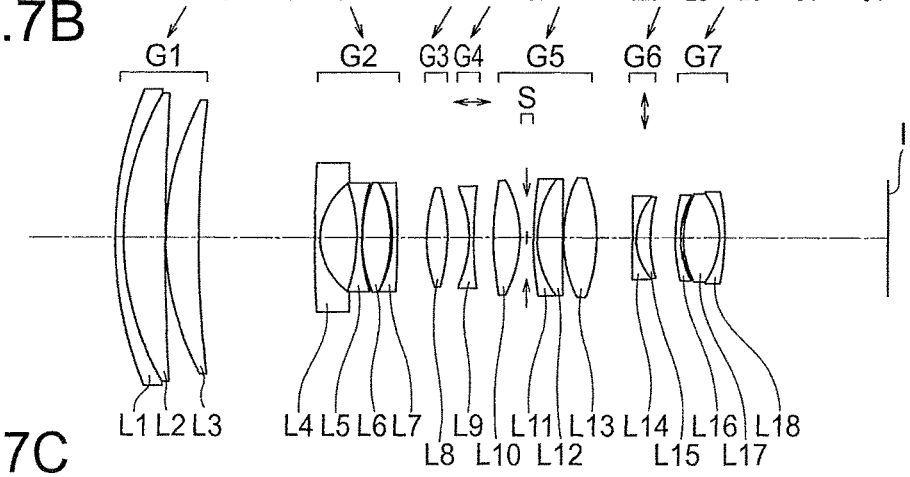
Figure 7C:
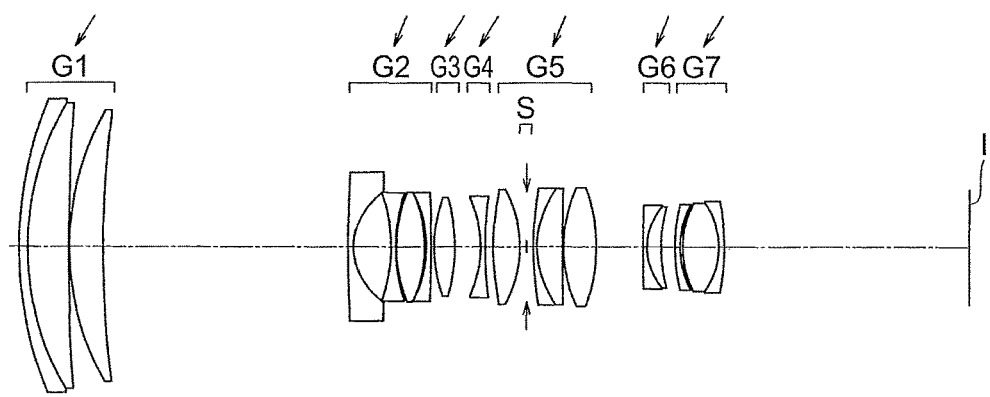
Figure 8A:
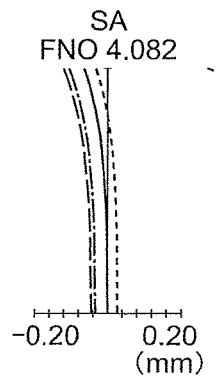
FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L are aberration diagrams of the zoom lens according to the example 1.
Figure 8B:
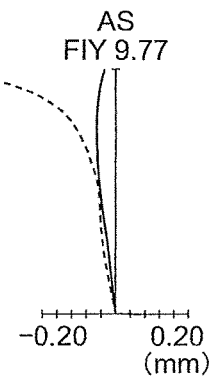
Figure 8C:
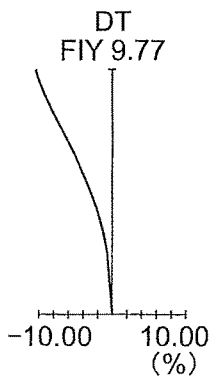
Figure 8D:
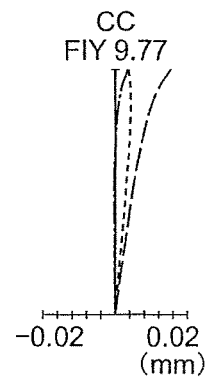
Figure 8E:
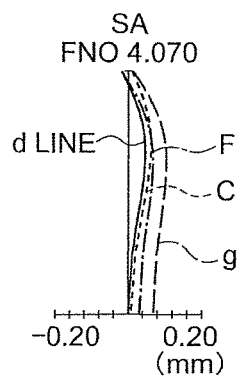
Figure 8F:
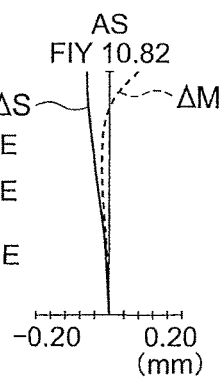
Figure 8G:
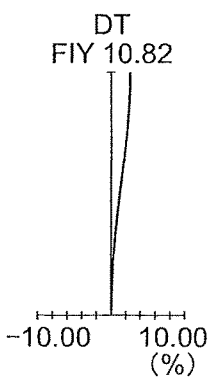
Figure 8H:
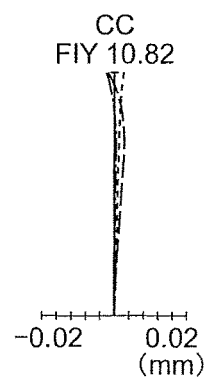
Figure 8I:
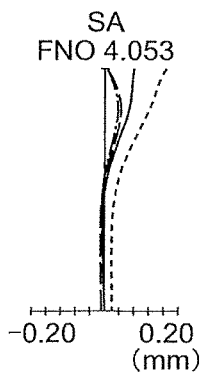
Figure 8J:
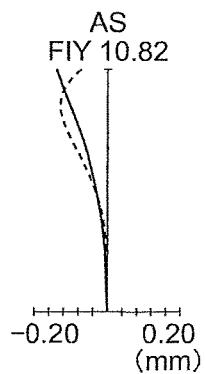
Figure 8K:
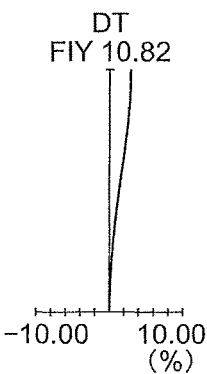
Figure 8L:
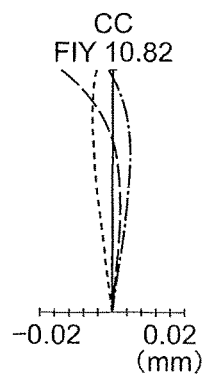
Figure 9A:
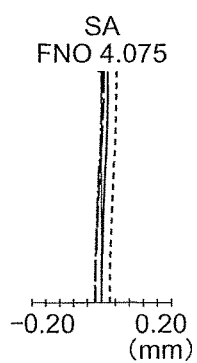
FIG. 9A, FIG. 9B, FIG. 9C, FIG. 9D, FIG. 9E, FIG. 9F, FIG. 9G, FIG. 9H, FIG. 9I, FIG. 9J, FIG. 9K, and FIG. 9L are aberration diagrams of the zoom lens according to the example 2.
Figure 9B:
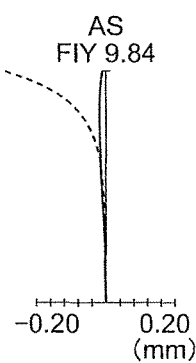
Figure 9C:
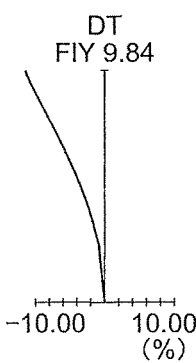
Figure 9D:
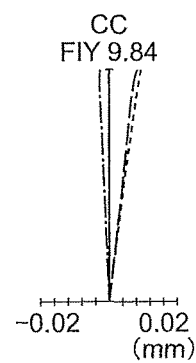
Figure 9E:
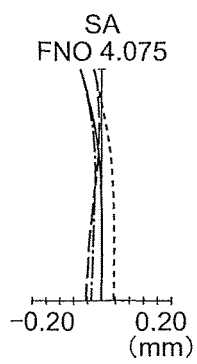
Figure 9F:
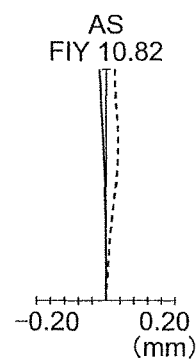
Figure 9G:
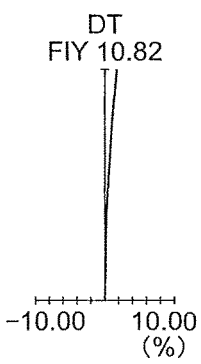
Figure 9H:
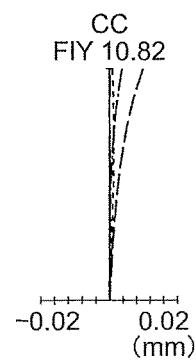
Figure 9I:
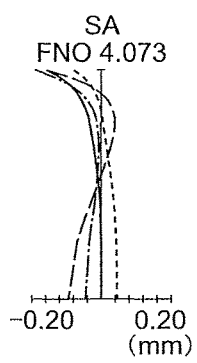
Figure 9J:
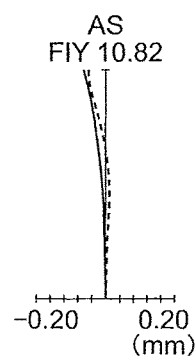
Figure 9K:
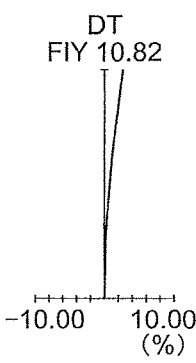
Figure 9L:
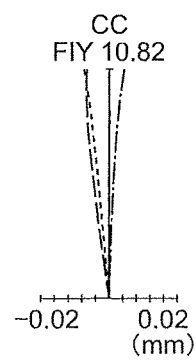
Figure 11A:
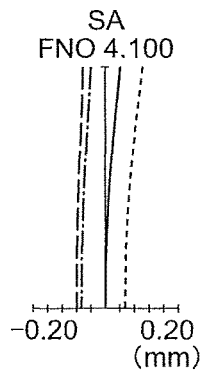
FIG. 11A, FIG. 11B, FIG. 11C, FIG. 11D, FIG. 11E, FIG. 11F, FIG. 11G, FIG. 11H, FIG. 11I, FIG. 11J, FIG. 11K, and FIG. 11L are aberration diagrams of the zoom lens according to the example 4.
Figure 11B:
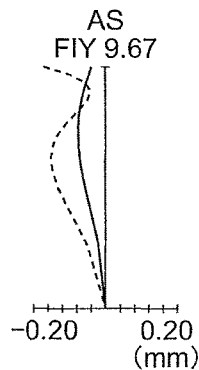
Figure 11C:
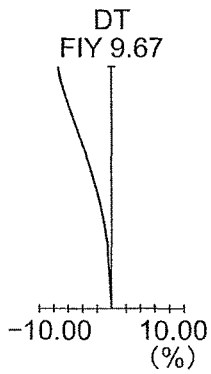
Figure 11D:
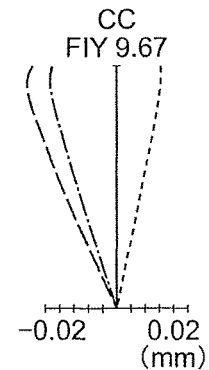
Figure 11E:
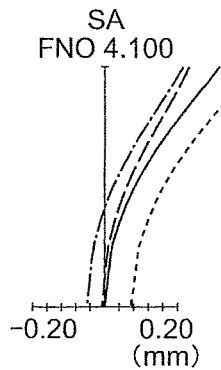
Figure 11F:
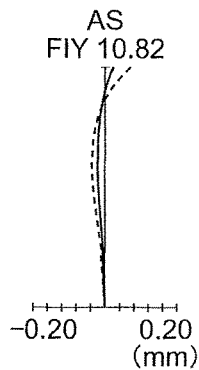
Figure 11G:
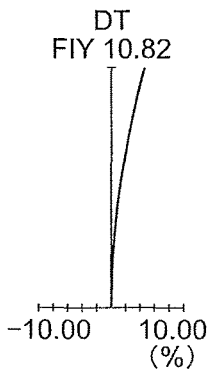
Figure 11H:
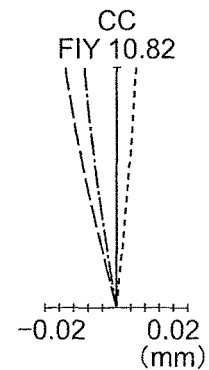
Figure 11I:
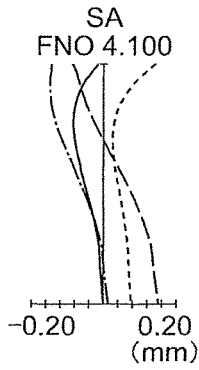
Figure 11J:
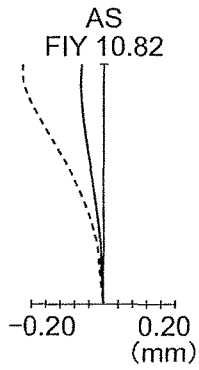
Figure 11K:
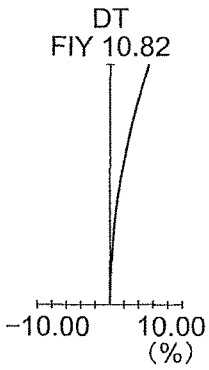
Figure 11L:
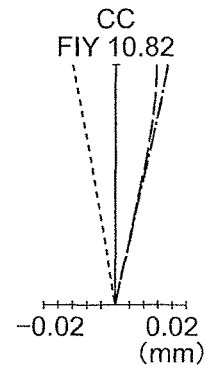
Figure 13A:
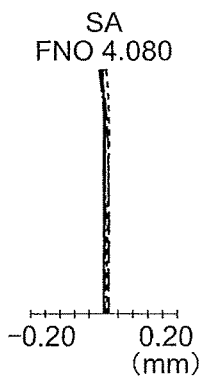
FIG. 13A, FIG. 13B, FIG. 13C, FIG. 13D, FIG. 13E, FIG. 13F, FIG. 13G, FIG. 13H, FIG. 13I, FIG. 13J, FIG. 13K, and FIG. 13L are aberration diagrams of the zoom lens according to the example 6.
Figure 13B:
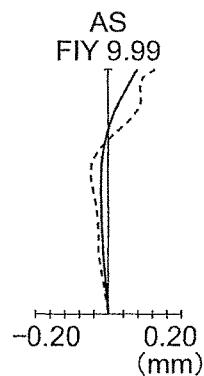
Figure 13C:
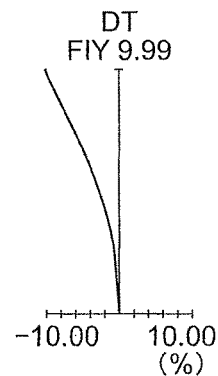
Figure 13D:
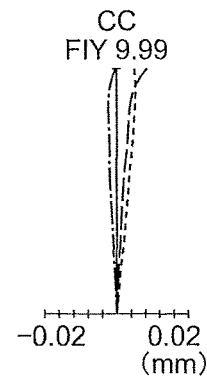
Figure 13E:
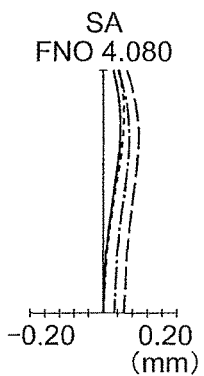
Figure 13F:
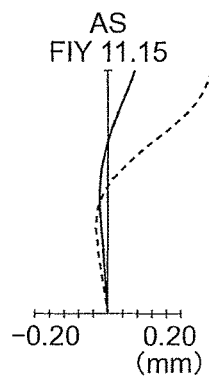
Figure 13G:
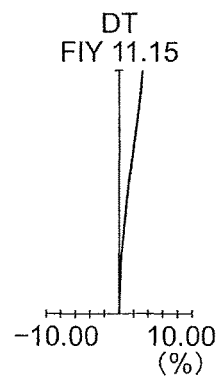
Figure 13H:
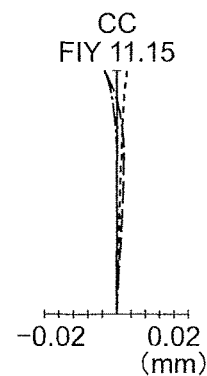
Figure 13I:
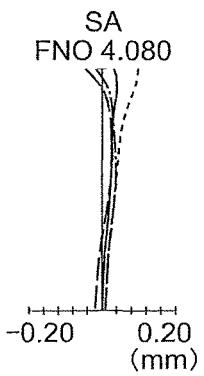
Figure 13J:
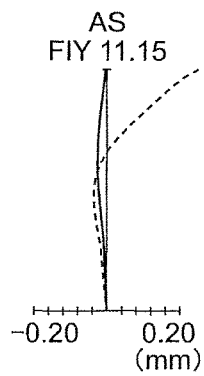
Figure 13K:
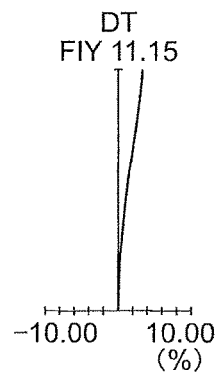
Figure 13L:
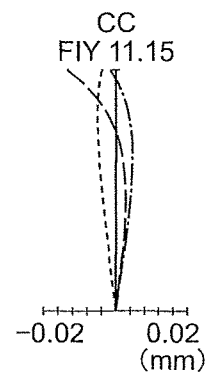

Prior to the explanation of examples, action and effect of embodiments according to certain aspects of the present invention will be described below. In the explanation of the action and effect of the embodiments concretely, the explanation will be made by citing concrete examples. However, similar to a case of the examples to be described later, aspects exemplified thereof are only some of the aspects included in the present invention, and there exists a large number of variations in these aspects. Consequently, the present invention is not restricted to the aspects that will be exemplified.

A basic arrangement of a zoom lens according to the present embodiment (hereinafter, referred to as 'basic arrangement of the present embodiment') will be described below.

In the basic arrangement of the present embodiment, the zoom lens includes a front-side lens unit, a rear-side lens unit, and an aperture stop, and the front-side lens unit includes either one lens unit having a negative refractive power or two lens units having a negative refractive power, and has a negative refractive power as a whole, the rear-side lens unit is disposed on an image side of the front-side lens unit, and has a positive refractive power as a whole at a telephoto end, and the rear-side lens unit includes a plurality of lens units, and includes an object-side positive lens unit having a positive refractive power which is disposed nearest to object, and a distance between the front-side lens unit and the object-side positive lens unit changes to become narrower at the telephoto end than at a wide angle end, and the aperture stop is disposed on the image side of the front-side lens unit.

It is preferable that the zoom lens have a wide angle of view at a wide angle end, and a high zoom ratio. The wide angle of view is an angle of view for which, a half angle of view is more than 38 degrees, or furthermore, more than 40 degrees. Such a wide angle of view, sometimes, is also called as a super-wide angle of view. Moreover, the high zoom ratio is a zoom ratio of more than six times for example. However, a value of the angle of view and a value of the zoom ratio are not restricted to these values.

In the basic arrangement of the present embodiment, the rear-side lens unit is disposed on the image side of the front-side lens unit having a negative refractive power. Here, the object-side positive lens unit having a positive refractive power is disposed nearest to object in the rear-side lens unit. Consequently, by the front-side lens unit having a negative refractive power and the object-side positive lens unit having a positive refractive power, it is possible to achieve a zooming effect.

Furthermore, by changing the distance between the front-side lens unit and the object-side positive lens unit such that the distance becomes narrower at the telephoto end than at the wide angle end, it is possible to improve the zooming effect. Moreover, since the rear-side lens unit includes the plurality of lens units, it is possible to correct favorably a fluctuation in a curvature of field and a fluctuation in a spherical aberration at the time of zooming.

Moreover, by disposing the aperture stop on the image side of the front-side lens unit, a small-sizing of a diameter of the rear-side lens unit is facilitated.

In such manner, according to the basic arrangement of the present embodiment, it is possible to secure a wide angle of view at the wide angle end, and to shorten the overall length of the optical system and moreover, to achieve a high zoom ratio.

Zoom lenses from a zoom lens according to a first embodiment up to a zoom lens according to a fifth embodiment will be described below.

A zoom lens according to the first embodiment has the abovementioned basic arrangement, and the following conditional expressions (1), (2), and (3) are satisfied:

$$1.2 \leq |MG_{B\_t}| \leq 6 \quad (1)$$

$$10 \leq vd_{Gn\_min\_p} \leq 27 \quad (2), \text{ and}$$

$$-0.03 \leq Tp_{Gn\_min\_p} \leq 0.014 \quad (3)$$

where, $MG_{B\_t}$ denotes a lateral magnification at the telephoto end of the rear-side lens unit, $vd_{Gn\_min\_p}$ denotes a minimum Abbe number from among Abbe numbers for positive lenses in the front-side lens unit, $Tp_{Gn\_min\_p} = \theta gF_{Gn\_p} - (-0.0016 \times vd_{Gn\_p} + 0.6415)$, here $\theta gF_{Gn\_p} = (ng_{Gn\_p} - nF_{Gn\_p})/(nF_{Gn\_p} - nC_{Gn\_p})$, $vd_{Gn\_p}$ denotes Abbe number for a predetermined positive lens in the front-side lens unit, $ng_{Gn\_p}$, $nF_{Gn\_p}$, and $nC_{Gn\_p}$ are refractive indices of the predetermined positive lens in the front-side lens unit for a g-line, an F-line, and a C-line respectively, and the predetermined positive lens in the front-side lens unit is a positive lens for which Abbe number is the minimum, from among the positive lenses in the front-side lens unit.

By improving the lateral magnification of the rear-side lens unit, it is possible to make a focal length on a telephoto side long while securing a wide angle of view at a wide angle side. Accordingly, it becomes possible to widen the angle of view and to achieve a high zooming ratio. However, when the lateral magnification of the rear-side lens unit is improved, sometimes an aberration is deteriorated. For this, it is preferable to satisfy conditional expression (1).

By making so as not to fall below a lower limit value of conditional expression (1), it becomes easy to achieve a high zooming ratio. By making so as not to exceed an upper limit value of conditional expression (1), it is possible to suppress outspreading of various aberrations, mainly the curvature of field, the spherical aberration, a chromatic aberration of magnification, and a longitudinal chromatic aberration, occurring in the front-side lens unit. As a result, a favorable imaging performance is achieved.

Moreover, by making the negative refractive power of the front-side lens unit large, it is possible to make the zoom ratio high. Due to this, since it is possible to shorten the overall length of the optical system and to make a diameter of the front-side lens unit small, it is possible to make the optical system small-sized.

However, in the front-side lens unit, sometimes, mainly the chromatic aberration of magnification occurs near the wide angle end, and the longitudinal chromatic aberration occurs near the telephoto end. Since the front-side lens unit has a negative refractive power, for correcting a chromatic aberration of the front-side lens unit, it is preferable to let Abbe number for the positive lens to be on a high-dispersion side as much as possible. Letting Abbe number to be on the high-dispersion side refers to making Abbe number small or making the dispersion large. For this, it is preferable to satisfy conditional expression (2).

By making so as not to fall below a lower limit value of conditional expression (2), it is possible to suppress the correction of chromatic aberration from being excessive. By making so as not to exceed an upper limit value of conditional expression (2), it is possible to prevent the correction of the chromatic aberration from being inadequate. As a result, it is possible to achieve a favorable imaging performance.

Moreover, when the refractive power of the front-side lens unit is made large, due to this, sometimes a secondary spectrum occurs substantially. Therefore, for maintaining a state in which the chromatic aberration is suppressed favorably throughout the entire zoom range, it is effective to use a glass material having a characteristic that enables to reduce the occurrence of the secondary spectrum for the positive lens in the front-side lens unit.

In particular, when an attempt is made to make F-number a small value such as the F-number of 5.0 and smaller over the entire zoom range, there is a large effect on the imaging performance. For this, it is preferable to satisfy conditional expression (3).

By making so as not to fall below a lower limit value of conditional expression (3), it is possible to correct adequately the secondary spectrum that occurs in the front-side lens unit. In this case, since it is possible to suppress an increase of occurrence in the longitudinal chromatic aberration and the chromatic aberration of magnification, it is possible to achieve a favorable imaging performance. By making so as not to exceed an upper limit value of conditional expression (3), since it is possible to weaken the tendency of the correction of the secondary spectrum in the front-side lens unit becoming excessive, it is possible to correct the longitudinal chromatic aberration and the chromatic aberration of magnification in a balanced manner.

A zoom lens according to a second embodiment has the abovementioned basic arrangement, and the following conditional expressions (1'), (3'), and (4) are satisfied:

$$1.26 \leq |MG_{B\_t}| \leq 7 \quad (1')$$

$$-0.015 \leq Tp_{Gn\_min\_p} \leq 0.014 \quad (3'), \text{ and}$$

$$2.3 \leq |MG_{B\_t}|/|MG_{B\_w}| \leq 7.0 \quad (4)$$

where, $MG_{B\_t}$ denotes a lateral magnification at the telephoto end of the rear-side lens unit, $$Tp_{Gn\_min\_p} = \theta gF_{Gn\_p} - (-0.0016 \times vd_{Gn\_p} + 0.6415), \text{ here}$$

$$\theta gF_{Gn\_p} = (ng_{Gn\_p} - nF_{Gn\_p})/(nF_{Gn\_p} - nC_{Gn\_p}),$$

$vd_{Gn\_p}$ denotes Abbe number for a predetermined positive lens in the front-side lens unit, $ng_{Gn\_p}$, $nF_{Gn\_p}$, and $nC_{Gn\_p}$ are refractive indices of the predetermined positive lens in the front-side lens unit for a g-line, an F-line, and a C-line respectively, the predetermined positive lens in the front-side lens unit is a positive lens for which Abbe number is the minimum, from among the positive lenses in the front-side lens unit, and $MG_{B\_w}$ denotes a lateral magnification at the wide angle end of the rear-side lens unit.

Technical significance of conditional expression (1') is same as the technical significance of conditional expression (1). Moreover, technical significance of conditional expression (3') is same as the technical significance of conditional expression (3).

As mentioned above, by improving the zooming effect of the rear-side lens unit, it is possible to improve the zoom ratio. However, when the zooming effect of the rear-side lens unit is improved, sometimes an aberration is deteriorated. Therefore, it is preferable to satisfy conditional expression (4).

By making so as not to fall below a lower limit value of conditional expression (4), the zooming effect does not become excessively small. Consequently, it becomes easy to achieve a high zoom ratio such as zoom ratio more than six times. By making so as not to exceed an upper limit value of conditional expression (4), the zooming effect in the rear-side lens unit does not become excessively large. Consequently, it is possible to suppress an increase in fluctuation of the spherical aberration mainly in the zoom range from an intermediate state up to the telephoto end.

A zoom lens according to a third embodiment has the abovementioned basic arrangement, and includes a first lens unit having a positive refractive power, and the first lens unit is disposed on an object side of the front-side lens unit, and a distance between the first lens unit and the front-side lens unit changes to become wider at the telephoto end than at the wide angle end, and the following conditional expressions (2') and (3) are satisfied:

$$15 \leq vd_{Gn\_p} \leq 27 \quad (2'), \text{ and}$$

$$-0.03 \leq Tp_{Gn\_min\_p} \leq 0.014 \quad (3)$$

where, $vd_{Gn\_min\_p}$ denotes the minimum Abbe number from among Abbe numbers for positive lenses in the front-side lens unit, $$Tp_{Gn\_min\_p} = \theta gF_{Gn\_p} - (-0.0016 \times vd_{Gn\_p} + 0.6415), \text{ here}$$

$$\theta gF_{Gn\_p} = (ng_{Gn\_p} - nF_{Gn\_p})/(nF_{Gn\_p} - nC_{Gn\_p}),$$

$vd_{G\_p}$ denotes Abbe number for a predetermined positive lens in the front-side lens unit, $ng_{Gn\_p}$, $nF_{Gn\_p}$, and $nC_{Gn\_p}$ are refractive indices of the predetermined positive lens in the front-side lens unit for a g-line, an F-line, and a C-line respectively, and the predetermined positive lens in the front-side lens unit is a positive lens for which Abbe number is the minimum, from among the positive lenses in the front-side lens unit.

In the zoom lens according to the third embodiment, the first lens unit having a positive refractive power is disposed on the object side of the front-side lens unit having a negative refractive power. Consequently, by the front-side lens unit having a negative refractive power and the first lens unit having a positive refractive power, it is possible to achieve the zooming effect.

Furthermore, by changing the distance between the first lens unit and the front-side lens unit such that the distance becomes wider at the telephoto end than at the wide angle end, it is possible to improve the zooming effect.

For shortening the overall length of the optical system, the optical system is to be arranged to include a telephoto arrangement, and the effect achieved by the telephoto arrangement is to be enhanced. In the zoom lens according to the third embodiment, the effect achieved by the telephoto arrangement can be enhanced by the first lens unit and the front-side lens unit. As a result, shortening of the overall length of the optical system is facilitated near the telephoto end.

Technical significance of conditional expression (2') is same as the technical significance of conditional expression (2). Moreover, since conditional expression (3) has already been explained, description thereof is omitted here.

A zoom lens according to the fourth embodiment has the abovementioned basic arrangement, and includes a first lens unit having a positive refractive power, and the first lens unit is disposed on the object side of the front-side lens unit, and a distance between the first lens unit and the front-side lens unit changes to become wider at the telephoto end than at a wide angle end, and the following conditional expressions (3"), (5), and (6) are satisfied:

$$-0.03 \leq Tp_{Gn\_min\_p} \leq 0.016 \quad (3''),$$

$$70.3 \leq vd_{1G\_max\_p} \quad (5), \text{ and}$$

$$54 \leq vd_{Gn\_max\_n} \quad (6)$$

where, $$Tp_{Gn\_min\_p} = \theta gF_{Gn\_p} - (-0.0016 \times vd_{Gn\_p} + 0.6415), \text{ here}$$

$$\theta gF_{Gn\_p} = (ng_{Gn\_p} - nF_{Gn\_p})/(nF_{Gn\_p} - nC_{Gn\_p}),$$

$vd_{Gn\_p}$ denotes Abbe number for a predetermined positive lens in the front-side lens unit, $ng_{Gn\_p}$, $nF_{Gn\_p}$, and $nC_{Gn\_p}$ are refractive indices of the predetermined positive lens in the front-side lens unit for a g-line, an F-line, and a C-line respectively, the predetermined positive lens in the front-side lens unit is a positive lens for which Abbe number is the minimum, from among the positive lenses in the front-side lens unit, $vd_{1G\_max\_p}$ denotes a maximum Abbe number from among Abbe numbers for positive lenses in the first lens unit, and $vd_{Gn\_max\_n}$ denotes a maximum Abbe number from among Abbe numbers for negative lenses in the front-side lens unit.

Technical significance of conditional expression (3") is same as the technical significance of conditional expression (3).

As described above, it is preferable that the zoom lens have a wide angle of view at the wide angle end, and a high zoom ratio. Particularly, in a zoom lens with a high zoom ratio such as a zoom lens having the zoom ratio of more than six times, sometimes, both an amount of occurrence of the chromatic aberration of magnification at the wide angle end and an amount of occurrence of the longitudinal chromatic aberration at the telephoto end increase. The chromatic aberration that occurs near the telephoto end in the first lens unit is enhanced substantially in a lens unit positioned on the image side of the first lens unit. Therefore, by satisfying conditional expression (5), it is possible to suppress the occurrence of the chromatic aberration.

By making so as not to fall below a lower limit value of conditional expression (5), it is possible to prevent the correction of the chromatic aberration of magnification in the first lens unit from being inadequate. Therefore, it is possible to suppress an increase of occurrence in the longitudinal chromatic aberration near the telephoto end. As a result, it is possible to achieve a favorable imaging performance.

As described above, for shortening the overall length of the optical system, it is preferable to make the refractive power of the front-side lens unit large. However, when the refractive power of the front-side lens unit is made large, sometimes, mainly the chromatic aberration of magnification occurs near the wide angle end and the longitudinal chromatic aberration occurs near the telephoto end. For correcting the chromatic aberration of the front-side lens unit having a negative refractive power, it is preferable to let Abbe number for the positive lens to be used in the front-side lens unit to be on the high-dispersion side and to let Abbe number for the negative lens to be used in the front-side lens unit to be on a low-dispersion side. For this, it is preferable to satisfy conditional expression (6).

By making so as not to fall below a lower limit value of conditional expression (6), it is possible to correct adequately both the chromatic aberration of magnification near the wide angle end and the longitudinal chromatic aberration near the telephoto end. As a result, it is possible to achieve a favorable imaging performance.

Moreover, it is preferable that the zoom lens according to the first embodiment and the zoom lens according to the second embodiment include a first lens unit having a positive refractive power, and the first lens unit is disposed on the object side of the front-side lens unit, and a distance between the first lens unit and the front-side lens unit changes to become wider at the telephoto end than at the wide angle end.

With the first lens unit and the front-side lens unit, it is possible to improve the zooming effect.

Moreover, in the zoom lenses according to the first embodiment to the fourth embodiment (hereinafter, referred to as 'zoom lens according to the present embodiment'), it is preferable that the front-side lens unit include a first sub-unit having a negative refractive power, and a second sub-unit having a negative refractive power, and at a time of focusing, a distance between the first sub-unit and the second sub-unit change.

By including the first sub-unit and the second sub-unit in the front-side lens unit it is possible to let the negative refractive power of the front-side lens unit to be shared by the two sub-units. Accordingly, it is possible to suppress an occurrence of aberration in the front-side lens unit.

Moreover, it is possible to carry out focusing by changing the distance between the first sub-unit and the second sub-unit. When the aperture stop is positioned between the front-side lens unit and the rear-side lens unit, the second sub-unit is positioned near the aperture stop. Since a light beam becomes small near the aperture stop, it is possible to make a diameter of the second sub-unit small. Therefore, by carrying out focusing by moving the second sub-unit, small-sizing and light-weighting of a focusing unit are facilitated. As a result, a high-speed autofocusing becomes possible.

Moreover, in the zoom lens according to the present embodiment, it is preferable that the front-side lens unit include a first sub-unit having a negative refractive power, and a second sub-unit having a negative refractive power, and at the time of zooming, a distance between the first sub-unit and the second sub-unit change.

In order to improve the zoom ratio, it is necessary to make the refractive power of the front-side lens unit large. However, when the refractive power of the front-side lens unit is made large, a tendency of a change in the curvature of field at the time of zooming increasing becomes strong. Therefore, the front-side lens unit is let to include the first sub-unit and the second sub-unit, and the distance between the first sub-unit and the second sub-unit is let to be variable. By making such arrangement, it becomes easy to carry out high zooming ratio while suppressing an increase in the fluctuation of the curvature of field at the time of zooming.

Moreover, in the zoom lens according to the present embodiment, it is preferable that the following conditional expression (4') be satisfied:

$$1.8 \leq |MG_{B\_t}|/|MG_{B\_w}| \leq 7.0 \qquad (4')$$

where, $MG_{B\_t}$ denotes the lateral magnification at the telephoto end of the rear-side lens unit, and $MG_{B\_w}$ denotes the lateral magnification at the wide angle end of the rear-side lens unit.

Technical significance of conditional expression (4') is same as the technical significance of conditional expression (4).

Moreover, in the zoom lens according to the present embodiment, it is preferable that the following conditional expression (1") be satisfied:

$$1.2 \leq |MG_{B\_t}| \leq 7.0 \qquad (1")$$

where, $MG_{B\_t}$ denotes the lateral magnification at the telephoto end of the rear-side lens unit.

Technical significance of conditional expression (1") is same as the technical significance of conditional expression (1).

Moreover, in the zoom lens according to the present embodiment, it is preferable that the following conditional expression (7) be satisfied:

$$0.3 \leq |f_{Gn}/f_{GBp1}| \leq 0.89 \qquad (7)$$

where, $f_{Gn}$ denotes a focal length of the front-side lens unit, and $f_{GBp1}$ denotes a focal length of the object-side positive lens unit.

As mentioned above, it is possible to achieve a large zooming effect by the front-side lens unit and the object-side positive lens unit. For improving the zoom ratio and shortening the overall length of the optical system, it is preferable to make both the refractive power of the front-side lens unit and the refractive power of the object-side positive lens unit large. However, since the aperture stop is disposed on the image side of the front-side lens unit, when the negative refractive power of the front-side lens unit is made large, a tendency of a diameter of the aperture stop increasing becomes strong. Therefore, tendency of both a stop unit and an optical system positioned on the image side of the stop unit becoming large, becomes strong.

Moreover, in a case in which a lens unit is disposed on the object side of the front-side lens unit, since the refractive power on an incidence-side of the front-side lens unit becomes large, a tendency of a diameter of the lens unit on the object side of the front-side lens unit increasing becomes strong. For shortening the overall length of the optical system and making a diameter of the optical system small, it is preferable to balance both the refractive power of the front-side lens unit and the refractive power of the object-side positive lens unit while making them large. For this, it is preferable to satisfy conditional expression (7).

By making so as not to fall below a lower limit value of conditional expression (7), it becomes easy to make the diameter of the optical system small. Or, shortening the overall length of the optical system becomes easy. Moreover, since the refractive power of the front-side lens unit does not become excessively large, it becomes easy to suppress an occurrence of the curvature of field. By making so as not to exceed an upper limit value of conditional expression (7), shortening the overall length of the optical system becomes easy. Or, it becomes easy to secure adequate back focus. Moreover, since the refractive power of the object-side positive lens unit does not become excessively large, it becomes easy to suppress an occurrence of the spherical aberration from the wide angle end up to the telephoto end.

Moreover, it is preferable that the zoom lens according to the present embodiment include the first lens unit having a positive refractive power, and the first lens unit is disposed on the object side of the front-side lens unit, and the following conditional expressions (8) is satisfied:

$$2.8 \leq f_1/f_{GBp1} \leq 6.3 \qquad (8)$$

where, $f_1$ denotes a focal length of the first lens unit, and $f_{GBp1}$ denotes the focal length of the object-side positive lens unit.

As mentioned above, in the basic arrangement, mainly the front-side lens unit and the object-side positive lens unit are responsible for the zooming effect, but the first lens unit also contributes to enhancement of the zooming effect. For such reason, for achieving a high zoom ratio and shortening the overall length of the optical system, it is preferable to make the refractive power of the object-side positive lens unit large as well as to make large the refractive power of the first lens unit.

However, when the refractive power of the first lens unit is made large, since a position of an entrance pupil with respect to the first lens unit, moves further toward the image side and away from the first lens unit, a diameter of the first lens unit increases. Therefore, for shortening the overall length of the optical system and making small the diameter of the optical system, it is preferable to balance the refractive power of the first lens unit and the refractive power of the object-side positive lens unit while making them larger. For this, it is preferable to satisfy conditional expression (8).

By making so as not to fall below a lower limit value of conditional expression (8), it becomes easy to make the diameter of the optical system small or to shorten the overall length of the optical system. By making so as not to exceed an upper limit value of conditional expression (5), it becomes easy to shorten the overall length of the optical system. Or, it becomes easy either to secure an appropriate back focus.

Moreover, in the zoom lens according to the present embodiment, it is preferable that the following conditional expression (9) be satisfied:

$$1.05 \leq |\Phi_{maxt}/f_{Gn}| \leq 3.0 \qquad (9)$$

where, $\Phi_{maxt}$ denotes a maximum diameter of an entrance pupil at a telephoto end, and is expressed by $\Phi_{maxt}=f_t/Fno_t$, here $f_t$ denotes a focal length of the overall zoom lens system at the telephoto end, and $Fno_t$ denotes a smallest F-number at the telephoto end, and $f_{Gn}$ denotes the focal length of the front-side lens unit.

As mentioned above, for small-sizing of the optical system, it is necessary to make the refractive power of the front-side lens unit large. However, when the refractive power of the front-side lens unit is made large, sometimes, mainly amounts of occurrence of the spherical aberration, the curvature of field, the chromatic aberration of magnification, and the longitudinal chromatic aberration become large. Therefore, for suppressing the occurrence of these aberrations and making the F-number small, it is preferable to satisfy conditional expression (9). By satisfying conditional expression (9), it is possible to realize an optical system with a small F-number.

By making so as not to fall below a lower limit value of conditional expression (9), it becomes easy to shorten the overall length of the optical system. By making so as not to exceed an upper limit value of conditional expression (9), it is possible to suppress an increase of aberrations in the front-side lens unit, or in other words, mainly an increase in an amounts of occurrence of the spherical aberration, the curvature of field, the chromatic aberration of magnification, and the longitudinal chromatic aberration. In this case, since it is not necessary to increase the number of lenses for aberration correction in the front-side lens unit, small-sizing of the optical system is facilitated.

Moreover, in the zoom lens according to the present embodiment, it is preferable that the front-side lens unit include at least a negative lens and a positive lens, and the following conditional expression (6) be satisfied:

$$54 \leq vd_{Gn\_max\_n} \quad (6)$$

where, $vd_{Gn\_max\_n}$ denotes the maximum Abbe number from among Abbe numbers for negative lenses in the front-side lens unit.

Since the technical significance of conditional expression (6) has already been explained, the description thereof is omitted here.

Moreover, in the zoom lens according to the present embodiment, it is preferable that the first lens unit include at least a negative lens and a positive lens, and the following conditional expression (5) be satisfied:

$$70.3 \leq vd_{1G\_max\_p} \quad (5)$$

where, $vd_{1G\_max\_p}$ denotes the maximum Abbe number from among Abbe numbers for positive lenses in the first lens unit.

Since the technical significance of conditional expression (5) has already been explained, the description thereof is omitted here.

Moreover, in the zoom lens according to the present embodiment, it is preferable that the following conditional expression (10) be satisfied:

$$-0.012 \leq Tp_{Gn\_max\_n} \leq 0.06 \quad (10)$$

where, $Tp_{Gn\_max\_n} = \theta gF_{Gn\_n} - (-0.0016 \times vd_{Gn\_n} + 0.6415)$, here $\theta gF_{Gn\_n} = (ng_{Gn\_n} - nF_{Gn\_n})/(nF_{Gn\_n} - nC_{Gn\_n})$, $vd_{Gn\_n}$ denotes Abbe number for a predetermined negative lens in the front-side lens unit, $ng_{Gn\_n}$, $nF_{Gn\_n}$, and $nC_{Gn\_n}$ denote refractive indices of the predetermined negative lens in the front-side lens unit, for a g-line, for an F-line, and for a C-line respectively, and the predetermined negative lens in the front-side lens unit is a lens for which Abbe number is the largest, from among the negative lenses in the front-side lens unit.

In the front-side lens unit, mainly the chromatic aberration of magnification occurs near the wide angle end and the longitudinal chromatic aberration occurs near the telephoto end. For suppressing the chromatic aberration of the front-side lens unit having a negative refractive power, it is preferable to let Abbe number for the positive lens to be used in the front-side lens unit to be on the high-dispersion side as much as possible.

However, when the refractive power of the front-side lens unit is made large in a state of Abbe number for the positive lens let to be on the high-dispersion side, due to this, the tendency of the secondary spectrum occurring substantially becomes strong. Therefore, for maintaining a state in which the chromatic aberration has been suppressed favorably throughout the entire zoom range, it is effective to use a glass material having a characteristic of being capable of correcting the secondary spectrum for the negative lens in the front-side lens unit. For this, it is preferable to satisfy conditional expression (10).

By making so as not to fall below a lower limit value of conditional expression (10), it is possible to correct adequately the secondary spectrum that occurs in the front-side lens unit. In this case, since it is possible to suppress an increase of occurrence in the longitudinal chromatic aberration and the chromatic aberration of magnification, a favorable imaging performance is achieved. By making so as not to exceed an upper limit value of conditional expression (10), since it is possible to weaken the tendency of the correction of the secondary spectrum in the front-side lens unit becoming excessive, it is possible to correct the longitudinal chromatic aberration and the chromatic aberration of magnification in a balanced manner.

Moreover, in the zoom lens according to the present embodiment, it is preferable that the object-side positive lens unit include at least a negative lens and a positive lens, and the following conditional expression (11) be satisfied:

$$60.0 \leq vd_{GBp1\_max\_p} \quad (11)$$

where, $vd_{GBp1\_max\_p}$ denotes the maximum Abbe number from among Abbe numbers for the positive lenses in the object-side positive lens unit.

For shortening the overall length of the optical system, it is preferable to make the refractive power of the object-side positive lens unit large. However, when the refractive power of the object-side positive lens unit is made large, sometimes, mainly the longitudinal chromatic aberration occurs near the telephoto end. For correcting the chromatic aberration of the object-side positive lens unit having a positive refractive power, it is preferable to let Abbe number for the positive lens to be used in the object-side positive lens unit to be on the low-dispersion side and to let Abbe number for the negative lens to be used in the object-side positive lens unit to be on the high-dispersion side. For this, it is preferable to satisfy conditional expression (11).

By making so as not to fall below a lower limit value of conditional expression (11), it is possible to correct adequately the longitudinal chromatic aberration near the telephoto end. As a result, it is possible to achieve a favorable imaging performance. Or, since the refractive power of the object-side positive lens unit does not become excessively small, it becomes easy to shorten the overall length of the optical system.

Moreover, in the zoom lens according to the present embodiment, it is preferable that the following conditional expression (12) be satisfied:

$$0.005 \leq Tp_{GBp1\_max\_p} \leq 0.06 \quad (12)$$

where, $Tp_{GBp1\_max\_p} = \theta gF_{GBp1\_p} - (-0.0016 \times vd_{GBp1\_p} + 0.6415)$, here $$\theta gF_{GBp1\_p} = (ng_{GBp1\_p} - nF_{GBp1\_p})/(nF_{GBp1\_p} - nC_{GBp1\_p}),$$

$vd_{GBp1\_p}$ denotes Abbe number for a predetermined positive lens in the object-side positive lens unit, $ng_{GBp1\_p}$, $nF_{GBp1\_p}$, and $nC_{GBp1\_p}$ denote refractive indices of the predetermined positive lens in the object-side positive lens unit, for a g-line, for an F-line, and for a C-line respectively, and the predetermined positive lens in the object-side positive lens unit is a lens for which Abbe number is the largest, from among the positive lenses in the third lens unit.

For shortening the overall length of the optical system, it is preferable to make the refractive power of the object-side positive lens unit large. However, when the refractive power of the object-side positive lens unit is made large, sometimes, mainly the longitudinal chromatic aberration occurs near the telephoto end. For correcting the chromatic aberration of the object-side positive lens unit having a positive refractive power, it is preferable to let Abbe number for the positive lens to be used in the object-side positive lens unit to be on the low-dispersion side and to let Abbe number for the negative lens to be used in the object-side positive lens unit to be on the high-dispersion side.

However, when the refractive power of the object-side positive lens unit is made large in such state, due to this, the tendency of the secondary spectrum and the spherical aberration occurring substantially becomes strong. Therefore, for maintaining a state in which the chromatic aberration is suppressed favorably throughout the entire zoom range, it is effective to use a glass material having a characteristic that enables to reduce the occurrence of the secondary spectrum and the spherical aberration for the positive lens in the object-side positive lens unit. For this, it is preferable to satisfy conditional expression (12).

By making so as not to fall below a lower limit value of conditional expression (12), it is possible to correct adequately the second spectrum that occurs in the object-side positive lens unit. In this case, since it is possible to suppress an increase of occurrence in the longitudinal chromatic aberration and the chromatic aberration of magnification, a favorable imaging performance is achieved. By making so as not to exceed an upper limit value of conditional expression (12), it is possible to weaken the tendency of the correction of the secondary spectrum in the object-side positive lens unit becoming excessive. As a result, it is possible to correct the secondary spectrum and the spherical aberration, with the lesser number of lenses.

Moreover, in the zoom lens according to the present embodiment, it is preferable that the rear-side lens unit include an object-side negative lens unit having a negative refractive power, and the object-side negative lens unit be disposed on the image side of the object-side positive lens unit, and the object-side negative lens unit move to be positioned on the object side at the telephoto end than at the wide angle end.

By making such arrangement, it is possible to improve the zooming effect in the object-side negative lens unit. As a result, it is possible to make the zoom ratio high easily.

In the zoom lens according to the present embodiment, among diameters of all lens units, a diameter of the first lens unit is the maximum. Therefore, it is preferable to dispose an image-side lens unit having a positive refractive power on the image side of the object-side negative lens unit. When such arrangement is made, since the object-side negative lens unit has a negative refractive power, it is possible to form a magnifying optical system by the object-side negative lens unit and the image-side lens unit. Consequently, it is possible to make a lens diameter in a first lens unit small.

Moreover, in the zoom lens according to the present embodiment, it is preferable that rear-side lens unit include an object-side negative lens unit having a negative refractive power, the object-side negative lens unit include at least a negative lens and a positive lens, and the following conditional expression (13) be satisfied:

$$6.0 \leq vd_{GBn1\_max\_n} - vd_{GBn1\_min\_p} \leq 45 \quad (13)$$

where, $vd_{GBn1\_max\_n}$ denotes a maximum Abbe number from among Abbe numbers for the negative lenses in the object-side negative lens unit, and $vd_{GBn1\_min\_p}$ denotes a minimum Abbe number from among Abbe numbers for the positive lenses in the object-side negative lens unit.

By an imaging magnification of the object-side negative lens unit becoming high, mainly, sometimes amounts of occurrence of the longitudinal chromatic aberration and the spherical aberration become large. For securing a favorable imaging performance throughout the entire zoom range, it is preferable to correct these aberrations. For this, it is preferable to satisfy conditional expression (13).

By making so as not to fall below a lower limit value of conditional expression (13), it is possible to correct the longitudinal chromatic aberration adequately. As a result, it is possible to achieve a favorable imaging performance. By making so as not to exceed an upper limit value of conditional expression (13), it becomes easy to correct both the chromatic aberration and the spherical aberration. As a result, it is possible to achieve a favorable imaging performance.

Moreover, as described above, it is preferable to dispose an image-side lens unit on the image side of the object-side negative lens unit. In the object-side negative lens unit having a negative refractive power, by a combination with the image-side lens unit, it is possible to enhance an effect of correcting mainly the curvature of field. Accordingly, it is possible to secure a favorable imaging performance throughout the entire zoom range.

Moreover, in the zoom lens according to the present embodiment, it is preferable that the following conditional expression (14) be satisfied:

$$1.0 \leq LTL_t/f_t \leq 2.8 \quad (14)$$

where, $LTL_t$ denotes a total length of the overall zoom lens system at the telephoto end, and $f_t$ denotes the focal length of the overall zoom lens system at the telephoto end.

By making so as not to fall below a lower limit value of conditional expression (14), it is possible to achieve an adequate space for a movement of each lens unit at the time of zooming. As a result, it is possible to achieve a high zoom ratio such as a zoom ratio of more than six times. Moreover, since it is not necessary to make the refractive power of each lens unit large forcedly, it is possible to suppress deterioration of an aberration.

By making so as not to exceed an upper limit value of conditional expression (14), it is possible to suppress an increase in the diameter of the first lens unit at the telephoto end. As a result, it becomes easy to shorten the overall length of the optical system and to small-size the diameter of the optical system. Moreover, since it is possible to suppress an increase in an amount of movement of the first lens unit as well as to suppress an increase in the number of frames of the lens units which move, it becomes easy to make the diameter of the optical system small.

Moreover, in the zoom lens according to the present embodiment, it is preferable that the following conditional expression (15) be satisfied:

$$0.7 \leq LTL_w/f_t \leq 2.2 \quad (15)$$

where, $LTL_w$ denotes a total length of the overall zoom lens system at the wide angle end, and $f_t$ denotes the focal length of the overall zoom lens system at the telephoto end.

By making so as not to fall below a lower limit value of conditional expression (15), it is possible to achieve an adequate space for a movement of each lens unit at the time of zooming. As a result, it is possible to achieve a high zoom ratio such as a zoom ratio of more than six times. Moreover, since it is possible to suppress an increase in the amount of movement of the first lens unit as well as to suppress an increase in the number of frames of the lens units which move, it becomes easy to make the diameter of the optical system small. Moreover, since it is not necessary to make the refractive power of each lens unit large forcedly, it is possible to suppress deterioration of an aberration.

By making so as not to exceed an upper limit value of conditional expression (15), it is possible to suppress an increase in the diameter of the first lens unit at the wide angle end or to suppress an increase in the diameter of the front-side lens unit. As a result, it becomes easy to make the diameter of the optical system small.

Moreover, in the zoom lens according to the present embodiment, it is preferable that the following conditional expression (16) be satisfied:

$$0.7 \leq f_1/f_t \leq 1.6 \quad (16)$$

where, $f_1$ denotes the focal length of the first lens unit, and $f_t$ denotes the focal length of the overall zoom lens system at the telephoto end.

By making so as not to fall below a lower limit value of conditional expression (16), the refractive power of the first lens unit does not become excessively large. As a result, it becomes easy to make the diameter of the first lens unit small. Moreover, since the refractive power of the first lens unit does not become excessively large, it is possible to suppress an occurrence of the chromatic aberration. By making so as not to exceed an upper limit value of conditional expression (16), the refractive power of the first lens unit does not become excessively small. Consequently, it becomes easy to shorten the overall length of the optical system.

Moreover, in the zoom lens according to the present embodiment, it is preferable that the following conditional expression (17) be satisfied:

$$0.005 \leq Tp_{1G\_max\_p} \leq 0.06 \quad (17)$$

where, $Tp_{1G\_max\_p} = \theta gF_{1G\_p} - (-0.0016 \times vd_{1G\_p} + 0.6415)$, here $\theta gF_{1G\_p} = (ng_{1G\_p} - nF_{1G\_p})/(nF_{1G\_p} - nC_{1G\_p})$, $vd_{1G\_p}$ denotes Abbe number for a predetermined positive lens in the first lens unit, $ng_{1G\_p}$, $nF_{1G\_p}$, and $nC_{1G\_p}$ denote refractive indices of the predetermined positive lens in the first lens unit, for a g-line, for an F-line, and for a C-line respectively, and the predetermined positive lens in the first lens unit is a lens for which Abbe number is the largest, from among the positive lenses in the first lens unit.

For shortening the overall length of the optical system, it is preferable to make the refractive power of the first lens unit large. However, when the refractive power of the first lens unit is made large, sometimes, mainly the longitudinal chromatic aberration occurs near the telephoto end. For correcting the chromatic aberration of the first lens unit having a positive refractive power, it is preferable to let Abbe number for the positive lens to be used in the first lens unit to be on the low-dispersion side and to let Abbe number for the negative lens to be used in the first lens unit to be on the high-dispersion side.

However, when the refractive power of the first lens unit is made large in such state, due to this, the tendency of the secondary spectrum and the spherical aberration occurring substantially becomes strong. Therefore, for maintaining a state in which the chromatic aberration is suppressed favorably throughout the entire zoom range, it is effective to use a glass material having a characteristic that enables to reduce the occurrence of the secondary spectrum and the spherical aberration for the positive lens in the first lens unit. For this, it is preferable to satisfy conditional expression (17).

By making so as not to fall below a lower limit value of conditional expression (17), it is possible to correct adequately the secondary spectrum that occurs in the first lens unit. In this case, since it is possible to suppress an increase of occurrence in the longitudinal chromatic aberration and the chromatic aberration of magnification, a favorable imaging performance is achieved. By making so as not to exceed an upper limit value of conditional expression (17), it is possible to weaken the tendency of the correction of the secondary spectrum in the first lens unit becoming excessive. As a result, it is possible to secure appropriately a balance of correction of the secondary spectrum and correction of the spherical aberration, with the lesser number of lenses.

Moreover, in the zoom lens according to the present embodiment, it is preferable that the rear-side lens unit include an object-side negative lens unit having a negative refractive power, and the object-side negative lens unit be a focusing lens unit.

A diameter of a light beam incident on the object-side negative lens unit is small due to the positive refractive power of the object-side positive lens unit. Therefore, it is possible to make the object-side negative lens unit small-sized and light-weight. For this, when the object-side negative lens unit is let to be the focusing lens unit, since it is possible to move the lens unit at a high speed, it is possible to carry out focusing at a high speed.

Particularly, in a case in which conditional expression (13) is satisfied, even when the focusing is carried out by the object-side negative lens unit, it is possible to make small the fluctuation in the spherical aberration and the longitudinal chromatic aberration. Consequently, a favorable imaging performance is achieved even when focused to an object positioned at a close distance.

Moreover, it is preferable to make both the refractive power of the object-side positive lens unit and the refractive power of the object-side negative lens unit large. By making such arrangement, it is possible to improve a focusing sensitivity at the object-side negative lens unit and to make a diameter of the object-side negative lens unit small. As a result, it is possible to realize a small-sized and light-weight focusing unit.

Moreover, in the zoom lens according to the present embodiment, it is preferable that the front-side lens unit include at least two negative lenses and one positive lens.

By making the refractive power of the front-side lens unit large, a fluctuation mainly in the curvature of field and the spherical aberration due to zooming becomes large. Therefore, by letting the negative refractive power to be shared by a plurality of negative lenses in the front-side lens unit, it is possible to reduce fluctuation in these aberrations. It is preferable that the number of negative lenses sharing the negative refractive power be two.

In a case of letting the negative refractive power to be shared by two negative lenses, it is preferable to dispose two negative lenses on the object side. By making such arrangement, it is possible to correct the curvature of field more easily.

Moreover, in the zoom lens according to the present embodiment, it is preferable that the following conditional expression (18) be satisfied:

$$1.73 \leq nd_{Gn\_max\_n} \leq 2.3 \qquad (18)$$

where, $nd_{Gn\_max\_n}$ denotes a maximum refractive index from among refractive indices of the negative lenses in the front-side lens unit.

By satisfying conditional expression (18), it is possible to improve capability of correcting the curvature of field and the spherical aberration. Satisfying conditional expression (18) is even more effective for widening the angle of view at the wide angle end, and for high zooming ratio.

By making so as not to fall below a lower limit value of conditional expression (18), it is possible to achieve adequately an effect of correction of the curvature of field. By making so as not to exceed an upper limit value of conditional expression (18), it is possible to reduce the tendency of an overall image plane from being inclined toward a minus side. As a result, it is possible to achieve a favorable imaging performance.

Moreover, in the zoom lens according to the present embodiment, it is preferable that the front-side lens unit include a negative lens having a concave surface directed toward an image side, which is positioned nearest to object, and in the negative lens which is positioned nearest to object, an absolute value of a radius of curvature of an image-side surface be smaller as compared to an absolute value of a radius of curvature of an object-side surface, and the following conditional expression (19) be satisfied:

$$1.73 \leq nd_{Gn\_n1} \leq 2.3 \qquad (19)$$

where, $nd_{Gn\_n1}$ denotes a refractive index of the negative lens nearest to object in the front-side lens unit.

For making the F-number small as well as for facilitating high zooming ratio and shortening of the overall length of the optical system, it is preferable to make the refractive power of the front-side lens unit large. However, a change in a light-ray height at the time of zooming becomes large at a position nearest to object of the front-side lens unit. When the change in the light-ray height is large, a change in an angle of refraction of a light ray at a lens nearest to object becomes large. For this reason, when the refractive power of the front-side lens unit is made large, due to this, mainly a fluctuation in the curvature of field at the time of zooming becomes large.

Therefore, the negative lens having a concave surface directed toward the image side is disposed nearest to object in the front-side lens unit. Moreover, the absolute value of the radius of curvature of the image-side surface of the negative lens is let to be smaller as compared to the absolute value of the radius of curvature of the object-side surface. By making such arrangement, it is possible to ease the large change in the angle of refraction of a light ray at a lens surface at the time of zooming. As a result, it is possible to make small a fluctuation in the curvature of field at the time of zooming.

Moreover, by satisfying conditional expression (19), it is possible to further reduce the fluctuation in the curvature of field at the time of zooming. As a result, it is possible to make the F-number small throughout the entire zoom range as well as to achieve high zooming ratio, while maintaining a favorable imaging performance. The small F-number refers to an F-number of 5.0 or less for example, and the high zoom ratio refers to a zoom ratio of more than six times for example.

By making so as not to fall below a lower limit value of conditional expression (19), it is possible to achieve adequately an effect of correction of the curvature of field. By making so as not to exceed an upper limit value of conditional expression (19), it is possible to reduce the tendency of an overall image plane from being inclined toward a minus side. As a result, it is possible to achieve a favorable imaging performance.

Moreover, in the zoom lens according to the present embodiment, it is preferable that the front-side lens unit include in order from the object side to the image side, a negative lens having a concave surface directed toward the image side, a negative lens, and a positive lens having a convex surface directed toward the image side, and in the negative lens having the concave surface directed toward the image side, an absolute value of a radius of curvature of an image-side surface be smaller as compared to an absolute value of a radius of curvature of an object-side surface.

For making the F-number small as well as for facilitating high zooming ratio and shortening of the overall length of the optical system, it is preferable to make the refractive power of the front-side lens unit large. However, an increase in the refractive power of the front-side lens unit may cause an aberration fluctuation in the front-side lens unit at the time of zooming. Specifically, from the wide angle end to the telephoto end, mainly the curvature of field and the spherical aberration may fluctuate.

Therefore, by making the abovementioned arrangement for the front-side lens unit, it is possible to prevent an angle of refraction of a light ray at a lens surface from changing largely at the time of zooming. As a result, it is possible to maintain a state in which both the curvature of field and the spherical aberration are corrected favorably throughout the entire zoom range.

In such manner, according to the zoom lens of the present embodiment, it is possible to make the F-number small throughout the entire zoom range as well as to carry out high zooming ratio, while maintaining a favorable imaging performance. The small F-number refers to an F-number of 5.0 or less for example, and the high zoom ratio refers to a zoom ratio of more than six times for example.

Moreover, in the zoom lens according to the present embodiment, it is preferable that the front-side lens unit include a first sub-unit having a negative refractive power, and a second sub-unit having a negative refractive power, and the a first sub-unit include in order from the object side to the image side, a negative lens having a concave surface directed toward the image side, a negative lens, and a positive lens having a convex surface directed toward the image side, and in the negative lens having the concave surface directed toward the image side, an absolute value of a radius of curvature of an image-side surface be smaller as compared to an absolute value of a radius of curvature of an object-side surface.

For making the F-number small as well as for facilitating high zooming ratio and shortening of the overall length of the optical system, it is preferable to make the refractive power of the front-side lens unit large. However, an increase in the refractive power of the front-side lens unit may cause an aberration fluctuation in the front-side lens unit at the time of zooming. Specifically, from the wide angle end to the telephoto end, mainly the curvature of field and the spherical aberration may fluctuate.

Therefore, by making the abovementioned arrangement for the first sub-unit, it is possible to prevent an angle of refraction of a light ray at a lens surface from changing largely at the time of zooming. As a result, it is possible to maintain a state in which both the curvature of field and the spherical aberration are corrected favorably throughout the entire zoom range.

In such manner, according to the zoom lens of the present embodiment, it is possible to make the F-number small throughout the entire zoom range as well as to carry out high zooming ratio, while maintaining a favorable imaging performance. The small F-number refers to an F-number of 5.0 or less for example, and the high zoom ratio refers to a zoom ratio of more than six times for example.

Moreover, when the first sub-unit is arranged in such manner, it is possible to reduce an aberration occurring in the second sub-unit even when the second sub-unit is arranged by one negative lens, or by two lenses which are a negative lens and a positive lens. Accordingly, even when the focusing is carried out by moving the second sub-unit, an aberration fluctuation due to the movement of the second sub-unit becomes small. Moreover, since it is possible lessen the number of lenses in the second sub-unit, it is possible to make the second sub-unit light-weight. As a result, it is possible to make the focusing speed high.

Moreover, it is preferable that the zoom lens according to the present embodiment include in order from an object side, a first lens unit having a positive refractive power, the front-side lens unit, the object-side positive lens unit, an object-side negative lens unit having a negative refractive power, and an image-side lens unit having a positive refractive power, and at the time of zooming, distances between lens units change, and the aperture stop be to be positioned on the image side of the front-side lens unit and on the object side of the object-side positive lens unit.

As mentioned above, it is preferable that the zoom lens have a wide angle of view at a wide angle end, and a high zoom ratio. The wide angle of view is an angle of view for which, a half angle of view is more than 38 degrees, or furthermore, more than 40 degrees. Moreover, the high zoom ratio is a zoom ratio of more than six times for example. However, a value of the angle of view and a value of the zoom ratio are not restricted to these values.

For securing a wide angle of view at the wide angle end and shortening the overall length of an optical system, and furthermore, for achieving a high zoom ratio, from the wide angle end up to a telephoto end, it is preferable to make an arrangement of refractive power in the optical system to be an arrangement close to be more symmetrical. The arrangement of refractive power refers to an arrangement of a positive refractive power and a negative refractive power.

By arranging the zoom lens as mentioned above, the arrangement of refractive power is a positive refractive power and a negative refractive power on the object side of the object-side positive lens unit, and a negative refractive power and a positive refractive power on the image side of the object-side positive lens unit. In other words, in the zoom lens according to the present embodiment, the arrangement of refractive power on the object side and the arrangement of refractive power on the image side are symmetrical across the object-side positive lens unit. As a result, throughout the entire zoom range, it is possible to shorten the overall length of the optical system, and to correct favorably mainly a curvature of field and coma.

Moreover, in the zoom lens according to the present embodiment, among the diameters of all lens units, a diameter of the first lens unit becomes maximum. Here, since the object-side negative lens unit has a negative refractive power, it is possible to form a magnifying optical system by the object-side negative lens unit and the image-side lens unit. For this reason, it is possible to make small a lens diameter in the first lens unit.

Thus, according to the first basic arrangement, in the zoom lens having a wide angle of view at the wide angle end, and a high zoom ratio, it is possible to make the optical system small-sized, and moreover, it is possible to secure a favorable imaging performance.

Moreover, in the zoom lens according to the present embodiment, it is preferable that the object-side positive lens unit include a positive lens for image stabilization, correction of an image shift due to camera shake be carried out by shifting the positive lens for image stabilization in a direction perpendicular to an optical axis.

Since the object-side positive lens unit is positioned nearest to an aperture stop, a diameter of a light beam passing through the object-side positive lens unit is small. Therefore, it is possible to make a lens of the object side positive lens unit small-sized. For this, a lens in the object-side positive lens unit is used as a lens for image stabilization. By making such arrangement, it is possible to form an image stabilizing unit having a small diameter and light weight.

It is preferable that the lens for image stabilization include one lens. However, the lens for image stabilization may include a plurality of lenses. A single lens or a cemented lens can be used for the lens for image stabilization.

Moreover, it is preferable that the refractive power of the lens for image stabilization be made a positive refractive power. By making such arrangement, it is possible to make large the positive refractive power of the object-side positive lens unit efficiently. Moreover, it is possible to realize a high-speed of image stabilization.

Moreover, in the zoom lens according to the present embodiment, it is preferable that the object-side positive lens unit include a negative lens for image stabilization, and the following conditional expression (20) be satisfied:

$$17 \leq vd_{GBp1\_IS\_p} - vd_{GBp1\_IS\_n} \leq 65 \qquad (20)$$

where, $vd_{GBp1\_IS\_p}$ denotes a maximum Abbe number from among Abbe numbers for the positive lens for image stabilization, and $vd_{GBp1\_IS\_n}$ denotes a minimum Abbe number from among Abbe numbers for the negative lens for image stabilization.

By satisfying conditional expression (20), it is possible reduce an occurrence of the chromatic aberration in a state in which the image stabilization is carried out. As a result, a favorable imaging performance is achieved even in the state in which the image stabilization is being carried out.

Moreover, in the zoom lens according to the present embodiment, it is preferable that the rear-side lens unit include an object-side negative lens unit, and the object-side negative lens unit be disposed on the image side of the object-side positive lens unit, and correction of an image shift due to camera shake be carried out by shifting the object-side negative lens unit in a direction perpendicular to an optical axis.

The object-side positive lens unit having a large positive refractive power is disposed on the object side of the object-side negative lens unit. Therefore, it is possible to make a diameter of the object-side negative lens unit small. Consequently, by letting the object-side negative lens unit to be a lens unit for image stabilization, it is possible to form an image stabilization unit having a small diameter and light weight. Moreover, accordingly, it is possible to realize high-speeding of image stabilization.

Furthermore, it is preferable that the object-side negative lens unit satisfy conditional expression (13). Accordingly, it is possible to reduce degradation of imaging performance even in a state in which the image stabilization is carried out.

Moreover, in the zoom lens according to the present embodiment, it is preferable that the following conditional expression (21) be satisfied:

$$0.05 \leq |f_{Gn}|/f_t \leq 0.5 \quad (21)$$

where, $f_{Gn}$ denotes the focal length of the front-side lens unit, and
$f_t$ denotes the focal length of the overall zoom lens system at the telephoto end.

By making so as not to fall below a lower limit value of conditional expression (21), it is possible to suppress mainly an amount of the curvature of field, the spherical aberration, the chromatic aberration of magnification, and the longitudinal chromatic aberration from being increased. As a result, it is possible to achieve a favorable imaging performance. By making so as not to exceed an upper limit value of conditional expression (21), it is possible to suppress an increase in diameter of the front-side lens unit. As a result, small-sizing of the optical system is facilitated.

Moreover, it is preferable that the zoom lens according to the present embodiment include a first lens unit having a positive refractive power, and the first lens unit include at least one negative lens and two positive lenses.

When the F-number is made small as well as high zooming ratio and shortening of the overall length of the optical system are facilitated, the diameter of the first lens unit becomes large, and also the refractive power of the first lens unit becomes large. When the diameter of the first lens unit becomes large and the refractive power of the first lens unit becomes large, in the first lens unit, mainly the spherical aberration occurs near the telephoto end. Therefore, even when the diameter of the first lens unit becomes large and the refractive power of the first lens unit becomes large, it is preferable to maintain a state in which the spherical aberration is corrected favorably.

For this, in the first lens unit, it is preferable to let the positive refractive power to be shared by at least two positive lenses. It is preferable that the number of positive lenses which are let to share the positive refractive power be two.

Furthermore, it is preferable to dispose a negative lens in the first lens unit. By making such arrangement, it is possible to correct favorably the chromatic aberration.

Moreover, it is preferable that the zoom lens according to the present embodiment include a first lens unit having a positive refractive power, and the first lens unit move to be positioned on the object side at the telephoto end than at the wide angle end.

When the first lens unit is moved in such manner, the first lens unit, at the telephoto end, is drawn out toward the object side, than at the wide angle end. Therefore, it is possible to improve zooming effect by the first lens unit and the front-side lens unit. As a result, it becomes easy to achieve high zooming ratio.

Moreover, by the first lens unit being positioned on the object side at the telephoto end, than at the wide angle end, a wide space is formed on the image side of the first lens unit. Therefore, it becomes easy to secure a space for moving lens units between the wide angle end and the telephoto end. As a result, it is possible to shorten the overall length of the optical system near the wide angle end.

Moreover, in the zoom lens according to the present embodiment, it is preferable that the aperture stop be disposed between the front-side lens unit and the object-side positive lens unit.

By making such arrangement, it becomes easy to make small the diameter of the front-side lens unit. Moreover, when the first lens unit having a positive refractive power is disposed one the object side of the front-side lens unit, it becomes easy to make small the diameter of the first lens unit as well.

Moreover, in the zoom lens according to the present embodiment, it is preferable that the object-side positive lens unit include at least two lens units having a positive refractive power.

By making the refractive power of the object-side positive lens unit large, it is possible to improve the zooming effect in the third lens unit. However, when the refractive power of the object-side positive lens unit is made large, the spherical aberration occurs in the third lens unit. Therefore, in object-side positive lens unit, by letting the positive refractive power to be shared by a plurality of lens units having a positive refractive power, it is possible to reduce an amount of the spherical aberration that occurs. The lens unit is preferably a lens component. The lens component is a single lens, a cemented lens, or a compound lens.

Moreover, it is preferable that the lens units be disposed at positions mutually separated apart. It is possible to correct the spherical aberration favorably by providing an air space between the adjacent lens units.

Moreover, in the zoom lens according to the present embodiment, it is preferable that the following conditional expression (22) be satisfied:

$$-2.5 \leq f_t/\exp_t \leq 0.6 \quad (22)$$

where, $f_t$ denotes the focal length of the overall zoom lens system at the telephoto end, and $\exp_t$ denotes a distance from a paraxial image forming surface up to an exit pupil of the zoom lens at the telephoto end.

By making so as not to fall below a lower limit value of conditional expression (22), it is possible to suppress an increase in a positive distortion near the telephoto end. By making so as not to exceed an upper limit value of conditional expression (22), it is possible to suppress an increase in a diameter of a lens in the rearmost lens unit. As a result, small-sizing of the optical system becomes easy.

Moreover, in the zoom lens according to the present embodiment, it is preferable that the front-side lens unit include at least a negative lens.

Moreover, in the zoom lens according to the present embodiment, it is preferable that the following conditional expression (23) be satisfied:

$$1.1 \leq MG_{Gn\_t}/MG_{Gn\_w} \leq 25 \quad (23)$$

where, $MG_{Gn\_t}$ denotes a lateral magnification at the telephoto end of the front-side lens unit, $MG_{Gn\_w}$ denotes a lateral magnification at the wide angle end of the front-side lens unit.

By improving the zooming effect of the front-side lens unit, it is possible to improve the zoom ratio. However, when the zooming effect of the front-side lens unit is improved, an aberration is deteriorated. Therefore, it is preferable to satisfy conditional expression (23).

By making so as not to fall below a lower limit value of conditional expression (23), the zooming effect does not become excessively small. Consequently, it becomes easy to achieve a high zoom ratio such as zoom ratio more than six times. By making so as not to exceed an upper limit value of conditional expression (23), the zooming effect in front-side lens unit does not become excessively large. Consequently, it is possible to suppress an increase in fluctuation of the spherical aberration mainly in the zoom range from an intermediate state up to the telephoto end.

Moreover, in the zoom lens according to the present embodiment, it is preferable that the first lens unit include a negative lens.

It is possible to carry out correction of both the chromatic aberration and the spherical aberration favorably. As a result, a favorable imaging performance is achieved.

Moreover, in the zoom lens according to the present embodiment, it is preferable that the following conditional expression (2″) be satisfied:

$$10 \leq vd_{Gn\_min\_p} \leq 36 \quad (2″)$$

where, $vd_{Gn\_min\_n}$ denotes the minimum Abbe number from among Abbe numbers for positive lenses in the front-side lens unit.

Technical significance of conditional expression (2″) is same as the technical significance of conditional expression (2).

Moreover, in the zoom lens according to the present embodiment, it is preferable that the following conditional expression (3) be satisfied:

$$-0.03 \leq Tp_{Gn\_min\_p} \leq 0.014 \quad (3)$$

where, $Tp_{Gn\_min\_p} = \theta gF_{Gn\_p} - (-0.0016 \times vd_{Gn\_p} + 0.6415)$, here $\theta gF_{Gn\_p} = (ng_{Gn\_p} - nF_{Gn\_p})/(nF_{Gn\_p} - nC_{Gn\_p})$, $vd_{Gn\_p}$ denotes Abbe number for a predetermined positive lens in the front-side lens unit, $ng_{Gn\_p}$, $nF_{Gn\_p}$, and $nC_{Gn\_p}$ are refractive indices of the predetermined positive lens in the front-side lens unit for a g-line, an F-line, and a C-line respectively, and the predetermined positive lens in the front-side lens unit is a positive lens for which Abbe number is the minimum, from among the positive lenses in the front-side lens unit.

Since the technical significance of conditional expression (3) has already been explained, the description thereof is omitted here.

Moreover, in the zoom lens according to the present embodiment, it is preferable that the following conditional expression (24) is satisfied:

$$1.7 \leq nd_{Gn\_max\_p} \leq 2.3 \quad (24)$$

where, $nd_{Gn\_max\_p}$ denotes a maximum refractive index from among the refractive indices of positive lenses in the front-side lens unit.

In a case of exceeding a lower limit value of conditional expression (24), it is possible to suppress an occurrence of the spherical aberration near the telephoto end as well as to suppress an occurrence of the curvature of field near the wide angle end. In a case of falling below an upper limit value of conditional expression (24), it is possible to reduce a tendency of an image plane as whole, being inclined to a plus side. As a result, it is possible to achieve a favorable imaging performance.

Moreover, in the zoom lens according to the present embodiment, it is preferable that the following conditional expression (25) be satisfied:

$$4 < |f_1/f_{Gn}| < 10 \quad (25)$$

where, $f_1$ denotes the focal length of the first lens unit, and $f_{Gn}$ denotes the focal length of the front-side lens unit.

By making so as not to fall below a lower limit value of conditional expression (25), it is possible suppress mainly an increase in the spherical aberration in the first lens unit. By making so as not to exceed an upper limit value of conditional expression (25), it is possible to suppress mainly an increase in the curvature of field in the front-side lens unit. As a result, a favorable imaging performance is achieved.

Moreover, in the zoom lens according to the present embodiment, it is preferable that the following conditional expression (26) be satisfied:

$$0.2 < |f_{GBp1}/f_{GBn1}| < 1.3 \quad (26)$$

where, $f_{GBp1}$ denotes the focal length of the object-side positive lens unit, and $f_{GBn1}$ denotes a focal length of the object-side negative lens unit.

By making so as not to fall below a lower limit value of conditional expression (26), it is possible to suppress mainly an increase in the spherical aberration and an increase in the coma in the object-side positive lens unit. By making so as not to exceed an upper limit value of conditional expression (26), it is possible to suppress mainly an increase in the spherical aberration and an increase in the coma in the object-side negative lens unit. As a result, it becomes easy to secure adequately an imaging performance near the telephoto end.

Moreover, in the zoom lens according to the present embodiment, it is preferable that the following conditional expression (27) be satisfied:

$$0.3 < |f_{GBn1}/f_{GBp2}| < 1.5 \quad (27)$$

where, $f_{GBn1}$ denotes the focal length of the object-side negative lens unit, and $f_{GBp2}$ denotes a focal length of the image-side lens unit.

By making so as not to fall below a lower limit value of conditional expression (27), it is possible to suppress an increase in a negative distortion in the image-side lens unit. By making so as not to exceed an upper limit value of conditional expression (27), it is possible to suppress an increase in a height of a light ray on the image side of the object-side negative lens unit. As a result, it becomes easy to make the diameter of the optical system small.

Moreover, in the zoom lens according to the present embodiment, it is preferable that the following conditional expression (28) be satisfied:

$$4.9 < f_t/f_w < 10 \qquad (28)$$

where, $f_t$ denotes the focal length of the overall zoom lens system at the telephoto end, and $f_w$ denotes a focal length of the overall zoom lens system at the wide angle end.

By making so as not to fall below a lower limit value of conditional expression (28), it is possible to prevent the zoom ratio from being lowered. Accordingly, it is possible to improve merchantability of the optical system and an image pickup apparatus. By making so as not to exceed an upper limit value of conditional expression (28), small-sizing of the optical system becomes easy.

Moreover, in the zoom lens according to the present embodiment, it is preferable that the following conditional expression (29) be satisfied:

$$3 < Fno_t < 5.7 \qquad (29)$$

where, $Fno_t$ denotes the smallest F-number at the telephoto end.

By making so as not to fall below a lower limit value of conditional expression (29), it is possible to suppress an increase in the spherical aberration, the coma, and the curvature of field as well as to prevent an increase in diameter of each lens unit. Accordingly, since it becomes easy to make the diameter of the optical system small, it becomes easy to secure adequately mobility of the optical system and the image pickup apparatus. By making so as not to exceed an upper limit value of conditional expression (29), since it is possible to prevent reduction in a shutter speed even while capturing dark scenes at night etc, it is possible to prevent occurrence of a camera shake and motion blur. Moreover, since an adequate amount of light is achieved, a quality of an image captured is not degraded.

Moreover, in the zoom lens according to the present embodiment, it is preferable that the following conditional expression (30) is satisfied:

$$0.1 < |f_{Gn}/f_{GB}| < 1.0 \qquad (30)$$

where, $f_{Gn}$ denotes the focal length of the front-side lens unit, and $f_{GB}$ denotes a focal length of the rear-side lens unit.

By making so as not to fall below a lower limit value of conditional expression (30), it is possible to suppress an increase in amount of the curvature of field that occurs in the front-side lens unit. As a result, a favorable imaging performance is achieved throughout the entire zoom range. By making so as not to exceed an upper limit value of conditional expression (30), it is possible to suppress a degradation of the zooming effect in the front-side lens unit. As a result, it becomes easy to achieve high zooming ratio.

Moreover, in the zoom lens according to the present embodiment, it is preferable that the first lens unit include in order from the object side to the image side, a cemented lens including a positive lens and a negative lens, and a positive lens.

By making such arrangement, it is possible to carry out favorably both the correction of the chromatic aberration and correction of the spherical aberration. As a result, a favorable imaging performance is achieved. Moreover, by cementing two lenses, since an error at the time of mounting the lenses on frame members decreases, a stable imaging performance is achieved.

Moreover, in the zoom lens according to the present embodiment, it is preferable that a lens nearest to object in the first lens unit be a negative meniscus lens having a convex surface directed toward the object side.

By making such arrangement, it is possible to prevent large bending of a marginal light ray passing through the first lens unit, and particularly, large bending of a marginal light ray near the wide angle end. As a result, it is possible to correct the astigmatism favorably.

Moreover, in the zoom lens according to the present embodiment, it is preferable that a lens nearest to image in the first lens unit be a positive meniscus lens having a convex surface directed toward the object side.

By making such arrangement, it is possible to prevent large bending of a marginal light ray passing through the first lens unit, and particularly, large bending of a marginal light ray near the wide angle end. As a result, it is possible to correct the astigmatism favorably.

Moreover, in the zoom lens according to the present embodiment, it is preferable that the object-side negative lens unit include a cemented lens of a negative lens and a positive lens.

By making such arrangement, it is possible to correct the chromatic aberration favorably. As a result, it is possible to reduce an amount of occurrence of the chromatic aberration, throughout the entire zoom range.

Moreover, in the zoom lens according to the present embodiment, it is preferable that the object-side negative lens unit include a negative lens of which an image-side surface is a concave surface directed toward the image side and a positive meniscus lens having a convex surface directed toward the object side.

Moreover, an image pickup apparatus according to the present embodiment includes one of the zoom lenses described above, and an image pickup element which has an image pickup surface.

By making such arrangement, it is possible to provide an image pickup apparatus for which an angle of view at a wide angle end and a range of angle of view that can be captured are wide, and in which an image with lesser noise can be achieved.

For each conditional expression, it is preferable to restrict either or both of a lower limit value and an upper limit value, as it enables that function more assuredly. Moreover, for each conditional expression, only an upper limit value or a lower limit value of a numerical range of a further restricted conditional expression may be restricted. Moreover, for restricting the numerical range of a conditional expression, an upper limit value or a lower limit value of any of the conditional expressions may be let to be an upper limit value or a lower limit value of another conditional expression described above.

Preferable lower limit value and upper limit value for conditional expressions (1), (1'), and (1") are as follows.
lower limit value: 1.26, 1.3, 1.4, 1.5, 1.6, 1.8
upper limit value: 6.0, 5.9, 5.0, 4.7, 4.0, 3.6, 3.5

Preferable lower limit value and upper limit value for conditional expressions (2), (2'), and (2") are as follows.
lower limit value: 14.0, 15.0, 16.0, 17.0, 21.0
upper limit value: 34.0, 33.0, 32.0, 30.0, 27.0, 26.0

Preferable lower limit value and upper limit value for conditional expressions (3), (3'), and (3") are as follows.
lower limit value: −0.021, −0.015, −0.013, −0.01, −0.005, −0.004
upper limit value: 0.015, 0.014, 0.013, 0.012

Preferable lower limit value and upper limit value for conditional expressions (4) and (4') are as follows.

lower limit value: 2.4, 2.6, 2.7
upper limit valuer 8.6, 7.0, 7.1, 6.0, 5.7, 5.0
Preferable lower limit value and upper limit value for conditional expression (5) are as follows.
lower limit value: 70.5, 71.4, 72.5, 73.6, 74.0
upper limit value: 98.0, 93.9, 89.8, 85.7, 80.0
Preferable lower limit value and upper limit value for conditional expression (6) are as follows.
lower limit value: 55.0, 58.0, 60.0, 70.5, 76.0, 80.0
upper limit value: 98.0, 94.0, 90.0, 86.0
Preferable lower limit value and upper limit value for conditional expression (7) are as follows.
lower limit value: 0.32, 0.34, 0.35, 0.36, 0.4
upper limit value: 0.85, 0.84, 0.80, 0.79, 0.75
Preferable lower limit value and upper limit value for conditional expression (8) are as follows.
lower limit value: 2.9, 3.0, 3.1, 3.2
upper limit value: 6.0, 5.9, 5.8, 5.5, 5.2
Preferable lower limit value and upper limit value for conditional expression (9) are as follows.
lower limit value: 1.1, 1.2, 1.3
upper limit value: 2.8, 2.6, 2.3
Preferable lower limit value and upper limit value for conditional expression (10) are as follows.
lower limit value: −0.01, −0.005, 0.002
upper limit value: 0.055, 0.05, 0.04, 0.01
Preferable lower limit value and upper limit value for conditional expression (11) are as follows.
lower limit value: 61.0, 62.1, 63.1, 70.5, 74, 80.0
upper limit value: 98.0, 93.9, 89.8, 85.7
Preferable lower limit value and upper limit value for conditional expression (12) are as follows.
lower limit value: 0.007, 0.015
upper limit value: 0.055, 0.052, 0.05, 0.044, 0.036
Preferable lower limit value and upper limit value for conditional expression (13) are as follows.
lower limit value: 8.0, 8.5, 11.0, 12, 13.5
upper limit value: 43, 41.0, 36.0, 35.0, 32.0, 30.0
Preferable lower limit value and upper limit value for conditional expression (14) are as follows.
lower limit value: 1.15, 1.2, 1.3, 1.4
upper limit value: 2.6, 2.3, 2.1
Preferable lower limit value and upper limit value for conditional expression (15) are as follows.
lower limit value: 0.80, 0.85, 0.91, 1.0
upper limit value: 2.1, 2.0, 1.9, 1.8
Preferable lower limit value and upper limit value for conditional expression (16) are as follows.
lower limit value: 0.76, 0.80, 0.82, 0.85, 0.88
upper limit value: 1.5, 1.4, 1.3, 1.2
Preferable lower limit value and upper limit value for conditional expression (17) are as follows.
lower limit value: 0.01, 0.015
upper limit value: 0.055, 0.05, 0.04
Preferable lower limit value and upper limit value for conditional expression (18) are as follows.
lower limit value: 1.75, 1.77, 1.78, 1.8, 1.85
upper limit value: 2.20, 2.09, 1.99, 1.85
Preferable lower limit value and upper limit value for conditional expression (19) are as follows.
lower limit value: 1.75, 1.77, 1.78, 1.79, 1.85
upper limit value: 2.20, 2.09, 1.99, 1.85
Preferable lower limit value and upper limit value for conditional expression (20) are as follows.
lower limit value: 20.0, 21.0, 26.0, 30.0
upper limit value: 63.0, 60.0, 60.0, 58.0

Preferable lower limit value and upper limit value for conditional expression (21) are as follows.
lower limit value: 0.07, 0.08, 0.09, 0.10
upper limit value: 0.42, 0.40, 0.34, 0.26, 0.20
Preferable lower limit value and upper limit value for conditional expression (22) are as follows.
lower limit value: −2.4, −2.3, −1.7, −0.7
upper limit value: 0.56, 0.52, 0.49, 0.3, 0.2, 0.0
Preferable lower limit value and upper limit value for conditional expression (23) are as follows.
lower limit value: 1.30, 1.50, 1.70, 1.9
upper limit value: 20.0, 19.4, 15, 13.9, 8.3, 8.0, 4.0, 3.0
Preferable lower limit value and upper limit value for conditional expression (24) are as follows.
lower limit value: 1.71, 1.72
upper limit value: 2.23, 2.2, 2.15, 2.08
Preferable lower limit value and upper limit value for conditional expression (25) are as follows.
lower limit value: 4.5, 5.0, 5.4
upper limit value: 9.6, 9.1, 8.7
Preferable lower limit value and upper limit value for conditional expression (26) are as follows.
lower limit value: 0.33, 0.46, 0.58
upper limit value: 1.28, 1.26, 1.24
Preferable lower limit value and upper limit value for conditional expression (27) are as follows.
lower limit value: 0.34, 0.38, 0.42
upper limit value: 1.46, 1.43, 1.39
Preferable lower limit value and upper limit value for conditional expression (28) are as follows.
lower limit value: 5.6, 6.2, 6.9
upper limit value: 9.5, 9.0, 8.5
Preferable lower limit value and upper limit value for conditional expression (29) are as follows.
lower limit value: 3.2, 3.5, 3.8
upper limit value: 5.5, 5.4, 5.2
Preferable lower limit value and upper limit value for conditional expression (30) are as follows.
lower limit value: 0.13, 0.15, 0.18
upper limit value: 0.88, 0.75, 0.63

Examples of zoom lenses according to certain aspects will be described below by referring to the accompanying diagrams. However, the present invention is not restricted to the examples described below. As to whether the refractive power is positive or negative depends on a paraxial radius of curvature.

Lens cross-sectional views of each example will be described below. Each lens cross-sectional view is a lens cross-sectional view at the time of focusing to an object at infinity.

FIG. 1A, FIG. 2A, FIG. 3A, FIG. 4A, FIG. 5A, FIG. 6A, and FIG. 7A are lens cross-sectional views at a wide angle end.

FIG. 1B, FIG. 2B, FIG. 3B, FIG. 4B, FIG. 5B, FIG. 6B, and FIG. 7B are lens cross-sectional views in an intermediate focal length state.

FIG. 1C, FIG. 2C, FIG. 3C, FIG. 4C, FIG. 5C, FIG. 6C, and FIG. 7C are lens cross-sectional views at a telephoto end.

Examples 1 to 7 of a zoom lens will be described below.

Moreover, a first lens unit is denoted by G1, a second lens unit is denoted by G2, a third lens unit is denoted by G3, a fourth lens unit is denoted by G4, a fifth lens unit is denoted by G5, a sixth lens unit is denoted by G6, a seventh lens unit is denoted by G7, an aperture stop is denoted by S, and an image plane (image pickup surface) is denoted by I. Moreover, a lens unit which moves at the time of focusing is indicated by an arrow mark in a horizontal direction, and a lens unit which moves at the time of image stabilization is indicated by an arrow mark in a vertical direction.

A cover glass of an electronic image pickup element and a plane parallel plate forming a low-pass filter may be disposed between a lens unit positioned nearest to image and the image plane I. In this case, a wavelength-region restricting coating which restricts infra-red light may be applied to a surface of the plane parallel plate. Moreover, a multi-layered film for restricting wavelength region may be applied to a surface of the cover glass. Furthermore, an arrangement may be made such that the cover glass is imparted with a low-pass filter function.

In examples 1 to 6, the second lens unit G2 is the front-side lens unit. The third lens unit G3, the fourth lens unit G4, and the fifth lens unit G5 are the rear-side lens unit. The third lens unit G3 is the object-side positive lens unit, the fourth lens unit G4 is the object-side negative lens unit, and the fifth lens unit G5 is the image-side lens unit.

In the example 6, the second lens unit G2 includes a first sub-unit G2a and a second sub-unit G2b.

In the example 7, the second lens unit G2 is the front-side lens unit. The third lens unit G3, the fourth lens unit G4, the fifth lens unit G5, the sixth lens unit G6, and the seventh lens unit G7 are the rear-side lens unit. The third lens unit G3 is the object-side positive lens unit, the fourth lens unit G4 is the object-side negative lens unit, and the fifth lens unit G5 is the image-side lens unit.

A zoom lens according to the example 1 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed between the second lens unit G2 and the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a negative meniscus lens L4 having a convex surface directed toward the object side, a biconcave negative lens L5, a biconvex positive lens L6, a biconcave negative lens L7, and a biconvex positive lens L8.

The third lens unit G3 includes a biconvex positive lens L9, a biconvex positive lens L10, a negative meniscus lens L11 having a convex surface directed toward the object side, and a biconvex positive lens L12. Here, the negative meniscus lens L11 and the biconvex positive lens L12 are cemented.

The fourth lens unit G4 includes a negative meniscus lens L13 having a convex surface directed toward the object side and a positive meniscus lens L14 having a convex surface directed toward the object side. Here, the negative meniscus lens L13 and the positive meniscus lens L14 are cemented.

The fifth lens unit G15 includes a biconvex positive lens L15.

At the time of zooming from a wide angle end to a telephoto end, the first lens unit G1 moves toward the object side, the second lens unit G2 is fixed, the third lens unit G3 moves toward the object side, the fourth lens unit G4 moves toward the object side, and the fifth lens unit G5 is fixed. The aperture stop S moves independently toward the object side.

At the time of focusing, the fourth lens unit G4 moves along an optical axis. More elaborately, at the time of focusing from an object at infinity to an object at a close distance, the fourth lens unit G4 moves toward an image side.

An aspheric surface is provided to a total of eight surfaces which are, both surfaces of the negative meniscus lens L4, both surfaces of the biconcave negative lens L7, both surfaces of the biconvex positive lens L9, and both surfaces of the biconvex positive lens L15.

A zoom lens according to the example 2 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed between the second lens unit G2 and the third lens unit G3.

The first lens unit G1 includes a negative meniscus lens L1 having a convex surface directed toward the object side, a biconvex positive lens L2, and a positive meniscus lens L3 having a convex surface directed toward the object side. Here, the negative meniscus lens L1 and the biconvex positive lens L2 are cemented.

The second lens unit G2 includes a negative meniscus lens L4 having a convex surface directed toward the object side, a biconcave negative lens L5, a biconvex positive lens L6, and a negative meniscus lens L7 having a convex surface directed toward an image side.

The third lens unit G3 includes a biconvex positive lens L8, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented. Moreover, the negative meniscus lens L12 and the biconvex positive lens L13 are cemented.

The fourth lens unit G4 includes a biconcave negative lens L14 and a positive meniscus lens L15 having a convex surface directed toward the object side. Here, the biconcave negative lens L14 and the positive meniscus lens L15 are cemented.

The fifth lens unit G5 includes a biconvex positive lens L16 and a negative meniscus lens L17 having a convex surface directed toward the image side. Here, the biconvex positive lens L16 and the negative meniscus lens L17 are cemented.

At the time of zooming from a wide angle end to a telephoto end, the first lens unit G1 moves toward the object side, the second lens unit G2 moves toward the image side, the third lens unit G3 moves toward the object side, the fourth lens unit G4 moves toward the object side, and the fifth lens unit G5 is fixed. The aperture stop S moves independently toward the object side.

At the time of focusing, the fourth lens unit G4 moves along an optical axis. More elaborately, at the time of focusing from an object at infinity to an object at a close distance, the fourth lens unit G4 moves toward the image side. Moreover, at the time of image stabilization, the negative meniscus lens L12 and the biconvex positive lens L13 in the third lens unit G3 move in a direction orthogonal to the optical axis.

An aspheric surface is provided to a total of eight surfaces which are, both surfaces of the biconcave negative lens L5, both surfaces of the negative meniscus lens L7, both surfaces of the biconvex positive lens L8, an image side surface of the biconvex positive lens L13, and an object-side surface of the biconvex positive lens L16.

A zoom lens according to the example 3 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed between the second lens unit G2 and the third lens unit G3.

The first lens unit G1 includes a negative meniscus lens L1 having a convex surface directed toward the object side, a planoconvex positive lens L2 having a convex surface directed toward the object side, and a positive meniscus lens L3 having a convex surface directed toward the object side. Here, the negative meniscus lens L1 and the planoconvex positive lens L2 are cemented.

The second lens unit G2 includes a negative meniscus lens L4 having a convex surface directed toward the object side, a biconcave negative lens L5, a biconvex positive lens L6, and a negative meniscus lens L7 having a convex surface directed toward an image side. Here, the biconcave negative lens L5 and the biconvex positive lens L6 are cemented.

The third lens unit G3 includes a biconvex positive lens L8, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented. Moreover, the negative meniscus lens L12 and the biconvex positive lens L13 are cemented.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented.

The fifth lens unit G5 includes a biconvex positive lens L16 and a negative meniscus lens L17 having a convex surface directed toward the image side. Here, the biconvex positive lens L16 and the negative meniscus lens L17 are cemented.

At the time of zooming from a wide angle end to a telephoto end, the first lens unit G1 moves toward the object side, the second lens unit G2 moves toward the image side, the third lens unit G3 moves toward the object side, the fourth lens unit G4, after moving toward the object side, moves toward the image side, and the fifth lens unit G5 is fixed. The aperture stop S moves together with the third lens unit G3.

At the time of focusing, the fourth lens unit G4 moves along an optical axis. More elaborately, at the time of focusing from an object at infinity to an object at a close distance, the fourth lens unit G4 moves toward the image side. Moreover, at the time of image stabilization, the negative meniscus lens L12 and the biconvex positive lens L13 in the third lens unit G3 move in a direction orthogonal to the optical axis.

An aspheric surface is provided to a total of six surfaces which are, both surfaces of the negative meniscus lens L4, both surfaces of the biconvex positive lens L8, an image-side surface of the biconvex positive lens L13, and an object-side surface of the biconvex positive lens L16.

A zoom lens according to the example 4 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed between the second lens unit G2 and the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a negative meniscus lens L4 having a convex surface directed toward the object side, a biconcave negative lens L5, a biconvex positive lens L6, and a negative meniscus lens L7 having a convex surface directed toward an image side. Here, the biconcave negative lens L5 and the biconvex positive lens L6 are cemented.

The third lens unit G3 includes a biconvex positive lens L8, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented. Moreover, the negative meniscus lens L12 and the biconvex positive lens L13 are cemented.

The fourth lens unit G4 includes a negative meniscus lens L4 having a convex surface directed toward the object side and a positive meniscus lens L15 having a convex surface directed toward the object side. Here, the negative meniscus lens L14 and the positive meniscus lens L15 are cemented.

The fifth lens unit G5 includes a biconvex positive lens L16 and a negative meniscus lens L17 having a convex surface directed toward the image side. Here, the biconvex positive lens L16 and the negative meniscus lens L17 are cemented.

At the time of zooming from a wide angle end to a telephoto end, the first lens unit G1 moves toward the object side, the second lens unit G2 moves toward the image side, the third lens unit G3 moves toward the object side, the fourth lens unit G4, after moving toward the object side, moves toward the image side. The fifth lens unit G5 moves toward the image side. The aperture stop S moves together with the third lens unit G3.

At the time of focusing, the fourth lens unit G4 moves along an optical axis. More elaborately, at the time of focusing from an object at infinity to an object at a close distance, the fourth lens unit G4 moves toward the image side. Moreover, at the time of image stabilization, the negative meniscus lens L12 and the biconvex positive lens L13 in the third lens unit G3 move in a direction orthogonal to the optical axis.

An aspheric surface is provided to a total of six surfaces which are, both surfaces of the negative meniscus lens L4, both surfaces of the biconvex positive lens L8, an image-side surface of the biconvex positive lens L13, and an object-side surface of the biconvex positive lens L16.

A zoom lens according to the example 5 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed between the second lens unit G2 and the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a negative meniscus lens L4 having a convex surface directed toward the object side, a biconcave negative lens L5, a biconvex positive lens L6, and a negative meniscus lens L7 having a convex surface directed toward an image side. Here, the biconcave negative lens L5 and the biconvex positive lens L6 are cemented.

The third lens unit G3 includes a biconvex positive lens L8, a biconvex positive lens L9, a negative meniscus lens L10 having a convex surface directed toward the image side, a biconcave negative lens L11, and a biconvex positive lens L12. Here, the biconvex positive lens L9 and the negative meniscus lens L10 are cemented. Moreover, the biconcave negative lens L11 and the biconvex positive lens L12 are cemented.

The fourth lens unit G4 includes a negative meniscus lens L13 having a convex surface directed toward the object side and a positive meniscus lens L14 having a convex surface directed toward the object side. Here, the negative meniscus lens L13 and the positive meniscus lens L14 are cemented.

The fifth lens unit G5 includes a biconcave negative lens L15 and a biconvex positive lens L16.

At the time of zooming from a wide angle end to a telephoto end, the first lens unit G1 is fixed, the second lens unit G2 moves toward the image side, the third lens unit G3 moves toward the object side, the fourth lens unit G4, after moving toward the object side, moves toward the image side, and the fifth lens unit G5, after moving toward the image side, moves toward the object side. The aperture stop S moves together with the third lens unit G3.

At the time of focusing, the fourth lens unit G4 moves along an optical axis. More elaborately, at the time of focusing from an object at infinity to an object at a close distance, the fourth lens unit G4 moves toward the image side. Moreover, at the time of image stabilization, the biconcave negative lens L11 and the biconvex positive lens L12 in the third lens unit G3 move in a direction orthogonal to the optical axis.

An aspheric surface is provided to a total of eight surfaces which are, both surfaces of the negative meniscus lens L4, both surfaces of the negative meniscus lens L7, both surfaces of the biconvex positive lens L8, and both surfaces of the biconvex positive lens L16.

A zoom lens according to the example 6 includes in order from an object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. An aperture stop S is disposed between the second lens unit G2 and the third lens unit G3.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a first sub-unit G2a and a second sub-unit G2b. The first sub-unit G2a includes a negative meniscus lens L4 having a convex surface directed toward the object side, a biconcave negative lens L5, and a biconvex positive lens L6. The second sub-unit G2b includes a negative meniscus lens L7 having a convex surface directed toward an image side.

The third lens unit G3 includes a biconvex positive lens L8, a biconvex positive lens L9, a negative meniscus lens L10 having a convex surface directed toward the object side, a positive meniscus lens L11 having a convex surface directed toward the object side, a negative meniscus lens L12 having a convex surface directed toward the object side, and a biconvex positive lens L13. Here, the negative meniscus lens L10 and the positive meniscus lens L11 are cemented.

The fourth lens unit G4 includes a negative meniscus lens L14 having a convex surface directed toward the object side and a positive meniscus lens L15 having a convex surface directed toward the object side. Here, the negative meniscus lens L14 and the positive meniscus lens L15 are cemented.

The fifth lens unit G5 includes a biconvex positive lens L16.

At the time of zooming from a wide angle end to a telephoto end, the first lens unit G1 moves toward the object side, the first sub-unit G2a, after moving toward the image side, moves toward the object side, the second sub-unit G2b moves toward the image side, the third lens unit G3 moves toward the object side, the fourth lens unit G4 moves toward the object side, and the fifth lens unit G5 is fixed. The aperture stops S moves independently toward the object side.

At the time of focusing, the second sub-unit G2b moves along an optical axis. More elaborately, at the time of focusing from an object at infinity to an object at a close distance, the second sub-unit G2b moves toward the image side. Moreover, at the time of image stabilization, the negative meniscus lens L12 and the biconvex positive lens L13 in the third lens unit G3 move in a direction orthogonal to the optical axis.

An aspheric surface is provided to a total of 11 surfaces which are, both surfaces of the negative meniscus lens L4, both surfaces of the negative meniscus lens L7, both surfaces of the biconvex positive lens L8, both surfaces of the biconvex positive lens L13, an object-side surface of the negative meniscus lens L14, and both surfaces of the biconvex positive lens L16.

A zoom lens according to the example 7 includes in order from an object side, a first lens unit G1 having a positive refractive power, a second lens unit G2 having a negative refractive power, a third lens unit G3 having a positive refractive power, a fourth lens unit G4 having a negative refractive power, a fifth lens unit G5 having a positive refractive power, a sixth lens unit G6 having a negative refractive power, and a seventh lens unit G7 having a positive refractive power. An aperture stop S is disposed in the fifth lens unit G5.

The first lens unit G1 includes a negative meniscus lens L1 having a convex surface directed toward the object side, a positive meniscus lens L2 having a convex surface directed toward the object side, and a positive meniscus lens L3 having a convex surface directed toward the object side. Here, the negative meniscus lens L1 and the positive meniscus lens L2 are cemented.

The second lens unit G2 includes a negative meniscus lens L4 having a convex surface directed toward the object side, a biconcave negative lens L5, a biconvex positive lens L6, and a negative meniscus lens L7 having a convex surface directed toward an image side.

The third lens unit G3 includes a biconvex positive lens L8.

The fourth lens unit G4 includes a biconcave negative lens L9.

The fifth lens unit G5 includes a biconvex positive lens L10, a negative meniscus lens L11 having a convex surface directed toward the object side, a positive meniscus lens L12 having a convex surface directed toward the object side, and a biconvex positive lens L13. Here, the negative meniscus lens L11 and the positive meniscus lens L12 are cemented.

The sixth lens unit G6 includes a negative meniscus lens L14 having a convex surface directed toward the object side and a positive meniscus lens L15 having a convex surface directed toward the object side. Here, the negative meniscus lens L14 and the positive meniscus lens L15 are cemented.

The seventh lens unit G7 includes a negative meniscus lens L16 having a convex surface directed toward the object side, a biconvex positive lens L17, and a negative meniscus lens L18 having a convex surface directed toward the image side.

At the time of zooming from a wide angle end to a telephoto end, the first lens unit G1 moves toward the object side, the second lens unit G2, after moving toward the image side, moves toward the object side, the third lens unit G3 moves toward the object side, the fourth lens unit G4 moves toward the object side, the fifth lens unit G5 moves toward the object side, the sixth lens unit G6 moves toward the object side, and the seventh lens unit G7 moves toward the object side. The fifth lens unit G5 and the seventh lens unit G7 move integrally. The aperture stop S moves toward the object side together with the fifth lens unit G5.

At the time of focusing, the fourth lens unit G4 moves along an optical axis. More elaborately, at the time of focusing from an object at infinity to an object at a close distance, the fourth lens unit G4 moves toward the object side. Moreover, at the time of image stabilization, the sixth lens unit G6 moves in a direction orthogonal to the optical axis.

An aspheric surface is provided to a total of nine surfaces which are, both surfaces of the negative meniscus lens L4, both surfaces of the biconvex positive lens L8, both surfaces of the biconcave negative lens L9, both surfaces of the biconvex positive lens L10, and an image-side surface of the positive meniscus lens L15.

Next, numerical data of optical components comprising the zoom lens of each above example are shown. In numerical data of each example, r1, r2, . . . denotes a curvature radius of each lens surface, d1, d2, . . . denotes a thickness of each lens or an air distance between adjacent lens surfaces, nd1, nd2, . . . denotes a refractive index of each lens for d-line, vd1, vd2, . . . denotes an Abbe number of each lens, * denotes an aspheric surface. Moreover, in zoom data, WE denotes a wide angle end, ST denotes an intermediate state, TE denotes a telephoto end, f denotes a focal length of the entire zoom lens system, FNO. denotes an F number, ω denotes a half angle of view, LTL denotes a lens total length of the optical system, FB denotes a back focus, each of f1, f2 . . . is a focal length of each lens unit. The lens total length is a distance from a frontmost lens surface to the rearmost lens surface plus back focus. The back focus is a unit which is expressed upon air conversion of a distance from a rearmost lens surface to a paraxial image surface. Moreover, the numerical data is a data when focused to an object at infinity.

A shape of an aspheric surface is defined by the following expression where the direction of the optical axis is represented by z, the direction orthogonal to the optical axis is represented by y, a conical coefficient is represented by K, aspheric surface coefficients are represented by A4, A6, A8, A10, A12:

$$Z = (y^2/r)/\left[1 + \{1 - (1+k)(y/r)^2\}^{1/2}\right] + A4y^4 + A6y^6 + A8y^8 + A10y^{10} + A12y^{12}$$

Further, in the aspherical surface coefficients, 'e-n' (where, n is an integral number) indicates '$10^{-n}$'. Moreover, these symbols are commonly used in the following numerical data for each example.

Example 1

| Unit mm | | | | |
|---|---|---|---|---|
| Surface data | | | | |
| Surface no. | r | d | nd | vd |
| Object plane | ∞ | ∞ | | |
| 1 | 57.514 | 1.400 | 1.90366 | 31.32 |
| 2 | 43.202 | 7.500 | 1.49700 | 81.61 |
| 3 | 344.317 | 0.200 | | |
| 4 | 63.135 | 4.200 | 1.49700 | 81.61 |
| 5 | 222.298 | Variable | | |
| 6* | 468.367 | 1.200 | 1.80139 | 45.45 |
| 7* | 13.283 | 5.632 | | |
| 8 | −43.235 | 1.218 | 1.80400 | 46.58 |
| 9 | 94.296 | 0.150 | | |
| 10 | 105.915 | 2.674 | 1.85478 | 24.80 |
| 11 | −37.594 | 2.241 | | |
| 12* | −14.220 | 0.900 | 1.49700 | 81.61 |
| 13* | 1214.972 | 0.100 | | |
| 14 | 78.971 | 2.200 | 1.80000 | 29.84 |
| 15 | −105.866 | Variable | | |
| 16(Stop) | ∞ | Variable | | |
| 17* | 17.072 | 6.696 | 1.58913 | 61.14 |
| 18* | −41.817 | 0.379 | | |
| 19 | 37.316 | 4.232 | 1.49700 | 81.61 |
| 20 | −38.028 | 0.100 | | |
| 21 | 7385.309 | 0.800 | 1.91082 | 35.25 |
| 22 | 11.565 | 6.395 | 1.49700 | 81.61 |
| 23 | −39.166 | Variable | | |
| 24 | 888.684 | 0.700 | 1.71999 | 50.23 |
| 25 | 13.659 | 1.800 | 1.80810 | 22.76 |
| 26 | 18.913 | Variable | | |
| 27* | 36.240 | 6.000 | 1.49700 | 81.61 |
| 28* | −44.083 | 15.700 | | |
| Image plane | ∞ | | | |
| Aspherical surface data | | | | |

6th surface k = 0.0000
A4 = −2.5765e−006, A6 = 2.0798e−007, A8 = −8.1344e−010,
A10 = 1.2111e−012, A12 = 0.0000e+000, A14 = 0.0000e+000

7th surface k = 0.0000
A4 = −3.9505e−005, A6 = 2.7652e−007, A8 = −1.5931e−009,
A10 = 2.8563e−011, A12 = 0.0000e+000, A14 = 0.0000e+000

-continued

Unit mm

12th surface k = 0.0000
A4 = −1.3529e−005, A6 = 3.9708e−007, A8 = 6.2625e−010,
A10 = −1.5563e−011, A12 = 0.0000e+000, A14 = 0.0000e+000
13th surface k = 0.0000
A4 = −1.4948e−005, A6 = 4.4034e−007, A8 = −2.8038e−009,
A10 = 3.4123e−013, A12 = 0.0000e+000, A14 = 0.0000e+000
17th surface k = 0.0000
A4 = −3.1826e−005, A6 = 9.3015e−009, A8 = 2.7312e−010,
A10 = −2.3047e−012, A12 = 0.0000e+000, A14 = 0.0000e+000
18th surface k = 0.0000
A4 = 3.7300e−005, A6 = −1.2953e−008, A8 = 5.8604e−010,
A10 = −2.3311e−012, A12 = 0.0000e+000, A14 = 0.0000e+000
27th surface k = 0.0000
A4 = 2.2320e−005, A6 = 1.2133e−008, A8 = −2.4420e−010,
A10 = 1.3290e−013, A12 = 0.0000e+000, A14 = 0.0000e+000
28th surface k = 0.0000
A4 = 3.2583e−005, A6 = −3.6593e−008, A8 = −1.9488e−010,
A10 = 0.0000e+000, A12 = 0.0000e+000, A14 = 0.0000e+000

Zoom data

|   | WE | ST | TE |
|---|---|---|---|
| f | 12.250 | 34.428 | 98.042 |
| FNO. | 4.082 | 4.070 | 4.053 |
| 2ω | 83.4 | 34.1 | 12.2 |
| FB | 15.700 | 15.700 | 15.700 |
| LTL | 109.613 | 129.583 | 155.109 |
| d5 | 0.641 | 20.611 | 46.138 |
| d15 | 19.976 | 6.650 | 1.513 |
| d16 | 9.840 | 5.993 | 1.532 |
| d23 | 1.993 | 8.426 | 16.174 |
| d26 | 4.745 | 15.485 | 17.335 |

Unit focal length f1 = 95.323   f2 = −13.174   f3 = 20.222   f4 = −28.452   f5 = 41.036

Example 2

Unit mm

Surface data

| Surface no. | r | d | nd | vd |
|---|---|---|---|---|
| Object plane | ∞ | ∞ | | |
| 1 | 85.868 | 2.250 | 1.85478 | 24.80 |
| 2 | 60.902 | 6.000 | 1.49700 | 81.54 |
| 3 | −1493.460 | 0.150 | | |
| 4 | 48.944 | 4.602 | 1.49700 | 81.54 |
| 5 | 134.439 | Variable | | |
| 6 | 174.592 | 1.500 | 1.88300 | 40.76 |
| 7 | 12.382 | 5.950 | | |
| 8* | −61.925 | 1.600 | 1.49700 | 81.54 |
| 9* | 34.608 | 1.091 | | |
| 10 | 6000.000 | 5.664 | 1.85478 | 24.80 |
| 11 | −20.382 | 0.997 | | |
| 12* | −15.460 | 1.200 | 1.80610 | 40.92 |
| 13* | −33.768 | Variable | | |
| 14(Stop) | ∞ | Variable | | |
| 15* | 21.437 | 4.468 | 1.58313 | 59.38 |
| 16* | −302.665 | 3.401 | | |
| 17 | 35.824 | 3.367 | 1.49700 | 81.54 |
| 18 | −89.832 | 0.200 | | |
| 19 | 55.128 | 1.000 | 1.91082 | 35.25 |
| 20 | 13.177 | 3.413 | 1.53996 | 59.46 |
| 21 | 26.168 | 1.200 | | |
| 22 | 22.428 | 1.150 | 1.74077 | 27.79 |
| 23 | 18.137 | 6.467 | 1.49700 | 81.54 |
| 24* | −40.530 | Variable | | |
| 25 | −409.537 | 0.900 | 1.80610 | 40.92 |
| 26 | 13.247 | 2.996 | 1.80810 | 22.76 |
| 27 | 25.765 | Variable | | |
| 28* | 49.615 | 9.340 | 1.59201 | 67.02 |
| 29 | −17.859 | 1.300 | 1.90366 | 31.32 |
| 30 | −32.538 | 15.322 | | |
| Image plane | ∞ | | | |

Aspherical surface data

8th surface k = 0.0000
A4 = −1.9753e−005, A6 = −2.4680e−007, A8 = 3.0050e−010,
A10 = 0.0000e+000, A12 = 0.0000e+000, A14 = 0.0000e+000
9th surface k = 0.0000
A4 = −3.5396e−005, A6 = −2.9197e−007, A8 = 0.0000e+000,
A10 = 0.0000e+000, A12 = 0.0000e+000, A14 = 0.0000e+000
12th surface k = 0.0000
A4 = 1.3572e−005, A6 = 5.8250e−008, A8 = 0.0000e+000,
A10 = 0.0000e+000, A12 = 0.0000e+000, A14 = 0.0000e+000
13th surface k = 0.0000
A4 = −1.2282e−005, A6 = 0.0000e+000, A8 = 0.0000e+000,
A10 = 0.0000e+000, A12 = 0.0000e+000, A14 = 0.0000e+000
15th surface k = 0.0000
A4 = −8.8594e−006, A6 = −8.6927e−009, A8 = −4.7820e−011,
A10 = −1.0166e−014, A12 = 0.0000e+000, A14 = 0.0000e+000
16th surface k = 0.0000
A4 = 1.3582e−005, A6 = −1.4620e−008, A8 = 0.0000e+000,
A10 = 0.0000e+000, A12 = 0.0000e+000, A14 = 0.0000e+000
24th surface k = 0.0000
A4 = 1.7867e−005, A6 = 1.1887e−008, A8 = −4.8566e−011,
A10 = 0.0000e+000, A12 = 0.0000e+000, A14 = 0.0000e+000
28th surface k = 0.0000
A4 = 2.4885e−006, A6 = 2.0316e−008, A8 = 0.0000e+000,
A10 = 0.0000e+000, A12 = 0.0000e+000, A14 = 0.0000e+000

Zoom data

|   | WE | ST | TE |
|---|---|---|---|
| f | 12.238 | 34.627 | 97.981 |
| FNO. | 4.075 | 4.075 | 4.073 |
| 2ω | 84.5 | 34.2 | 12.3 |
| FB | 15.322 | 15.322 | 15.322 |
| LTL | 131.582 | 137.230 | 166.417 |
| d5 | 0.600 | 14.011 | 44.110 |
| d13 | 17.691 | 6.972 | 1.000 |
| d14 | 21.000 | 5.014 | 1.506 |
| d24 | 2.500 | 13.300 | 19.586 |
| d27 | 4.263 | 12.406 | 14.689 |

Unit focal length f1 = 91.703   f2 = −14.082   f3 = 24.409   f4 = −30.024   f5 = 46.269

Example 3

Unit mm

Surface data

| Surface no. | r | d | nd | νd |
|---|---|---|---|---|
| Object plane | ∞ | ∞ | | |
| 1 | 90.000 | 2.300 | 1.85478 | 24.80 |
| 2 | 65.592 | 7.382 | 1.49700 | 81.54 |
| 3 | ∞ | 0.150 | | |
| 4 | 59.096 | 5.131 | 1.49700 | 81.54 |
| 5 | 173.762 | Variable | | |
| 6* | 464.875 | 1.500 | 1.88202 | 37.22 |
| 7* | 14.784 | 7.450 | | |
| 8 | −20.119 | 1.200 | 1.61800 | 63.40 |
| 9 | 35.728 | 5.000 | 2.00069 | 25.46 |
| 10 | −33.690 | 1.914 | | |
| 11 | −19.739 | 1.300 | 1.88300 | 40.76 |
| 12 | −42.267 | Variable | | |
| 13(Stop) | ∞ | 1.500 | | |
| 14* | 23.000 | 5.000 | 1.58313 | 59.38 |
| 15* | −262.448 | 3.259 | | |
| 16 | 43.079 | 3.715 | 1.49700 | 81.54 |
| 17 | −41.898 | 0.400 | | |
| 18 | 85.095 | 1.000 | 1.91082 | 35.25 |
| 19 | 15.097 | 3.279 | 1.49700 | 81.54 |
| 20 | 45.596 | 1.200 | | |
| 21 | 23.870 | 0.800 | 1.85478 | 24.80 |
| 22 | 17.905 | 5.079 | 1.58313 | 59.38 |
| 23* | −53.454 | Variable | | |
| 24 | 155.034 | 0.900 | 1.83481 | 42.73 |
| 25 | 10.571 | 3.278 | 1.80809 | 22.76 |
| 26 | 17.967 | Variable | | |
| 27* | 59.278 | 9.078 | 1.49700 | 81.54 |
| 28 | −17.171 | 1.300 | 2.00100 | 29.13 |
| 29 | −22.118 | 16.052 | | |
| Image plane | ∞ | | | |

Aspherical surface data

6th surface k = 0.0000
A4 = −5.5689e−006, A6 = 1.3408e−007, A8 = −4.4733e−010,
A10 = 7.1015e−013, A12 = 0.0000e+000, A14 = 0.0000e+000

7th surface k = 0.0000
A4 = −2.8514e−005, A6 = 6.4243e−008, A8 = 1.9884e−010,
A10 = 2.2609e−012, A12 = 0.0000e+000, A14 = 0.0000e+000

14th surface k = 0.0000
A4 = −5.3982e−006, A6 = −2.4500e−008, A8 = 5.7642e−012,
A10 = −3.0015e−014, A12 = 0.0000e+000, A14 = 0.0000e+000

15th surface k = 0.0000
A4 = 2.4015e−005, A6 = −2.9581e−008, A8 = 2.3042e−011,
A10 = 0.0000e+000, A12 = 0.0000e+000, A14 = 0.0000e+000

23th surface k = 0.0000
A4 = 9.6902e−006, A6 = 1.3598e−008, A8 = −1.8927e−012,
A10 = 3.3501e−013, A12 = 0.0000e+000, A14 = 0.0000e+000

27th surface k = 0.0000
A4 = −3.7000e−006, A6 = 3.8872e−008, A8 = −3.7481e−011,
A10 = 0.0000e+000, A12 = 0.0000e+000, A14 = 0.0000e+000

Zoom data

| | WE | ST | TE |
|---|---|---|---|
| f | 12.239 | 34.636 | 97.921 |
| FNO. | 4.080 | 4.080 | 4.080 |
| 2ω | 83.3 | 33.8 | 12.1 |
| FB | 16.052 | 16.052 | 16.052 |
| LTL | 131.58 | 146.438 | 172.588 |
| d5 | 0.600 | 22.300 | 51.610 |
| d12 | 34.928 | 12.189 | 1.321 |
| d23 | 2.400 | 9.868 | 17.863 |
| d27 | 4.485 | 12.915 | 12.627 |

Unit focal length f1 = 104.212  f2 = −13.280  f3 = 22.297  f4 = −23.946  f5 = 41.573

Example 4

Unit mm

Surface data

| Surface no. | r | d | nd | νd |
|---|---|---|---|---|
| Object plane | ∞ | ∞ | | |
| 1 | 90.000 | 2.300 | 1.85478 | 24.80 |
| 2 | 65.592 | 7.382 | 1.53775 | 74.70 |
| 3 | 800.000 | 0.150 | | |
| 4 | 63.000 | 5.131 | 1.53775 | 74.70 |
| 5 | 173.762 | Variable | | |
| 6* | 464.875 | 1.500 | 1.88202 | 37.22 |
| 7* | 14.784 | 7.450 | | |
| 8 | −20.119 | 1.200 | 1.59282 | 68.63 |
| 9 | 35.728 | 5.000 | 2.00100 | 29.13 |
| 10 | −33.690 | 1.914 | | |
| 11 | −19.739 | 1.300 | 1.88300 | 40.76 |
| 12 | −42.267 | Variable | | |
| 13(Stop) | ∞ | 1.500 | | |
| 14* | 23.000 | 5.000 | 1.58313 | 59.38 |
| 15* | −262.448 | 3.259 | | |
| 16 | 48.000 | 3.715 | 1.53996 | 59.46 |
| 17 | −44.500 | 0.400 | | |
| 18 | 85.095 | 1.000 | 1.91082 | 35.25 |
| 19 | 15.097 | 3.279 | 1.48749 | 70.23 |
| 20 | 45.596 | 1.200 | | |
| 21 | 23.870 | 0.800 | 1.85478 | 24.80 |
| 22 | 17.905 | 5.079 | 1.58313 | 59.38 |
| 23* | −53.454 | Variable | | |
| 24 | 155.034 | 0.900 | 1.83481 | 42.73 |
| 25 | 10.571 | 3.278 | 1.80518 | 25.42 |
| 26 | 17.967 | Variable | | |
| 27* | 59.278 | 9.078 | 1.49700 | 81.54 |
| 28 | −17.171 | 1.300 | 1.95375 | 32.32 |
| 29 | −22.118 | Variable | | |
| Image plane | ∞ | | | |

Aspherical surface data

6th surface k = 0.0000
A4 = −5.5689e−006, A6 = 1.3408e−007, A8 = −4.4733e−010,
A10 = 7.8000e−013, A12 = 0.0000e+000, A14 = 0.0000e+000

7th surface k = 0.0000
A4 = −3.7000e−005, A6 = 6.4243e−008, A8 = 1.0000e−011,
A10 = 2.2609e−012, A12 = 0.0000e+000, A14 = 0.0000e+000

14th surface k = 0.0000
A4 = −5.6000e−006, A6 = −2.4500e−008, A8 = 2.2000e−011,
A10 = −3.0015e−014, A12 = 0.0000e+000, A14 = 0.0000e+000

15th surface k = 0.0000
A4 = 2.4015e−005, A6 = −2.9581e−008, A8 = 2.3042e−011,
A10 = 0.0000e+000, A12 = 0.0000e+000, A14 = 0.0000e+000

| Unit mm |
| --- |
| 23th surface | k = 0.0000
A4 = 9.6902e−006, A6 = 1.3598e−008, A8 = −1.8927e−012,
A10 = 3.3501e−013, A12 = 0.0000e+000, A14 = 0.0000e+000

27th surface k = 0.0000
A4 = −1.0000e−005, A6 = 3.8872e−008, A8 = −3.7481e−011,
A10 = 0.0000e+000, A12 = 0.0000e+000, A14 = 0.0000e+000

| Zoom data | | | |
| --- | --- | --- | --- |
|  | WE | ST | TE |
| f | 12.584 | 34.890 | 95.501 |
| FNO. | 4.100 | 4.100 | 4.100 |
| 2ω | 79.4 | 33.0 | 12.3 |
| FB | 16.276 | 15.467 | 13.660 |
| LTL | 131.804 | 145.853 | 170.1962 |
| d5 | 0.600 | 22.300 | 51.610 |
| d12 | 34.928 | 12.189 | 1.321 |
| d23 | 2.400 | 9.868 | 17.863 |
| d26 | 4.485 | 12.915 | 12.627 |
| d29 | 16.276 | 15.467 | 13.660 |

| Unit focal length |
| --- |
| f1 = 105.827   f2 = −13.813   f3 = 22.426   f4 = −23.868   f5 = 40.734 |

Example 5

| Unit mm | | | | |
| --- | --- | --- | --- | --- |
| Surface data | | | | |
| Surface no. | r | d | nd | vd |
| Object plane | ∞ | ∞ | | |
| 1 | 79.408 | 2.000 | 1.85478 | 24.80 |
| 2 | 59.668 | 5.539 | 1.49700 | 81.61 |
| 3 | 235.475 | 0.150 | | |
| 4 | 53.577 | 4.446 | 1.49700 | 81.61 |
| 5 | 233.265 | Variable | | |
| 6* | 198.906 | 1.800 | 1.80610 | 40.92 |
| 7* | 14.495 | 11.300 | | |
| 8 | −22.422 | 1.200 | 1.49700 | 81.61 |
| 9 | 369.232 | 4.042 | 1.85478 | 24.80 |
| 10 | −33.522 | 0.470 | | |
| 11* | −30.265 | 1.200 | 1.80610 | 40.92 |
| 12* | −52.305 | Variable | | |
| 13(Stop) | ∞ | 1.500 | | |
| 14* | 24.819 | 6.000 | 1.58313 | 59.38 |
| 15* | −59.945 | 0.966 | | |
| 16 | 45.695 | 6.394 | 1.54814 | 45.79 |
| 17 | −29.322 | 1.000 | 1.83481 | 42.73 |
| 18 | −40.872 | 0.512 | | |
| 19 | −430.143 | 1.000 | 1.90366 | 31.32 |
| 20 | 16.022 | 8.019 | 1.49700 | 81.61 |
| 21 | −29.237 | Variable | | |
| 22 | 76.020 | 1.000 | 1.88300 | 40.80 |
| 23 | 11.751 | 1.960 | 1.89286 | 20.36 |
| 24 | 15.630 | Variable | | |
| 25 | −70.763 | 1.000 | 1.83481 | 42.73 |
| 26 | 110.058 | 0.300 | | |
| 27* | 33.654 | 7.739 | 1.49700 | 81.61 |
| 28* | −20.834 | Variable | | |
| Image plane | ∞ | | | |

| Unit mm |
| --- |
| Aspherical surface data |

6th surface k = 0.0000
A4 = −8.6297e−006, A6 = 2.5958e−008, A8 = −2.1256e−011,
A10 = 0.0000e+000, A12 = 0.0000e+000, A14 = 0.0000e+000

7th surface k = 0.0000
A4 = −2.0264e−005, A6 = −9.4477e−008, A8 = 2.9605e−010,
A10 = −2.2803e−012, A12 = 0.0000e+000, A14 = 0.0000e+000

11th surface k = 0.0000
A4 = 7.7031e−006, A6 = −6.1316e−008, A8 = 2.1189e−012,
A10 = 0.0000e+000, A12 = 0.0000e+000, A14 = 0.0000e+000

12th surface k = 0.0000
A4 = 6.7012e−007, A6 = −5.7023e−008, A8 = 0.0000e+000,
A10 = 0.0000e+000, A12 = 0.0000e+000, A14 = 0.0000e+000

14th surface k = 0.0000
A4 = −8.1238e−006, A6 = 2.4677e−008, A8 = −3.5824e−011,
A10 = 5.0000e−014, A12 = 0.0000e+000, A14 = 0.0000e+000

15th surface k = 0.0000
A4 = 2.1718e−005, A6 = 1.7140e−008, A8 = 0.0000e+000,
A10 = 0.0000e+000, A12 = 0.0000e+000, A14 = 0.0000e+000

27th surface k = 0.0000
A4 = −2.1241e−005, A6 = 1.3862e−008, A8 = 0.0000e+000,
A10 = 0.0000e+000, A12 = 0.0000e+000, A14 = 0.0000e+000

28th surface k = 0.0000
A4 = 5.1554e−006, A6 = −2.0026e−008, A8 = 3.4886e−011,
A10 = 0.0000e+000, A12 = 0.0000e+000, A14 = 0.0000e+000

| Zoom data | | | |
| --- | --- | --- | --- |
|  | WE | ST | TE |
| f | 12.241 | 34.633 | 98.028 |
| FNO. | 4.080 | 4.080 | 4.080 |
| 2ω | 85.6 | 34.1 | 12.1 |
| FB | 18.479 | 15.332 | 15.660 |
| LTL | 160.398 | 160.398 | 160.398 |
| d5 | 0.600 | 20.300 | 36.609 |
| d12 | 63.803 | 28.711 | 1.000 |
| d21 | 2.500 | 6.739 | 21.329 |
| d24 | 5.478 | 19.778 | 16.262 |
| d28 | 18.479 | 15.332 | 15.660 |

| Unit focal length |
| --- |
| f1 = 102.083   f2 = −17.283   f3 = 24.786   f4 = −22.943   f5 = 49.460 |

Example 6

| | | Unit mm | | |
|---|---|---|---|---|
| | | Surface data | | |
| Surface no. | r | d | nd | vd |
| Object plane | ∞ | ∞ | | |
| 1 | 67.413 | 1.800 | 1.90366 | 31.32 |
| 2 | 48.160 | 7.800 | 1.49700 | 81.61 |
| 3 | 253.492 | 0.150 | | |
| 4 | 57.679 | 6.000 | 1.49700 | 81.61 |
| 5 | 314.896 | Variable | | |
| 6* | 500.000 | 1.200 | 1.80139 | 45.45 |
| 7* | 13.385 | 7.761 | | |
| 8 | −27.516 | 1.100 | 1.59282 | 68.63 |
| 9 | 83.774 | 0.150 | | |
| 10 | 47.903 | 3.400 | 1.85478 | 24.80 |
| 11 | −44.791 | Variable | | |
| 12* | −20.652 | 0.900 | 1.49700 | 81.61 |
| 13* | −145.840 | Variable | | |
| 14(Stop) | ∞ | Variable | | |
| 15* | 19.570 | 6.062 | 1.59201 | 67.02 |
| 16* | −55.071 | 0.150 | | |
| 17 | 28.961 | 4.497 | 1.49700 | 81.61 |
| 18 | −126.266 | 0.150 | | |
| 19 | 183.932 | 0.800 | 1.88300 | 40.76 |
| 20 | 12.467 | 3.819 | 1.53775 | 74.70 |
| 21 | 26.753 | 0.900 | | |
| 22 | 21.226 | 0.900 | 1.78470 | 26.29 |
| 23 | 17.061 | 0.100 | | |
| 24* | 16.510 | 5.000 | 1.49700 | 81.61 |
| 25* | −35.877 | Variable | | |
| 26* | 164.252 | 0.800 | 1.80139 | 45.45 |
| 27 | 12.412 | 2.100 | 1.80810 | 22.76 |
| 28 | 16.675 | Variable | | |
| 29* | 53.911 | 6.000 | 1.49700 | 81.61 |
| 30* | −29.498 | 15.450 | | |
| Image plane | ∞ | | | |

Aspherical surface data

6th surface k = 0.0000
A4 = −2.7693e−006, A6 = 2.9856e−008, A8 = 9.2328e−011,
A10 = −6.4661e−013, A12 = 8.2818e−016, A14 = 0.0000e+000

7th surface k = 0.0000
A4 = −3.0202e−005, A6 = 1.1177e−007, A8 = −4.1977e−009,
A10 = 4.3705e−011, A12 = −1.5057e−013, A14 = 0.0000e+000

12th surface k = 0.0000
A4 = 3.8209e−007, A6 = 4.2208e−008, A8 = −5.1441e−011,
A10 = 2.3087e−012, A12 = −9.5042e−015, A14 = 0.0000e+000

13th surface k = 0.0000
A4 = −3.4362e−006, A6 = 2.2580e−008, A8 = 1.0015e−011,
A10 = 1.2156e−012, A12 = −1.5774e−014, A14 = 0.0000e+000

15th surface k = 0.0000
A4 = −2.0322e−005, A6 = −2.5513e−009, A8 = −1.1348e−011,
A10 = 5.2270e−013, A12 = 0.0000e+000, A14 = 0.0000e+000

16th surface k = 0.0000
A4 = 1.1753e−005, A6 = −3.1111e−009, A8 = 1.2603e−010,
A10 = 4.1739e−013, A12 = 0.0000e+000, A14 = 0.0000e+000

24th surface k = 0.0000
A4 = −1.4130e−005, A6 = −8.1541e−008, A8 = 5.4993e−010,
A10 = 0.0000e+000, A12 = 0.0000e+000, A14 = 0.0000e+000

-continued

Unit mm

25th surface k = 0.0000
A4 = 1.3412e−005, A6 = −8.5609e−008, A8 = 5.9421e−010,
A10 = 0.0000e+000, A12 = 0.0000e+000, A14 = 0.0000e+000

26th surface k = 0.0000
A4 = −3.0277e−006, A6 = −1.1757e−007, A8 = 3.7964e−009,
A10 = −4.8507e−011, A12 = 2.5118e−013, A14 = 0.0000e+000

29th surface k = 0.0000
A4 = 1.1025e−005, A6 = −2.9814e−008, A8 = 5.1327e−010,
A10 = −2.3174e−012, A12 = 0.0000e+000, A14 = 0.0000e+000

30th surface k = 0.0000
A4 = 1.7518e−005, A6 = −8.2120e−008, A8 = 8.0231e−010,
A10 = −2.9795e−012, A12 = 0.0000e+000, A14 = 0.0000e+000

Zoom data

|     | WE | ST | TE |
| --- | --- | --- | --- |
| f | 12.244 | 33.999 | 97.913 |
| FNO. | 4.080 | 4.080 | 4.080 |
| 2ω | 84.5 | 35.3 | 12.6 |
| FB | 15.450 | 15.450 | 15.450 |
| LTL | 126.771 | 145.217 | 168.771 |
| d5 | 0.500 | 22.762 | 45.662 |
| d11 | 3.800 | 4.474 | 5.453 |
| d13 | 25.799 | 11.448 | 2.300 |
| d14 | 10.000 | 4.500 | 1.300 |
| d25 | 0.900 | 6.783 | 16.720 |
| d28 | 8.784 | 18.262 | 20.348 |

Unit focal length f1 = 99.836    f2 = −12.502    f3 = 20.943    f4 = −23.456    f5 = 39.301
f2a = −24.26814    f2b = −48.5247

Example 7

Unit mm

Surface data

| Surface no. | r | d | nd | νd |
| --- | --- | --- | --- | --- |
| Object plane | ∞ | ∞ | | |
| 1 | 74.026 | 1.600 | 1.85478 | 24.80 |
| 2 | 54.444 | 7.700 | 1.49700 | 81.61 |
| 3 | 434.271 | 0.122 | | |
| 4 | 53.485 | 6.200 | 1.49700 | 81.61 |
| 5 | 204.026 | Variable | | |
| 6* | 500.000 | 1.000 | 1.82080 | 42.71 |
| 7* | 12.067 | 6.947 | | |
| 8 | −30.851 | 0.900 | 1.77250 | 49.60 |
| 9 | 34.123 | 0.100 | | |
| 10 | 27.807 | 5.329 | 1.85478 | 24.80 |
| 11 | −24.708 | 0.340 | | |
| 12 | −21.398 | 0.900 | 1.80400 | 46.58 |
| 13 | −197.100 | Variable | | |
| 14* | 28.511 | 3.870 | 1.51633 | 64.14 |
| 15* | −31.125 | Variable | | |
| 16* | −20.915 | 0.850 | 1.69350 | 53.18 |
| 17* | 86.262 | Variable | | |
| 18* | 41.049 | 5.001 | 1.49700 | 81.61 |
| 19* | −21.730 | 1.224 | | |
| 20(Stop) | ∞ | 1.224 | | |
| 21 | 65.714 | 0.700 | 1.85478 | 24.80 |
| 22 | 18.822 | 4.700 | 1.60562 | 43.70 |
| 23 | 621.557 | 0.200 | | |
| 24 | 26.757 | 6.147 | 1.49700 | 81.61 |
| 25 | −32.278 | Variable | | |
| 26 | 1077.672 | 0.700 | 1.88300 | 40.76 |
| 27 | 11.823 | 2.592 | 1.85478 | 24.80 |
| 28* | 28.076 | Variable | | |
| 29 | 34.332 | 1.000 | 1.90366 | 31.32 |
| 30 | 17.490 | 0.500 | | |
| 31 | 18.559 | 6.625 | 1.58267 | 46.42 |
| 32 | −14.499 | 0.000 | | |
| 33 | −14.499 | 1.000 | 1.88300 | 40.76 |
| 34 | −44.403 | Variable | | |
| Image plane | ∞ | | | |

Aspherical surface data

6th surface k = 0.0000
A4 = 9.0571e−006, A6 = −2.5119e−008, A8 = −1.0955e−011,
A10 = 1.8281e−013, A12 = 0.0000e+000, A14 = 0.0000e+000

7th surface k = 0.0000
A4 = −9.1180e−006, A6 = −1.2740e−007, A8 = 9.9066e−010,
A10 = −1.7797e−011, A12 = 0.0000e+000, A14 = 0.0000e+000

-continued

Unit mm

14th surface k = 0.0000
A4 = 7.7091e−006, A6 = −2.6934e−008, A8 = −7.1452e−010,
A10 = 1.6988e−012, A12 = 0.0000e+000, A14 = 0.0000e+000

15th surface k = 0.0000
A4 = 2.7663e−005, A6 = −1.5290e−007, A8 = −1.3930e−011,
A10 = 1.9510e−012, A12 = 0.0000e+000, A14 = 0.0000e+000

16th surface k = 0.0000
A4 = 2.8308e−005, A6 = −1.1180e−007, A8 = 9.4490e−010,
A10 = 1.9475e−012, A12 = 0.0000e+000, A14 = 0.0000e+000

17th surface k = 0.0000
A4 = 6.6121e−006, A6 = 2.6583e−008, A8 = 1.3915e−010,
A10 = 0.0000e+000, A12 = 0.0000e+000, A14 = 0.0000e+000

18th surface k = 0.0000
A4 = −2.9127e−005, A6 = −7.2962e−009, A8 = −3.0029e−011,
A10 = 0.0000e+000, A12 = 0.0000e+000, A14 = 0.0000e+000

19th surface k = 0.0000
A4 = 1.4828e−005, A6 = −4.2284e−008, A8 = 4.3046e−011,
A10 = 0.0000e+000, A12 = 0.0000e+000, A14 = 0.0000e+000

28th surface k = 0.0000
A4 = −6.0112e−006, A6 = 5.0241e−008, A8 = −8.5341e−010,
A10 = 5.8265e−012, A12 = 0.0000e+000, A14 = 0.0000e+000

Zoom data

|     | WE      | ST      | TE      |
| --- | ------- | ------- | ------- |
| f   | 12.240  | 34.999  | 97.997  |
| FNO.| 4.100   | 4.100   | 4.100   |
| 2ω  | 84.0    | 33.8    | 12.4    |
| FB  | 15.855  | 30.685  | 45.797  |
| LTL | 130.067 | 144.184 | 176.985 |
| d5  | 0.700   | 21.635  | 45.583  |
| d13 | 23.701  | 5.487   | 0.600   |
| d15 | 4.378   | 3.975   | 4.775   |
| d17 | 6.704   | 3.674   | 1.500   |
| d25 | 1.673   | 6.627   | 8.657   |
| d28 | 9.584   | 4.630   | 2.600   |
| d34 | 15.855  | 30.685  | 45.797  |

Unit focal length f1 = 93.680   f2 = −11.317   f3 = 29.471   f4 = −24.194   f5 = 17.884
f6 = −31.182  f7 = 165.165

Aberration diagrams of each example will be described below. Each aberration diagram is an aberration diagram when focused to an object at infinity. In each aberration diagram, FIY denotes the maximum image height.

FIG. 8A, FIG. 9A, FIG. 10A, FIG. 11A, FIG. 12A, FIG. 13A, and FIG. 14A show a spherical aberration (SA) at the wide angle end.

FIG. 8B, FIG. 9B, FIG. 10B, FIG. 11B, FIG. 12B, FIG. 13B, and FIG. 14B show an astigmatism (AS) at the wide angle end.

FIG. 8C, FIG. 9C, FIG. 10C, FIG. 11C, FIG. 12C, FIG. 13C, and FIG. 14C show a distortion (DT) at the wide angle end.

FIG. 8D, FIG. 9D, FIG. 10D, FIG. 11D, FIG. 12D, FIG. 13D, and FIG. 140D show a chromatic aberration of magnification (CC) at the wide angle end.

FIG. 8E, FIG. 9E, FIG. 10E, FIG. 11E, FIG. 12E, FIG. 13E, and FIG. 14E show a spherical aberration (SA) in the intermediate focal length state.

FIG. 8F, FIG. 9F, FIG. 10F, FIG. 11F, FIG. 12F, FIG. 13F, and FIG. 14F show an astigmatism (AS) in the intermediate focal length state.

FIG. 8G, FIG. 9G, FIG. 10G, FIG. 11G, FIG. 12G, FIG. 13G, and FIG. 14G show a distortion (DT) in the intermediate focal length state.

FIG. 8H, FIG. 9H, FIG. 10H, FIG. 11H, FIG. 12H, FIG. 13H, and FIG. 14H show a chromatic aberration of magnification (CC) in the intermediate focal length state.

FIG. 8I, FIG. 9I, FIG. 10I, FIG. 11I, FIG. 12I, FIG. 13I, and FIG. 14I show a spherical aberration (SA) at the telephoto end.

FIG. 8J, FIG. 9J, FIG. 10J, FIG. 11J, FIG. 12J, FIG. 13J, and FIG. 14J show an astigmatism (AS) at the telephoto end.

FIG. 8K, FIG. 9K, FIG. 10K, FIG. 11K, FIG. 12K, FIG. 13K, and FIG. 14K show a distortion (DT) at the telephoto end.

FIG. 8L, FIG. 9L, FIG. 10L, FIG. 11L, FIG. 12L, FIG. 13L, and FIG. 14L show a chromatic aberration of magnification (CC) at the telephoto end.

Next, the values of conditional expressions (1) to (36) in each example are shown below.

| Conditional expression | Example 1 | Example 2 | Example 3 |
| --- | --- | --- | --- |
| (1)$|MG_{B\_t}|$ | 2.087 | 1.984 | 2.089 |
| (2)$vd_{Gn\_min\_p}$ | 24.8 | 24.8 | 25.46 |
| (3)$Tp_{Gn\_min\_p}$ | 0.01038 | 0.01038 | 0.012736 |
| (4)$|MG_{B\_t}|/|MG_{B\_w}|$ | 2.962 | 3.005 | 2.893 |
| (5)$vd_{1G\_max\_p}$ | 81.61 | 81.54 | 81.54 |
| (6)$vd_{Gn\_max\_n}$ | 81.61 | 81.54 | 63.4 |
| (7)$|f_{Gn}/f_{GBp1}|$ | 0.651 | 0.577 | 0.596 |
| (8)$f_1/f_{GBp1}$ | 4.71 | 3.76 | 4.67 |
| (9)$|\Phi_{maxt}/f_{Gn}|$ | 1.84 | 1.71 | 1.81 |
| (10)$Tp_{Gn\_max\_n}$ | 0.027876 | 0.027876 | 0.00004 |
| (11)$vd_{GBp1\_max\_p}$ | 81.61 | 81.54 | 81.54 |
| (12)$Tp_{GBp1\_max\_p}$ | 0.027876 | 0.027876 | 0.027876 |
| (13)$vd_{GBn1\_max\_n} - vd_{GBn1\_min\_p}$ | 27.47 | 18.16 | 19.97 |
| (14)$LTL_t/f_t$ | 1.582 | 1.698 | 1.76 |
| (15)$LTL_w/f_t$ | 1.118 | 1.343 | 1.34 |
| (16)$f_1/f_t$ | 0.972 | 0.936 | 1.064 |
| (17)$Tp_{1G\_max\_p}$ | 0.027876 | 0.027876 | 0.027876 |
| (18)$nd_{Gn\_max\_n}$ | 1.80139 | 1.883 | 1.883 |
| (19)$nd_{Gn\_n1}$ | 1.80139 | 1.883 | 1.88202 |
| (20)$vd_{GBp1\_IS\_p} - vd_{GBp1\_IS\_n}$ | — | 53.75 | 34.58 |
| (21)$|f_{Gn}|/f_t$ | 0.13 | 0.14 | 0.14 |
| (22)$f_t/exp_t$ | −1.341 | −0.174 | −0.491 |
| (23)$MG_{Gn\_t}/MG_{Gn\_w}$ | 2.702 | 2.664 | 2.721 |
| (24)$nd_{Gn\_max\_p}$ | 1.8548 | 1.8548 | 2.0007 |
| (25)$|f_1/f_{Gn}|$ | 7.24 | 6.51 | 7.85 |
| (26)$|f_{GBp1}/f_{GBn1}|$ | 0.71 | 0.81 | 0.93 |
| (27)$|f_{GBn1}/f_{GBp2}|$ | 0.69 | 0.65 | 0.58 |
| (28)$f_t/f_w$ | 8.00 | 8.01 | 8.00 |
| (29)$Fno_t$ | 4.05 | 4.07 | 5.07 |
| (30)$|f_{Gn}/f_{GB}|$ | 0.32 | 0.33 | 0.34 |

| Conditional expression | Example 4 | Example 5 | Example 6 |
| --- | --- | --- | --- |
| (1)$|MG_{B\_t}|$ | 1.992 | 2.234 | 2.366 |
| (2)$vd_{Gn\_min\_p}$ | 29.13 | 24.8 | 24.8 |
| (3)$Tp_{Gn\_min\_p}$ | 0.00451 | 0.01038 | 0.01038 |
| (4)$|MG_{B\_t}|/|MG_{B\_w}|$ | 2.839 | 4.225 | 3.254 |
| (5)$vd_{1G\_max\_p}$ | 74.7 | 81.61 | 81.61 |
| (6)$vd_{Gn\_max\_n}$ | 68.63 | 81.61 | 81.61 |
| (7)$|f_{Gn}/f_{GBp1}|$ | 0.616 | 0.697 | 0.597 |
| (8)$f_1/f_{GBp1}$ | 4.719 | 4.12 | 4.77 |
| (9)$|\Phi_{maxt}/f_{Gn}|$ | 1.6862 | 1.39 | 1.92 |
| (10)$Tp_{Gn\_max\_n}$ | 0.01241 | 0.027876 | 0.027876 |
| (11)$vd_{GBp1\_max\_p}$ | 70.23 | 81.61 | 81.61 |
| (12)$Tp_{GBp1\_max\_p}$ | 0.00087 | 0.027876 | 0.027876 |
| (13)$vd_{GBn1\_max\_n} - vd_{GBn1\_min\_p}$ | 17.31 | 20.44 | 22.69 |

-continued

| | | | |
|---|---|---|---|
| (14)$LTL_t/f_t$ | 1.782 | 1.636 | 1.738 |
| (15)$LTL_w/f_t$ | 1.38 | 1.636 | 1.309 |
| (16)$f_1/f_t$ | 1.108 | 1.041 | 1.02 |
| (17)$Tp_{1G\_max\_p}$ | 0.01722 | 0.027876 | 0.027876 |
| (18)$nd_{Gn\_max\_n}$ | 1.883 | 1.8061 | 1.80139 |
| (19)$nd_{Gn\_n1}$ | 1.88202 | 1.8061 | 1.80139 |
| (20)$vd_{GBp1\_IS\_p} - vd_{GBp1\_IS\_n}$ | 34.58 | 50.29 | 55.32 |
| (21)$|f_{Gn}|/f_t$ | 0.1446 | 0.18 | 0.13 |
| (22)$f_t/exp_t$ | 0.4479 | −1.479 | −0.844 |
| (23)$MG_{Gn\_t}/MG_{Gn\_w}$ | 2.6728 | 1.895 | 2.457 |
| (24)$nd_{Gn\_max\_p}$ | 2.001 | 1.8548 | 1.8548 |
| (25)$|f_1/f_{Gn}|$ | 7.66 | 5.91 | 7.99 |
| (26)$|f_{GBp1}/f_{GBn1}|$ | 0.94 | 1.08 | 0.89 |
| (27)$|f_{GBn1}/f_{GBp2}|$ | 0.59 | 0.46 | 0.60 |
| (28)$f_t/f_w$ | 7.59 | 8.01 | 8.00 |
| (29)$Fno_t$ | 4.10 | 4.08 | 4.08 |
| (30)$|f_{Gn}/f_{GB}|$ | 0.34 | 0.39 | 0.20 |

| Conditional expression | Example 7 |
|---|---|
| (1)$|MG_{B\_t}|$ | 2.463 |
| (2)$vd_{Gn\_min\_p}$ | 24.8 |
| (3)$Tp_{Gn\_min\_p}$ | 0.01038 |
| (4)$|MG_{B\_t}|/|MG_{B\_w}|$ | 2.983 |
| (5)$vd_{1G\_max\_p}$ | 81.61 |
| (6)$vd_{Gn\_max\_n}$ | — |
| (7)$|f_{Gn}/f_{GBp1}|$ | 0.384 |
| (8)$f_1/f_{GBp1}$ | 3.18 |
| (9)$|\Phi_{max}/f_{Gn}|$ | 2.11 |
| (10)$Tp_{Gn\_max\_n}$ | −0.01014 |
| (11)$vd_{GBp1\_max\_p}$ | — |
| (12)$Tp_{GBp1\_max\_p}$ | — |
| (13)$vd_{GBn1\_max\_n} - vd_{GBn1\_min\_p}$ | 15.96 |
| (14)$LTL_t/f_t$ | 1.806 |
| (15)$LTL_w/f_t$ | 1.327 |
| (16)$f_1/f_t$ | 0.956 |
| (17)$Tp_{1G\_max\_p}$ | 0.027876 |
| (18)$nd_{Gn\_max\_n}$ | 1.8208 |
| (19)$nd_{Gn\_n1}$ | 1.8208 |
| (20)$vd_{GBp1\_IS\_p} - vd_{GBp1\_IS\_n}$ | — |
| (21)$|f_{Gn}|/f_t$ | 0.12 |
| (22)$f_t/exp_t$ | −2.213 |
| (23)$MG_{Gn\_t}/MG_{Gn\_w}$ | 2.684 |
| (24)$nd_{Gn\_max\_p}$ | 1.8548 |
| (25)$|f_1/f_{Gn}|$ | 8.28 |
| (26)$|f_{GBp1}/f_{GBn1}|$ | 1.22 |
| (27)$|f_{GBn1}/f_{GBp2}|$ | 1.35 |
| (28)$f_t/f_w$ | 8.01 |
| (29)$Fno_t$ | 4.10 |
| (30)$|f_{Gn}/f_{GB}|$ | 0.50 |

Figure 15:
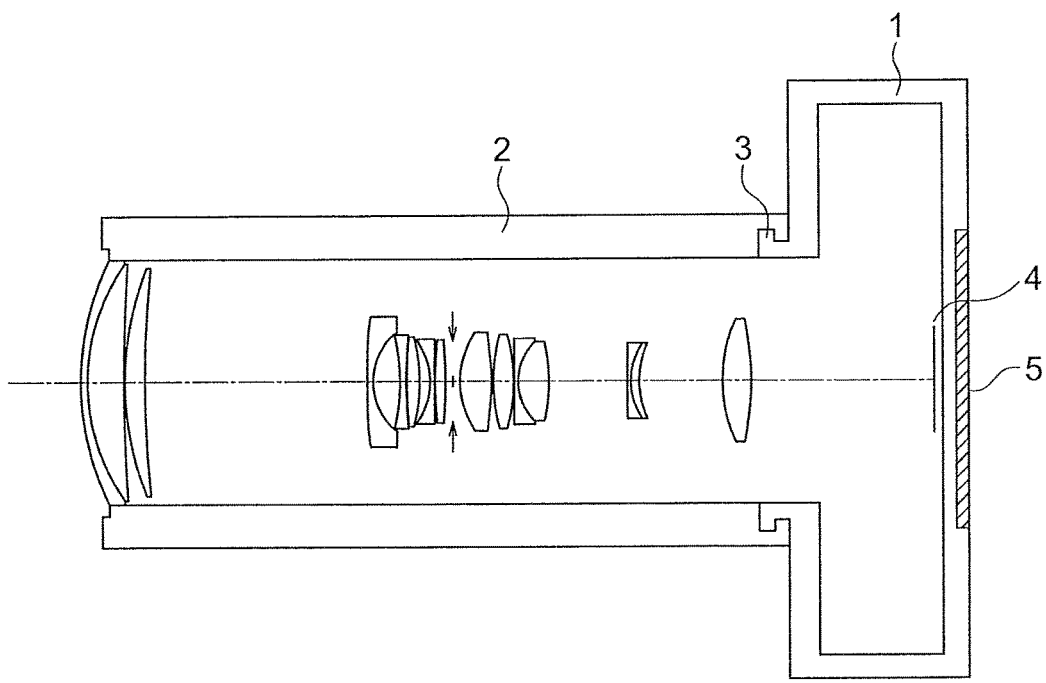
FIG. 15 is a cross-sectional view of an image pickup apparatus.

FIG. 15 is a cross-sectional view of a single-lens mirrorless camera as an electronic image pickup apparatus. In FIG. 15, a photographic optical system 2 is disposed inside a lens barrel of a single-lens mirrorless camera 1. A mount portion 3 enables the photographic optical system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the photographic optical system 2 of the single-lens mirrorless camera 1, the zoom lens described in any one of the examples from the first example to the seventh example is to be used.

Figure 16:
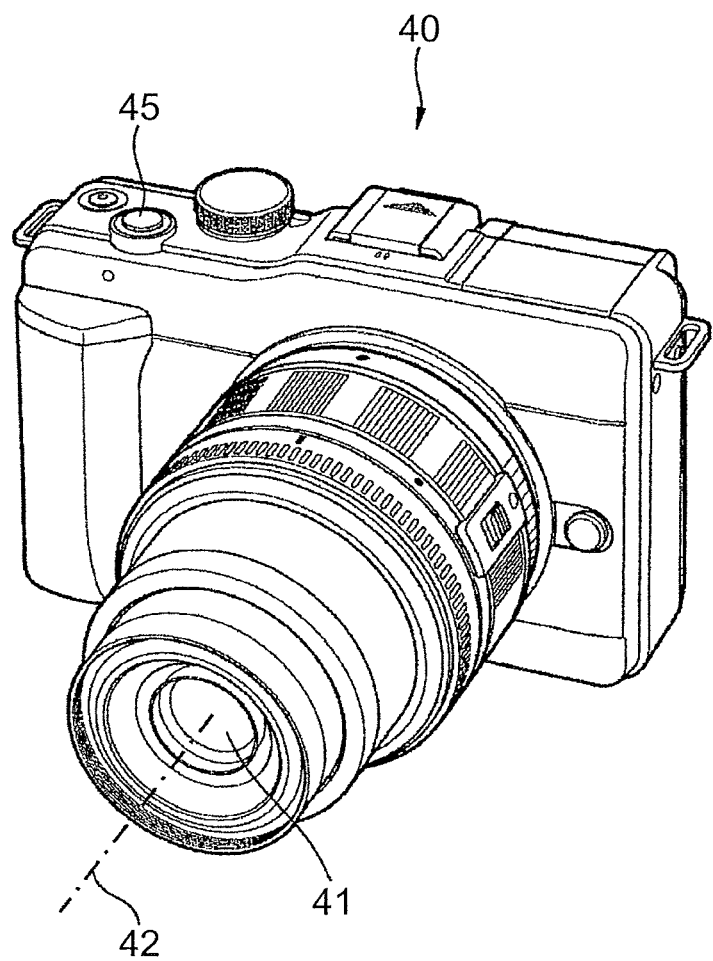
FIG. 16 is a front perspective view showing an appearance of the image pickup apparatus.
Figure 17:
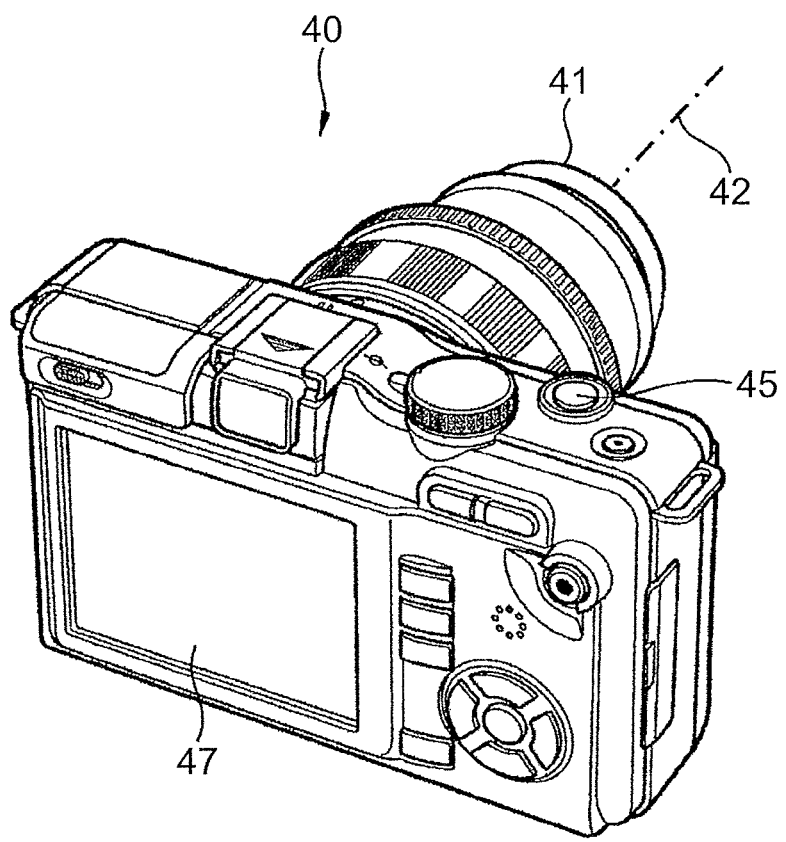
FIG. 17 is a rear perspective view of the image pickup apparatus.

FIG. 16 and FIG. 17 are conceptual diagrams of an arrangement of the image pickup apparatus having the zoom lenses shown in examples from the first example to the seventh example. FIG. 16 is a front perspective view showing an appearance of a digital camera 40 as the image pickup apparatus, and FIG. 17 is a rear perspective view of the digital camera 40. The zoom lens according to the present example is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the zoom lens according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a storage means.

Figure 18:
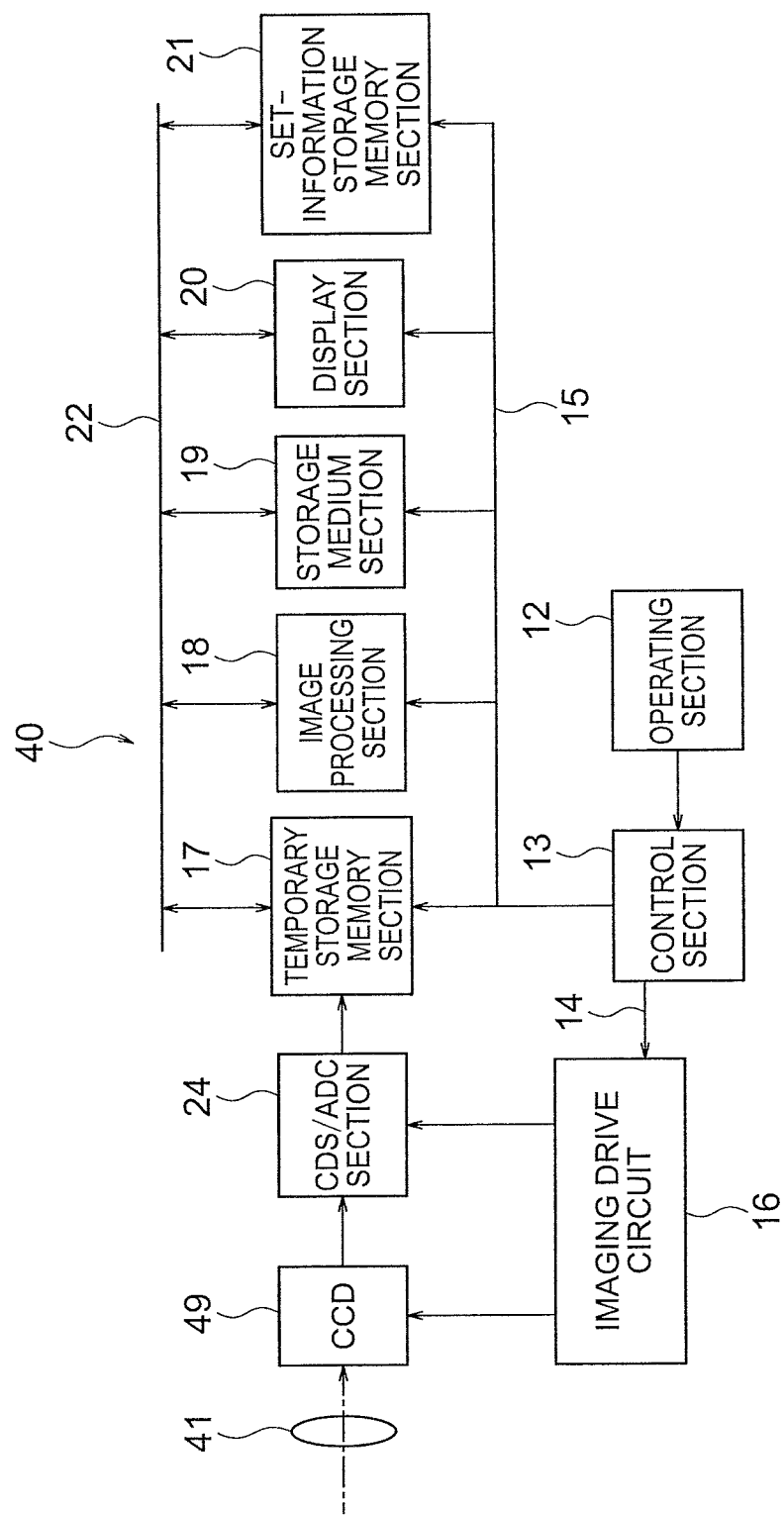
FIG. 18 is a structural block diagram of an internal circuit of main components of the image pickup apparatus.

FIG. 18 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 18, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image formed by the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays photographed RAW data, image data and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

In the digital camera 40 configured in such manner, by using the zoom lens according to the example as the photographic optical system 41, an angle of view at a wide angle end and a range of angle of view that can be captured are wide, and it is possible to obtain an image with lesser noise.

The present invention can have various modified examples without departing from the scope of the invention. Moreover, shapes of lenses and the number of lenses are not necessarily restricted to the shapes and the number of lenses indicated in the examples. In the examples described heretofore, the cover glass C may not be disposed necessarily. A lens that is not shown in the diagrams of the examples described above, and that does not have a refractive power practically may be disposed in a lens unit or outside the lens unit. In each of the examples described above, it is possible to make an arrangement such that the zoom lens includes five lens units practically.

According to the present invention, it is possible to provide a zoom lens having a short overall length, in which various aberrations are corrected favorably, while having a wide angle of view and high zoom ratio, and an image pickup apparatus using such zoom lens.

As described above, the present invention is suitable for a zoom lens having a short overall length, in which various aberrations are corrected favorably, while having a wide angle of view and a high zoom ratio, and for an image pickup apparatus using such zoom lens.

What is claimed is:

1. A zoom lens comprising:
a front-side lens unit;
a rear-side lens unit; and
an aperture stop,
wherein:
the front-side lens unit includes either one lens unit having a negative refractive power or two lens units having a negative refractive power, and has a negative refractive power as a whole, wherein the front-side lens unit includes at least a negative lens and a positive lens,
the rear-side lens unit is disposed on an image side of the front-side lens unit, and has a positive refractive power as a whole at a telephoto end,
the rear-side lens unit includes a plurality of lens units, including an object-side positive lens unit having a positive refractive power, which is disposed nearest to object, and an image-side lens unit, which is disposed nearest to image, and is fixed in position,
a distance between the front-side lens unit and the object-side positive lens unit changes to become narrower at the telephoto end than at a wide angle end,
the aperture stop is disposed on the image side of the front-side lens unit, and
the following conditional expressions (1), (2), (3), (4"), and (6') are satisfied:

$$1.2 \leq |MG_{B\_t}| \leq 6 \qquad (1),$$

$$10 \leq vd_{Gn\_min\_p} \leq 27 \qquad (2),$$

$$-0.03 \leq Tp_{Gn\_min\_p} \leq 0.014 \qquad (3),$$

$$2.6 \leq |MG_{B\_t}|/|MG_{B\_w}| \leq 7.0 \qquad (4''), \text{ and}$$

$$55.0 \leq vd_{Gn\_max\_n} \qquad (6'),$$

where:
$MG_{B\_t}$ denotes a lateral magnification at the telephoto end of the rear-side lens unit,
$vd_{Gn\_min\_p}$ denotes a minimum Abbe number from among Abbe numbers for any positive lens in the front-side lens unit,
$vd_{Gn\_max\_n}$ denotes a maximum Abbe number from among Abbe numbers for any negative lens in the front-side lens unit, $$Tp_{Gn\_min\_p} = \theta gF_{Gn\_p} - (-0.0016 \times vd_{Gn\_p} + 0.6415),$$

$$\theta gF_{Gn\_p} = (ng_{Gn\_p} - nF_{Gn\_p})/(nF_{Gn\_p} - nC_{Gn\_p}),$$

$vd_{Gn\_p}$ denotes an Abbe number for a predetermined positive lens in the front-side lens unit,
$ng_{Gn\_p}$, $nF_{Gn\_p}$, and $nC_{Gn\_p}$ are refractive indices of the predetermined positive lens in the front-side lens unit for a g-line, an F-line, and a C-line respectively,
the predetermined positive lens in the front-side lens unit is a positive lens for which the Abbe number is the minimum, from among the Abbe numbers for any positive lens in the front-side lens unit, and
$MG_{B\_w}$ denotes a lateral magnification at the wide angle end of the rear-side lens unit.

2. The zoom lens according to claim 1, further comprising:
a first lens unit having a positive refractive power,
wherein:
the first lens unit is disposed on an object side of the front-side lens unit, and
a distance between the first lens unit and the front-side lens unit changes to become wider at the telephoto end than at the wide angle end.

3. The zoom lens according to claim 1, wherein:
the front-side lens unit includes a first sub-unit having a negative refractive power, and a second sub-unit having a negative refractive power, and
at a time of focusing, a distance between the first sub-unit and the second sub-unit changes.

4. The zoom lens according to claim 1, wherein:
the front-side lens unit includes a first sub-unit having a negative refractive power, and a second sub-unit having a negative refractive power, and
at a time of zooming, a distance between the first sub-unit and the second sub-unit changes.

5. The zoom lens according to claim 1, wherein the following conditional expression (7) is satisfied:

$$0.3 \leq |f_{Gn}/f_{GBp1}| \leq 0.89 \qquad (7),$$

where:
$f_{Gn}$ denotes a focal length of the front-side lens unit, and
$f_{GBp1}$ denotes a focal length of the object-side positive lens unit.

6. The zoom lens according to claim 1, further comprising:
a first lens unit having a positive refractive power,
wherein:
the first lens unit is disposed on an object side of the front-side lens unit, and
the following conditional expression (8) is satisfied:

$$2.8 \leq f_1/f_{GBp1} \leq 6.3 \qquad (8),$$

where:
$f_1$ denotes a focal length of the first lens unit, and
$f_{GBp1}$ denotes a focal length of the object-side positive lens unit.

7. The zoom lens according to claim 1, wherein the following conditional expression (9) is satisfied:

$$1.05 \leq |\phi_{maxt}/f_{Gn}| \leq 3.0 \qquad (9),$$

where:
$\phi_{maxt}$ denotes a maximum diameter of an entrance pupil at a telephoto end, and is expressed by $\phi_{maxt}=f_t/Fno_t$,
$f_t$ denotes a focal length of the overall zoom lens at the telephoto end,
$Fno_t$ denotes a smallest F-number at the telephoto end, and
$f_{Gn}$ denotes a focal length of the front-side lens unit.

8. The zoom lens according to claim 1, further comprising:
a first lens unit including at least a negative lens and a positive lens,
wherein the following conditional expression (5) is satisfied:

$$70.3 \leq vd_{1G\_max\_p} \qquad (5),$$

where:
$vd_{1G\_max\_p}$ denotes a maximum Abbe number from among Abbe numbers for any positive lens in the first lens unit.

9. The zoom lens according to claim 1, wherein the following conditional expression (10) is satisfied:

$$-0.012 \leq Tp_{Gn\_max\_n} \leq 0.06 \qquad (10),$$

where:

$$Tp_{Gn\_max\_n} = \theta gF_{Gn\_n} - (-0.0016 \times vd_{Gn\_n} + 0.6415),$$

$$\theta gF_{Gn\_n} = (ng_{Gn\_n} - nF_{Gn\_n})/(nF_{Gn\_n} - nC_{Gn\_n}),$$

$vd_{Gn\_n}$ denotes an Abbe number for a predetermined negative lens in the front-side lens unit,
$ng_{Gn\_n}$, $nF_{Gn\_n}$, and $nC_{Gn\_n}$ denote refractive indices of the predetermined negative lens in the front-side lens unit, for a g-line, for an F-line, and for a C-line respectively, and
the predetermined negative lens in the front-side lens unit is a lens for which the Abbe number is maximum, from among the Abbe numbers for any negative lens in the front-side lens unit.

10. The zoom lens according to claim 1, wherein:
the object-side positive lens unit includes at least a negative lens and a positive lens, and
the following conditional expression (11) is satisfied:

$$60.0 \leq vd_{GBp1\_max\_p} \qquad (11),$$

where:
$vd_{GBp1\_max\_p}$ denotes a maximum Abbe number from among Abbe numbers for any positive lens in the object-side positive lens unit.

11. The zoom lens according to claim 1, wherein the following conditional expression (12) is satisfied:

$$0.005 \leq Tp_{GBp1\_max\_p} \leq 0.06 \qquad (12),$$

where:

$$Tp_{GBp1\_max\_p} = \theta gF_{GBp1\_p} - (-0.0016 \times vd_{GBp1\_p} + 0.6415),$$

$$\theta gF_{GBp1\_p} = (ng_{GBp1\_p} - nF_{GBp1\_p})/(nF_{GBp1\_p} - nC_{GBp1\_p}),$$

$vd_{GBp1\_p}$ denotes an Abbe number for a predetermined positive lens in the object-side positive lens unit,
$ng_{GBp1\_p}$, $nF_{GBp1\_p}$, and $nC_{GBp1\_p}$ denote refractive indices of the predetermined positive lens in the object-side positive lens unit, for a g-line, for an F-line, and for a C-line respectively, and
the predetermined positive lens in the object-side positive lens unit is a lens for which the Abbe number is maximum, from among Abbe numbers for any positive lens in the object-side positive lens unit.

12. The zoom lens according to claim 1, wherein:
the rear-side lens unit includes an object-side negative lens unit having a negative refractive power,
the object-side negative lens unit is disposed on the image side of the object-side positive lens unit, and
the object-side negative lens unit moves to be positioned closer to an object side at the telephoto end than at the wide angle end.

13. The zoom lens according to claim 1, wherein:
the rear-side lens unit includes an object-side negative lens unit having a negative refractive power,
the object-side negative lens unit includes at least a negative lens and a positive lens, and
the following conditional expression (13) is satisfied:

$$6.0 \leq vd_{GBn1\_max\_n} - vd_{GBn1\_min\_p} \leq 45 \qquad (13),$$

where:
$vd_{GBn1\_max\_n}$ denotes a maximum Abbe number from among Abbe numbers for any negative lens in the object-side negative lens unit, and
$vd_{GBn1\_min\_p}$ denotes a minimum Abbe number from among Abbe numbers for any positive lens in the object-side negative lens unit.

14. The zoom lens according to claim 1, wherein the following conditional expression (14) is satisfied:

$$1.0 \leq LTL_t/f_t \leq 2.8 \qquad (14),$$

where:
$LTL_t$ denotes a total length of the overall zoom lens at the telephoto end, and
$f_t$ denotes a focal length of the overall zoom lens at the telephoto end.

15. The zoom lens according to claim 1, wherein the following conditional expression (15) is satisfied:

$$0.7 \leq LTL_w/f_t \leq 2.2 \qquad (15),$$

where:
$LTL_w$ denotes a total length of the overall zoom lens at the wide angle end, and
$f_t$ denotes a focal length of the overall zoom lens at the telephoto end.

16. The zoom lens according to claim 2, wherein the following conditional expression (16) is satisfied:

$$0.7 \leq f_1/f_t \leq 1.6 \qquad (16),$$

where:
$f_1$ denotes a focal length of the first lens unit, and
$f_t$ denotes a focal length of the overall zoom lens at the telephoto end.

17. The zoom lens according to claim 2, wherein the following conditional expression (17) is satisfied:

$$0.005 \leq Tp_{1G\_max\_p} \leq 0.06 \qquad (17),$$

where:

$$Tp_{1G\_max\_p} = \theta gF_{1G\_p} - (-0.0016 \times vd_{1G\_p} + 0.6415),$$

$$\theta gF_{1G\_p} = (ng_{1G\_p} - nF_{1G\_p})/(nF_{1G\_p} - nC_{1G\_p}),$$

$vd_{1G\_p}$ denotes an Abbe number for a predetermined positive lens in the first lens unit,
$ng_{1G\_p}$, $nF_{1G\_p}$, and $nC_{1G\_p}$ denote refractive indices of the predetermined positive lens in the first lens unit, for a g-line, for an F-line, and for a C-line respectively, and
the predetermined positive lens in the first lens unit is a lens for which the Abbe number is maximum, from among Abbe numbers for any positive lens in the first lens unit.

18. The zoom lens according to claim 1, wherein:
the rear-side lens unit includes an object-side negative lens unit having a negative refractive power, and
the object-side negative lens unit is a focusing lens unit.

19. The zoom lens according to claim 1, wherein the front-side lens unit includes at least two negative lenses and one positive lens.

20. The zoom lens according to claim 1, wherein the following conditional expression (18) is satisfied:

$$1.73 \leq nd_{Gn\_max\_n} \leq 2.3 \qquad (18),$$

where:
$nd_{Gn\_max\_n}$ denotes a maximum refractive index from among refractive indices of any negative lens in the front-side lens unit.

21. The zoom lens according to claim 1, wherein:
the front-side lens unit includes a negative lens having a concave surface directed toward the image side, which is positioned nearest to object,
in the negative lens which is positioned nearest to object, an absolute value of a radius of curvature of an image-side surface is smaller as compared to an absolute value of a radius of curvature of an object-side surface, and
the following conditional expression (19) is satisfied:

$$1.73 \leq nd_{Gn\_n1} \leq 2.3 \qquad (19),$$

where:
$nd_{Gn\_n1}$ denotes a refractive index of the negative lens nearest to object in the front-side lens unit.

22. The zoom lens according to claim 1, wherein:
the front-side lens unit includes in order from an object side to the image side, a negative lens having a concave surface directed toward the image side, a negative lens, and a positive lens having a convex surface directed toward the image side, and
in the negative lens having the concave surface directed toward the image side, an absolute value of a radius of curvature of an image-side surface is smaller as compared to an absolute value of a radius of curvature of an object-side surface.

23. The zoom lens according to claim 1, wherein:
the front-side lens unit includes a first sub-unit having a negative refractive power, and a second sub-unit having a negative refractive power,
the first sub-unit includes in order from an object side to the image side, a negative lens having a concave surface directed toward the image side, a negative lens, and a positive lens having a convex surface directed toward the image side, and
in the negative lens having the concave surface directed toward the image side, an absolute value of a radius of curvature of an image-side surface is smaller as compared to an absolute value of a radius of curvature of an object-side surface.

24. The zoom lens according to claim 1, comprising in order from an object side:
a first lens unit having a positive refractive power;
the front-side lens unit;
the object-side positive lens unit;
an object-side negative lens unit having a negative refractive power; and
an image-side lens unit having a positive refractive power, wherein:
at the time of zooming, distances between lens units change, and
the aperture stop is positioned on the image side of the front-side lens unit and on the object side of the object-side positive lens unit.

25. The zoom lens according to claim 1, wherein:
the object-side positive lens unit includes a positive lens for image stabilization, and
an image shift due to camera shake is corrected by shifting the positive lens for image stabilization in a direction perpendicular to an optical axis.

26. The zoom lens according to claim 25, wherein:
the object-side positive lens unit includes a negative lens for image stabilization, and
the following conditional expression (20) is satisfied:

$$17 \leq vd_{GBp1\_IS\_p} - vd_{GBp1\_IS\_n} \leq 65 \qquad (20),$$

where:
$vd_{GBp1\_IS\_p}$ denotes a maximum Abbe number from among Abbe numbers for the positive lens for image stabilization, and
$vd_{GBp1\_IS\_n}$ denotes a minimum Abbe number from among Abbe numbers for the negative lens for image stabilization.

27. The zoom lens according to claim 1, wherein:
the rear-side lens unit includes an object-side negative lens unit,
the object-side negative lens unit is disposed on the image side of the object-side positive lens unit, and
correction of an image shift due to camera shake is carried out by shifting the object-side negative lens unit in a direction perpendicular to an optical axis.

28. The zoom lens according to claim 1, wherein the following conditional expression (21) is satisfied:

$$0.05 \leq |f_{Gn}|/f_t \leq 0.5 \qquad (21),$$

where:
$f_{Gn}$ denotes a focal length of the front-side lens unit, and
$f_t$ denotes a focal length of the overall zoom lens at the telephoto end.

29. The zoom lens according to claim 1, further comprising:

a first lens unit having a positive refractive power,
wherein the first lens unit includes at least one negative lens and two positive lenses.

30. The zoom lens according to claim 1, further comprising:
a first lens unit having a positive refractive power,
wherein the first lens unit moves to be positioned closer to an object side at the telephoto end than at the wide angle end.

31. The zoom lens according to claim 1, wherein the aperture stop is disposed between the front-side lens unit and the object-side positive lens unit.

32. The zoom lens according to claim 1, wherein the object-side positive lens unit includes at least two lens units having a positive refractive power.

33. The zoom lens according to claim 1, wherein the following conditional expression (22) is satisfied:

$$-2.5 \le f_t/\exp_t \le 0.6 \quad (22),$$

where:
$f_t$ denotes a focal length of the overall zoom lens at the telephoto end, and
$\exp_t$ denotes a distance from a paraxial image forming surface up to an exit pupil of the zoom lens at the telephoto end.

34. An image pickup apparatus comprising:
the zoom lens according to claim 1; and
an image pickup element which has an image pickup surface.

35. A zoom lens comprising:
a front-side lens unit;
a rear-side lens unit; and
an aperture stop,
wherein:
the front-side lens unit includes either one lens unit having a negative refractive power or two lens units having a negative refractive power, and has a negative refractive power as a whole, wherein the front-side lens unit includes at least a negative lens and a positive lens,
the rear-side lens unit is disposed on an image side of the front-side lens unit, and has a positive refractive power as a whole at a telephoto end,
the rear-side lens unit includes a plurality of lens units, including an object-side positive lens unit having a positive refractive power which is disposed nearest to object, and an image-side lens unit, which is disposed nearest to image, and is fixed in position,
a distance between the front-side lens unit and the object-side positive lens unit changes to become narrower at the telephoto end than at the wide angle end,
the aperture stop is disposed on the image side of the front-side lens unit, and
the following conditional expressions (1'), (3), (4''), and (6') are satisfied:

$$1.26 \le |MG_{B\_t}| \le 7 \quad (1'),$$

$$-0.015 \le Tp_{Gn\_min\_p} \le 0.014 \quad (3'),$$

$$2.6 \le |MG_{B\_t}|/|MG_{B\_w}| \le 7.0 \quad (4''), \text{ and}$$

$$55.0 \le vd_{Gn\_max\_n} \quad (6'),$$

where:
$MG_{B\_t}$ denotes a lateral magnification at the telephoto end of the rear-side lens unit, $$Tp_{Gn\_min\_p} = \theta gF_{Gn\_p} - (-0.0016 \times vd_{Gn\_p} + 0.6415),$$

$$\theta gF_{Gn\_p} = (ng_{Gn\_p} - nF_{Gn\_p})/(nF_{Gn\_p} - nC_{Gn\_p}),$$

$vd_{Gn\_p}$ denotes an Abbe number for a predetermined positive lens in the front-side lens unit,
$vd_{Gn\_max\_n}$ denotes a maximum Abbe number from among Abbe numbers for any negative lens in the front-side lens unit,
$ng_{Gn\_p}$, $nF_{Gn\_p}$, and $nC_{Gn\_p}$ are refractive indices of the predetermined positive lens in the front-side lens unit for a g-line, an F-line, and a C-line respectively,
the predetermined positive lens in the front-side lens unit is a positive lens for which the Abbe number is minimum, from among the Abbe numbers for any positive lens in the front-side lens unit, and
$MG_{B\_w}$ denotes a lateral magnification at the wide angle end of the rear-side lens unit.

36. A zoom lens comprising:
a first lens unit having a positive refractive power;
a front-side lens unit;
a rear-side lens unit; and
an aperture stop,
wherein:
the first lens unit is disposed on an object side of the front-side lens unit,
the front-side lens unit includes either one lens unit having a negative refractive power or two lens units having a negative refractive power, and has a negative refractive power as a whole, wherein the front-side lens unit includes at least a negative lens and a positive lens,
the rear-side lens unit is disposed on an image side of the front-side lens unit, and has a positive refractive power as a whole at a telephoto end,
the rear-side lens unit includes a plurality of lens units, including an object-side positive lens unit having a positive refractive power which is disposed nearest to object, and an image-side lens unit, which is disposed nearest to image, and is fixed in position,
a distance between the first lens unit and the front-side lens unit changes to become wider at the telephoto end than at a wide angle end,
a distance between the front-side lens unit and the object-side positive lens unit changes to become narrower at the telephoto end than at the wide angle end,
the aperture stop is disposed on the image side of the front-side lens unit,
the following conditional expressions (2'), (3), (6'), (9''), and (12) are satisfied:

$$15 \le vd_{Gn\_min\_p} \le 27 \quad (2'),$$

$$-0.03 \le Tp_{Gn\_min\_p} \le 0.014 \quad (3),$$

$$55.0 \le vd_{Gn\_max\_n} \quad (6'),$$

$$1.05 \le |\phi_{max}/f_{Gn}| \le 2.8 \quad (9''), \text{ and}$$

$$0.005 \le Tp_{GBp1\_max\_p} \le 0.06 \quad (12),$$

where:
$vd_{Gn\_min\_p}$ denotes a minimum Abbe number from among Abbe numbers for any positive lens in the front-side lens unit,
$vd_{Gn\_max\_n}$ denotes a maximum Abbe number from among Abbe numbers for any negative lens in the front-side lens unit, $Tp_{Gn\_min\_p} = \theta gF_{Gn\_p} - (-0.0016 \times vd_{Gn\_p} + 0.6415)$, $\theta gF_{Gn\_p} = (ng_{Gn\_p} - nF_{Gn\_p})/(nF_{Gn\_p} - nC_{Gn\_p})$, $vd_{Gn\_p}$ denotes an Abbe number for a predetermined positive lens in the front-side lens unit, $ng_{Gn\_p}$, $nF_{Gn\_p}$, and $nC_{Gn\_p}$ are refractive indices of the predetermined positive lens in the front-side lens unit for a g-line, an F-line, and a C-line respectively, the predetermined positive lens in the front-side lens unit is a positive lens for which the Abbe number is the minimum, from among the Abbe numbers for any positive lens in the front-side lens unit, $\phi_{maxt}$ denotes a maximum diameter of an entrance pupil at a telephoto end, and is expressed by $\phi_{maxt} = f_t/Fno_t$, $f_t$ denotes a focal length of the overall zoom lens at the telephoto end, $Fno_t$ denotes a smallest F-number at the telephoto end, $f_{Gn}$ denotes a focal length of the front-side lens unit, $Tp_{GBp1\_max\_p} = \theta gF_{GBp1\_p} - (-0.0016 \times vd_{GBp1\_p} + 0.6415)$, $\theta gF_{GBp1\_p} = (ng_{GBp1\_p} - nF_{GBp1\_p})/(nF_{GBp1\_p} - nC_{GBp1\_p})$ $vd_{GBp1\_p}$ denotes an Abbe number for a predetermined positive lens in the object-side positive lens unit, $ng_{GBp1\_p}$, $nF_{GBp1\_p}$, and $nC_{GBp1\_p}$ denote refractive indices of the predetermined positive lens in the object-side positive lens unit, for a g-line, for an F-line, and for a C-line respectively, and the predetermined positive lens in the object-side positive lens unit is a lens for which the Abbe number is maximum, from among Abbe numbers for any positive lens in the object-side positive lens unit.

37. The zoom lens according to claim 36, wherein the following conditional expression (4') is satisfied:

$$1.8 \leq |MG_{B\_t}|/|MG_{B\_w}| \leq 7.0 \quad (4'),$$

where:

$MG_{B\_t}$ denotes a lateral magnification at the telephoto end of the rear-side lens unit, and $MG_{B\_w}$ denotes a lateral magnification at the wide angle end of the rear-side lens unit.

38. The zoom lens according to claim 36, wherein the following conditional expression (1") is satisfied:

$$1.2 \leq |MG_{B\_t}| \leq 7.0 \quad (1''),$$

where:

$MG_{B\_t}$ denotes a lateral magnification at the telephoto end of the rear-side lens unit.

39. A zoom lens comprising:

a first lens unit having a positive refractive power;
a front-side lens unit;
a rear-side lens unit; and
an aperture stop, wherein:

the first lens unit is disposed on an object side of the front-side lens unit, the front-side lens unit includes either one lens unit having a negative refractive power or two lens units having a negative refractive power, and has a negative refractive power as a whole, wherein the front-side lens unit includes at least a negative lens and a positive lens, the rear-side lens unit is disposed on an image side of the front-side lens unit, and has a positive refractive power as a whole at a telephoto end, the rear-side lens unit includes a plurality of lens units, including an object-side positive lens unit having a positive refractive power which is disposed nearest to object, and an image-side lens unit, which is disposed nearest to image, and is fixed in position, a distance between the first lens unit and the front-side lens unit changes to become wider at the telephoto end than at a wide angle end, a distance between the front-side lens unit and the object-side positive lens unit changes to become narrower at the telephoto end than at the wide angle end, the aperture stop is disposed on the image side of the front-side lens unit, and the following conditional expressions (3"), (5), (6'), and (12) are satisfied:

$$-0.03 \leq Tp_{Gn\_min\_p} \leq 0.016 \quad (3''),$$

$$70.3 \leq vd_{1G\_max\_p} \quad (5),$$

$$55.0 \leq vd_{Gn\_max\_n} \quad (6'), \text{ and}$$

$$0.005 \leq Tp_{GBp1\_max\_p} \leq 0.06 \quad (12),$$

where:

$Tp_{Gn\_min\_p} = \theta gF_{Gn\_p} - (-0.0016 \times vd_{Gn\_p} + 0.6415)$, $\theta gF_{Gn\_p} = (ng_{Gn\_p} - nF_{Gn\_p})/(nF_{Gn\_p} - nC_{Gn\_p})$, $vd_{Gn\_p}$ denotes an Abbe number for a predetermined positive lens in the front-side lens unit, $ng_{Gn\_p}$, $nF_{Gn\_p}$, and $nC_{Gn\_p}$ are refractive indices of the predetermined positive lens in the front-side lens unit for a g-line, an F-line, and a C-line respectively, the predetermined positive lens in the front-side lens unit is a positive lens for which the Abbe number is minimum, from among Abbe numbers for any positive lens in the front-side lens unit, $vd_{1G\_max\_p}$ denotes a maximum Abbe number from among Abbe numbers for any positive lens in the first lens unit, $vd_{Gn\_max\_n}$ denotes a maximum Abbe number from among Abbe numbers for any negative lens in the front-side lens unit, $Tp_{GBp1\_max\_p} = \theta gF_{GBp1\_p} - (-0.0016 \times vd_{GBp1\_p} + 0.6415)$, $\theta gF_{GBp1\_p} = (ng_{GBp1\_p} - nF_{GBp1\_p})/(nF_{GBp1\_p} - nC_{GBp1\_p})$, $vd_{GBp1\_p}$ denotes an Abbe number for a predetermined positive lens in the object-side positive lens unit, $ng_{GBp1\_p}$, $nF_{GBp1\_p}$, and $nC_{GBp1\_p}$ denote refractive indices of the predetermined positive lens in the object-side positive lens unit, for a g-line, for an F-line, and for a C-line respectively, and the predetermined positive lens in the object-side positive lens unit is a lens for which the Abbe number is maximum, from among Abbe numbers for any positive lens in the object-side positive lens unit.

\* \* \* \* \*